(12) United States Patent
Yang

(10) Patent No.: US 8,172,720 B2
(45) Date of Patent: May 8, 2012

(54) DIFFERENTIAL GENERATION POWER DISTRIBUTION SYSTEM

(76) Inventor: Tai-Her Yang, Dzan-Hwa (TW)

( * ) Notice: Subject to any disclaimer, the term of this patent is extended or adjusted under 35 U.S.C. 154(b) by 919 days.

(21) Appl. No.: 12/155,348

(22) Filed: Jun. 3, 2008

(65) Prior Publication Data

US 2008/0254936 A1    Oct. 16, 2008

Related U.S. Application Data

(63) Continuation-in-part of application No. 11/713,650, filed on Mar. 5, 2007, now abandoned.

(51) Int. Cl.
*B60K 1/02* (2006.01)
(52) U.S. Cl. .......................... 477/5; 180/65.21
(58) Field of Classification Search .......... 477/3, 5, 477/7; 180/65.25, 65.27, 65.21
See application file for complete search history.

(56) References Cited

U.S. PATENT DOCUMENTS

| | | | | |
|---|---|---|---|---|
| 5,547,433 A * | 8/1996 | Yang | ................ | 477/5 |
| 5,730,676 A * | 3/1998 | Schmidt | ............... | 475/5 |
| 6,048,289 A * | 4/2000 | Hattori et al. | ............ | 477/15 |
| 6,258,006 B1 * | 7/2001 | Hanyu et al. | ............ | 477/5 |
| 6,524,217 B1 * | 2/2003 | Murakami et al. | ........ | 477/5 |
| 6,569,055 B2 * | 5/2003 | Urasawa et al. | .......... | 477/5 |
| 6,672,415 B1 * | 1/2004 | Tabata | ................. | 180/65.25 |
| 7,252,619 B2 * | 8/2007 | Tabata et al. | .............. | 477/3 |
| 7,363,996 B2 * | 4/2008 | Kamada et al. | .......... | 180/65.21 |
| 7,367,911 B2 * | 5/2008 | Raghavan et al. | ........ | 180/65.25 |
| 7,597,648 B2 * | 10/2009 | Conlon et al. | ............. | 477/4 |

* cited by examiner

*Primary Examiner* — J. Allen Shriver, II
*Assistant Examiner* — Bridget Avery
(74) *Attorney, Agent, or Firm* — Bacon & Thomas, PLLC

(57) ABSTRACT

A differential generation power distribution system to drive an all wheel driving carrier by having a rotational kinetic energy output end of a rotational power unit coupled to an intermediate transmission and control interface device containing a main transmission comprised of controllable clutches and gear shifting control means to drive an intermediate differential gear set; one differential output end of the intermediate differential gear set to drive the front end transmission and thus the front end load; another differential output end of the intermediate differential gear set to drive an input end of a rotation part of a first electric machine of the rotational electric machine assembly; the output end of the rotation part of a second electric machine of the rotational electric machine assembly to directly or through the transmission drives the rear end load; and the rotational electric machine assembly for being subject to the drive control device to regulate and control the power distribution between the front end and the rear end loads.

23 Claims, 26 Drawing Sheets

DIFFERENTIAL GENERATION POWER DISTRIBUTION SYSTEM

CROSS-REFERENCES TO RELATED APPLICATIONS

This application is a Continuation-In-Part of my patent application Ser. No. 11/713,650, filed Mar. 5, 2007.

BACKGROUND OF THE INVENTION (a) Field of the Invention

The present invention is related to a differential generation power distribution system, and more particularly to one that provides immediate power distribution for those driving kinetic energy at the front end and the rear end loads of an all wheel driving carrier to upgrade drivability and safety.

(b) Description of the Prior Art

The conventional all wheel driving (AWD) usually referred to a 4-wheel driven vehicle comprised of two front wheels and two rear wheels; also to a tricycle comprised of two front wheels and one rear wheel or one front wheel and two rear wheels; or to that with four or six additional rear wheels to the 4-wheel driven vehicle is generally available in two systems, the Full Time Driving system and the Real Time Driving system.

In the full time driving system, power from the engine drives both of the front and the rear wheels in full time while a differential damp, e.g. the SYNCRO from VW, is disposed between the power source and the motive power side; and another between the power source and the rear wheel set. Advantages of the full time driving system include that both of the front and the rear wheel sets are able to drive and provided with good driving performance; however, the shortcomings include greater loss and higher fuel consumption.

In the real time driving system a mechanic, electromagnetic, or fluidity type of controllable clutch is disposed between the rear wheel set and the power source; and the clutch is closed according to the control by means of manual or automatic detection to drive the rear wheel set as the driving condition warrants; while under normal road conditions, the front-wheel driven governs for saving fuel. The real time driving system however has the flaw of failure in real time response due to slight delay in the rear wheel set to produce kinetics either in manual or automatic control mode when the road condition warrants.

An alternative system involves having an intermediate differential gear set between the front and the rear wheel sets. However, the alternative system is found with a flaw that either differential output end skids, the other differential output end immediately loses its power. For example, when the front wheel set skids, the rear wheel set loses power, too.

Immediate loss of power on one wheel set whenever the other wheel set skids is the common flaw to those three systems described above, and the addition of a skid-resisting damp would further result in more power loss, faster temperature rise to the mechanical parts and significant reduction of power performance as follows:

1. Failure of the rear wheel set to execute active asynchronous drive with the front wheel in case of a bumpy road condition; for example, the rear wheel set must be faster than the front wheel set under certain circumstances;
2. Failure in controlling the rear wheel set to generate power greater than that the front wheel set does when the vehicle is climbing on a slope or during start-up under heavy load; and
3. Failure to execute random distribution between the front and the rear wheel sets.

SUMMARY OF THE INVENTION

The primary purpose of the present invention is to provide a differential generation power distribution system to drive the all wheel driving carrier by having rotational kinetic energy from a rotational power unit to drive an intermediate differential gear set through a main transmission; one differential output end of the intermediate differential gear set drives the front end load through a front end transmission and the other differential output end drives a primary electric machine device of a rotational electric machine assembly; the second electric machine device directly or through the transmission drives the rear end load and regulate the power distribution between the front end and the rear end loads through the control by a drive control device.

DESCRIPTION OF MAIN COMPONENT SYMBOLS

1000: Rotational power unit
1001: Rotational output shaft
1002: Controllable clutch
1003: Intermediate transmission and control interface
1006: Front end transmission
1007: Front end load
1016: Controllable clutch
1017: Differential gear set
1031: Input end
1032, 1033: Differential output end
1040, 10410: Rotational electric machine assembly
1041: First electric machine
1042: Second electric machine
1090: Transmission
1110: Main transmission
1111: Intermediate differential gear set
1113: Rear end transmission
1114: Rear end load
1115: Drive control device
1116, 1120, 2116: Controllable clutch
1117: Rechargeable device
1118: Central controller
1121, 1122: Controllable brake
10411: Rotation part of the first electric machine
10412: Rotation part of the second electric machine
10413: Electric machine static part sharing a common magnetic path
20410: Outer ring layer fixed rotational electric machine assembly
20421: Inner ring layer electric machine structure
20422: Intermediate layer electric machine structure
20423: Outer ring layer electric machine structure

DETAILED DESCRIPTION OF THE PREFERRED EMBODIMENTS

The differential generation power distribution system of the present invention to drive an all wheel driving carrier essentially operates by having a rotational kinetic energy output end of a rotational power unit coupled to an intermediate transmission and control interface device containing a main transmission comprised of controllable clutches and gear shifting control means to drive an intermediate differential gear set; one differential output end of the intermediate differential gear set is arranged to drive the front end transmission and thus drives the front end load; another differential output end of the intermediate differential gear set is arranged to drive an input end of a rotation part of a first electric machine of the rotational electric machine assembly while the output end of the rotation part of a second electric machine of the rotational electric machine assembly is arranged to directly or through the transmission drive the rear end load; and the rotational electric machine assembly for being subject to the drive control device to regulate and control the power distribution between the front end and the rear end loads, and facilitate arrangements of space and central gravity.

Figure 1:
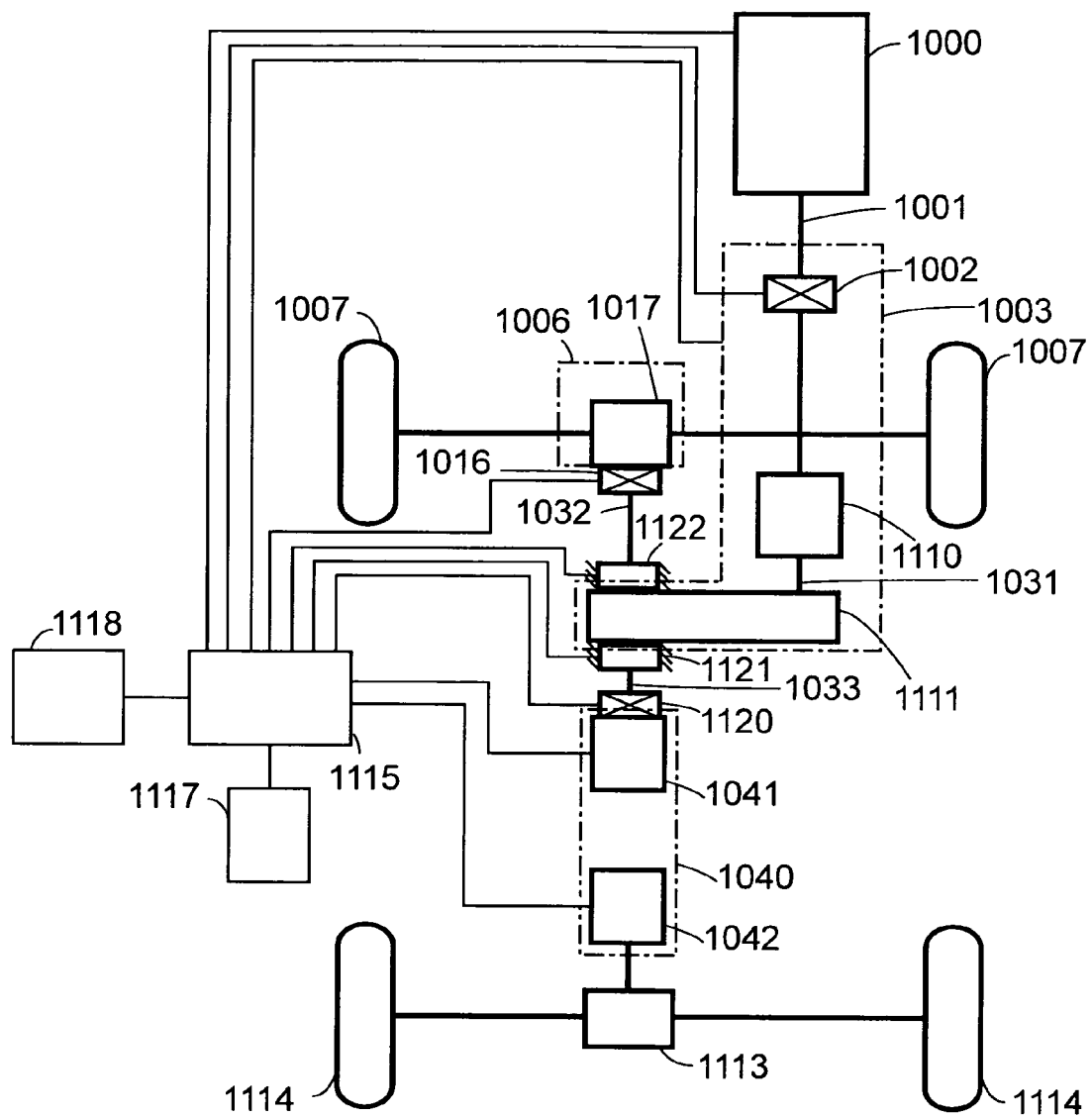
FIG. 1 is a schematic view showing a differential generation power distribution system of a preferred embodiment of the present invention.

FIG. 1 is a schematic view showing a differential generation power distribution system of a preferred embodiment of the present invention; and the preferred embodiment is essentially comprised of:

a rotational power unit 1000: comprised of an internal combustion engine, its associate fuel supply and control unit, the ignition unit, the revolution speed and torque detection and control device, or comprised of any other rotational power source; its rotational output shaft 1001 is arranged to drive the controllable clutch 1002 selected as applicable disposed on the intermediate transmission and control interface 1003 with speed change function, then to further drive the main transmission 1110, the main transmission 1110 then drives an input end 1031 form an intermediate differential gear set 1111, whereof one differential output end 1032 from the intermediate differential gear set 1111 drives a front end transmission 1006 and further drives a front end load 1007 while the other differential output end 1033 of the intermediate differential gear set 1111 drives the input end of the rotation part from the first electric machine 1041 of the rotational electric machine assembly 1040; and the output end of the rotation part of the second electric machine 1042 directly or through a rear end transmission 1113 drives a rear end load 1114;

the controllable clutch 1002: an optional item related to one driven by manual, mechanical, electromagnetic, fluid or eccentric force, or comprised of one-way transmission device; it is disposed between the rotational power unit 1000 and the rotational kinetic energy input end of the main transmission 1110 in the intermediate transmission and control interface 1003, thus being subjected to the control for the operation of engagement or disengagement; the controllable clutch 1002 can be optionally installed or not installed as required;

the intermediate transmission and control interface 1003: includes (1) the controllable clutch 1002; (2) the main transmission 1110 related to an automatic, manual or manually controlled automatic transmission changing gears and other manual-mechanical operation interface of the prior art for gear shift operation; and (3) the intermediate differential gear set 1111 which is comprised of planetary or circulating or any other differential gear set provided with equivalent function, provided with the input end 1031 and two differential output ends 1032, 1033; said controllable clutch 1002, the main transmission 1110, and the intermediate differential gear set 1111 can be optionally installed all or only partly as required;

wherein the input end 1001 of the controllable clutch 1002 is provided to be coupled to the rotational kinetic energy from the rotational power unit 1000 and the output end is provided to be coupled to the main transmission 1110; the output end of the main transmission 1110 is provided to be coupled to the input end 1031 of the intermediate differential gear set 1111; one differential output end 1032 of the intermediate differential gear set 1111 is provided to drive the front end transmission 1006 thus the front end load 1007 through the controllable clutch 1016 and the differential gear set 1017; another differential output end 1033 of the intermediate differential gear set 111 is provided to drive the input end of the rotation part from the first electric machine 1041 of the rotational electric machine assembly 1040 through the controllable clutch 1120; and in turn for the output end of the second electric machine 1042 of the rotational electric machine assembly 1040 to drive the rear end load 1114 through the rear end transmission 1113;

The front end transmission 1006: an optional item provided depending on the nature of the load, including the optional differential gear set 1017 with its both differential outputs to drive the front end load 1007, or an optional single output transmission gear set in place of the differential gear set 1017 to drive the individual load or any other load; or when required the controllable clutch 1016 is disposed between the differential output end 1032 of the intermediate differential gear set 1111 and the differential gear set 1017 of the front end transmission 1006 for the control of engagement or disengagement; furthermore, as required an optional controllable brake 1122 may be provided to the output end 1032 of the intermediate differential gear set 1111; said front end transmission 1006 may be optionally installed or not installed as required;

the controllable clutch 1016: it is related to a manual, mechanical, electromagnetic, fluid or eccentric force driven clutch, or comprised of one-way transmission device, whereof it is disposed between the differential output end 1032 of the intermediate differential gear set 1111 and the input end of the differential gear set 1017 of the front end transmission 1006 to engage or disengage as subject to the central controller 1118; said controllable clutch 1016 may be optionally installed or not installed as required;

a controllable brake 1121: it is related to a manual, mechanical, electromagnetic or fluid force controlled brake apparatus, whereof it is disposed to where between the differential output end 1033 of the intermediate differential gear set 1111 and the static casing to close or release the brake as subject to the central controller 1118; said controllable brake 1121 may be optionally installed or not installed as required;

a controllable brake 1122: it is related to a manual, mechanical, electromagnetic or fluid force controlled brake apparatus, whereof it is disposed between the differential output end 1032 of the intermediate differential gear set 1111 and the static casing to close or release the brake as subject to the central controller 1118; said controllable brake 1122 may be optionally installed or not installed as required;

the rotational electric machine assembly 1040: it is provided in the construction of AC or DC, brush or brushless electric machine, containing one or a plurality of the first electric machine 1041 and one or a plurality of the second electric machine 1042 with both sharing the same holder, the input end of the rotation part of the first electric machine 1041 is coupled through the controllable clutch 1120 to the differential output end 1033 of the intermediate differential gear set 1111, the output end of the rotation part of the second electric machine 1042 drives through the differential rear end transmission 1113 to drive the rear end load 1114, or an optional single output transmission gear set is provided in place of the differential rear end transmission 1113 to drive an individual load or any other load; wherein the first electric machine 1041 is essentially operating as a generator and alternatively as a motor; the second electric machine 1042 is essentially operating as a motor and alternatively as a generator;

the controllable clutch 1120: related to a manual, mechanical, electromagnetic, fluid or eccentric force driven clutch, or comprised of a one-way transmission, whereof it is provided between the differential output end 1033 of the intermediate differential gear set 1111 and the input end of the rotation part from the first electric machine 1041 of the rotational electric machine assembly 1040 to engage or disengage as subject to the central controller 1118; said controllable clutch 1120 may be optionally installed or not installed as required;

the central controller 1118: it is comprised of dynamo-electric or solid state electronic component or microprocessor and associate operation software to output control command or signal according to the internal setup or random control by manual for controlling the drive control device 1115; said central controller 1118 may be optionally installed or not installed as required;

the rechargeable device 1117: an optional item related to a rechargeable secondary battery, capacitor, or super capacitor;

the front end load 1007: comprised of one or a plurality of wheel set, track, or any other load;

the rear end transmission 1113: provided depending on the nature of the load containing one or a plurality of differential gear sets for both differential output ends to drive the rear end load 1114, or a transmission gear set is disposed to drive an individual rear end load 1114; said rear end transmission 1113 may be optionally installed or not installed as required;

the rear end load 1114: comprised of one or a plurality of wheel set, track or any other load;

a drive control device 1115: it is comprised of a dynamo-electric or solid-state electronic component, connected among the first electric machine 1041 and the second electric machine 1042 of the rotational electric machine assembly 1040 and the rechargeable device 1117 to receive the command from the central controller 1118 to execute power control and transmission to drive either the first electric machine 1041 or the second electric machine 1042 or both to engage in positive or negative revolution functioning as a motor; or for control either the first electric machine 1041, or the second electric machine 1042, or both to function as a generator, or for the executing regulation of input or output amperage and voltage between the first electric machine 1041 and the second electric machine 1042 or the rechargeable device 1117 through the drive control device 1115; or for the control of controllable clutches 1002, 1016, and 1120, or the controllable brakes 1121 and 1122, or the intermediate transmission and control interface 1003, or the rotational power unit 1000 or any other load output control electric power through the drive control device 1115; said drive control device 1115 may be optionally installed or not installed as required;

Primary operation functions of the differential generation power distribution system of the present invention include the coupling of the rotational kinetic energy output end of the rotational power unit 1000 and the intermediate transmission and control interface 1003, the intermediate transmission and control interface 1003 contains the main transmission 1110 comprised of the controllable clutch 1002 and gear shifting device and the intermediate differential gear set 1111 driven by the main transmission 1110 while one of the differential output ends of the intermediate different gear set 1111 drives the front end transmission 1006 to further drive the front end load 1007; the other differential output end of the intermediate different gear set 111 drives the input end of the rotation part of the first electric machine 1041 in the rotational electric machine assembly 1040 while the output end of the rotation part of the second electric machine 1042 in the rotational electric machine assembly 1040 drives the rear end load 1114 directly or through a transmission; the rotational electric machine assembly 1040 is subject to the control of the drive control device 1115 to regulate and control the power distribution between the front end load 1007 and the rear end load 1114.

In the differential generation power distribution system of the present invention, the input end 1001 of the controllable clutch 1002 is coupled to the rotational kinetic energy from the rotational power unit 1000, and its output end is coupled to the main transmission 1110; the output end of the main transmission 1110 is coupled to the input end 1031 of the intermediate differential gear set 1111; one differential output end 1032 of the intermediate differential gear set 1111 drives the front end transmission 1006 through the controllable clutch 1016 and the differential gear set 1017 thus to drive the front end load 1007; another differential output end 1033 of the intermediate differential gear set 1111 drives the input end of the rotation part of the first electric machine 1041 in the rotational electric machine assembly 1040 through the controllable clutch 1120; and further to drive the rear end load 1114 through the rear end transmission 1113 at the output end of the second electric machine 1042 in the rotational electric machine assembly 1040.

Both of the first and the second electric machines 1041, 1042 of the differential generation power distribution system may operate as a motor or as a generator according to the operation needs. When the first electric machine 1041 is driven by the rotational kinetic energy from the differential output end 1033 of the intermediate differential gear set 1111 to function as a generator, the power outputted may provide any or all the following functions subject to the control of the central controller 1118 and the drive control device 1115:

(1) With the controllable clutch 1016 disengaged and the controllable brake 1122 locked up to serve as the engine for the rotational power unit 1000, the engine as controlled is running at or approaching a fixed speed within the rpm area of the brake specific fuel consumption (BSFC) featuring comparatively higher energy efficiency and more fuel saving to drive the first electric machine 1041 to operate as a generator; the power generated drives the second electric machine 1042 to operate as a motor directly or through the control by the drive control device 1115, thus to further drive the rear end load 1114 to start up from static condition and to execute accelerating operation;

(2) Should the system be provided with the rechargeable device 1117, the controllable clutch 1016 is disengaged and the controllable brake 1122 is locked up to serve as the engine for the rotational power unit 1000, the engine as controlled is running at or approaching a fixed speed within the rpm area of the brake specific fuel consumption (BSFC) featuring comparatively higher energy efficiency and more fuel saving to drive the first electric machine 1041 to operate as a generator; the power generated charges the unsaturated rechargeable device 1117 or is supplied to an external destination;

(3) With the controllable clutch 1016 disengaged and the controllable brake 1122 locked up to serve as the engine for the rotational power unit 1000, the engine as controlled is running at or approaching a fixed speed within the rpm area of the brake specific fuel consumption (BSFC) featuring comparatively higher energy efficiency and more fuel saving to drive the first electric machine 1041 to operate as a generator; the power generated and that from the rechargeable device 1117 jointly drive the second electric machine 1042 to function as a motor directly or through the control by the drive control device 1115 thus to further drive the rear end load 1114 to start up from static status and to execute accelerating operation;

(4) With the controllable clutch 1016 disengaged and the controllable brake 1122 locked up to serve as the engine for the rotational power unit 1000, the engine as controlled is running at or approaching a fixed speed within the rpm area of the brake specific fuel consumption (BSFC) featuring comparatively higher energy efficiency and more fuel saving to drive the first electric machine 1041 to operate as a generator; the power generated drives the second electric machine device 1042 to function as a motor directly or through the control by the drive control device 1115 to further drive the rear end load 1114 to start up from the static status and to execute accelerating operation while charging the rechargeable device 1117 at the same time;

(5) The power outputted from the first electric machine 1041 as driven by the rotational kinetic energy from the intermediate differential gear set 1111 drives the second electric machine 1042 to function as a motor directly or through the drive control device 1115 thus to further drive the rear end load 1114 to start up from the static status and to execute accelerating operation;

(6) When the system is provided with the rechargeable device 1117, the rotational kinetic energy from the intermediate differential gear set 1111 may be applied to drive the first electric machine 1041 to function as a generator with the power generated to charge the unsaturated rechargeable device 1117 or supplied to an external destination;

(7) When the system is provided with the rechargeable device 1117, the rotational kinetic energy from the intermediate differential gear set 1111 may be applied to drive the first electric machine 1041 to function as a generator with the power generated to drive the second electric machine 1042 to function as a motor directly or through the control by the drive control device 1115 thus to drive the rear end load 1114 to start up from static status and to execute accelerating operation while charging the unsaturated rechargeable device 1117 at the same time;

(8) When the system is provided with the rechargeable device 1117, the rotational kinetic energy from the intermediate differential gear set 1111 may be applied to drive the first electric machine 1041 to function as a generator with the power generated and that outputted from the rechargeable device 1117 to jointly drive the second electric machine 1042 to function as a motor directly or through the control by the drive control device 1115 thus to further drive the rear end load 1114 to start up from static status and to execute accelerating operation;

(9) The second electric machine 1042 is capable of functioning as a generator in the status of the load brake is applying a brake or reduction with the power outputted is provided to charge the rechargeable device 1117 so as to produce damper.

The differential generation power distribution system of the present invention when applied to an all wheel driving carrier is capable of providing any or all the following functions through the intermediate transmission and control interface 1003 and the control by the central controller 1118:

(1) Power from the rechargeable device 1117 drives the first electric machine 1041 and the second electric machine 1042 in the rotational electric machine assembly 1040 for either or both electric machines to engage in positive or negative revolution as a motor to drive the load to start up from static status and to execute accelerating operation; or (2) Power from the rechargeable device 1117 drives the first electric machine 1041 or the second electric machine 1042 in the rotational electric machine assembly 1040 for either or both of the electric machines to function as a motor to drive the load jointly with the rotational kinetic energy from the rotational power unit 1000 (e.g., an engine); or to engage in positive or negative revolution as a motor to regulate and control the power distribution ratio between the front end load 1007 and the rear end load 1114; or (3) The rotational kinetic energy from the rotational power unit 1000 drives the first electric machine 1041 of the rotational electric machine assembly 1040 to function as a generator with the power outputted to charge the rechargeable device 1117 and to change the counter torque formed by the power outputted by controlling the size of the charging current, meanwhile regulating and controlling the power distribution ratio between the front end load 1007 and the rear end load 1114 by means of the differential coupling of the counter torque through the intermediate differential gear set 1111; or (4) With the controllable clutch 1016 disengaged and the controllable brake 1122 locked up to serve as the engine for the rotational power unit 1000, the engine as controlled is running at or approaching a fixed speed within the rpm area of the brake specific fuel consumption (BSFC) featuring comparatively higher energy efficiency and more fuel saving to drive the first electric machine 1041 to operate as a generator; the power generated drives the second electric machine 1042 to function as a motor directly or through the control by the drive control device 1115 to further drive the rear end load 1114 to start up from the static status and to execute accelerating operation;

(5) The rotational kinetic energy from the differential output end 1033 of the intermediate differential gear set 1111 drives the first electric machine 1041 to function as a generator with the power generated to directly or through the control by the drive control device 1115 drive the second electric machine 1042 to function as a motor for further driving the rear end load 1114 to start up from static status and to execute accelerating operation; or (6) The rotational kinetic energy from the differential output end 1033 of the intermediate differential gear set 1111 drives the first electric machine 1041 to function as a generator with the power generated and that outputted from the rechargeable device 1117 to jointly drive the second electric machine 1042 to function as a motor directly or through the control by the drive control device 1115 for further driving the rear end load 1114 to start up from static status and to execute accelerating operation; or (7) When the carrier is driving down a slope or exercising a brake or deceleration, either or both of the first electric machine 1041 and the second electric machine 1042 in the rotational electric machine assembly 1040 functions as a generator to charge the rechargeable device 1117, or to supply power to other power driven load for executing the regeneration braking; or (8) The system engages in front wheel driving; or
(9) The system engages in rear wheel driving; or
(10) The system engages in all wheel driving.

Figure 2:
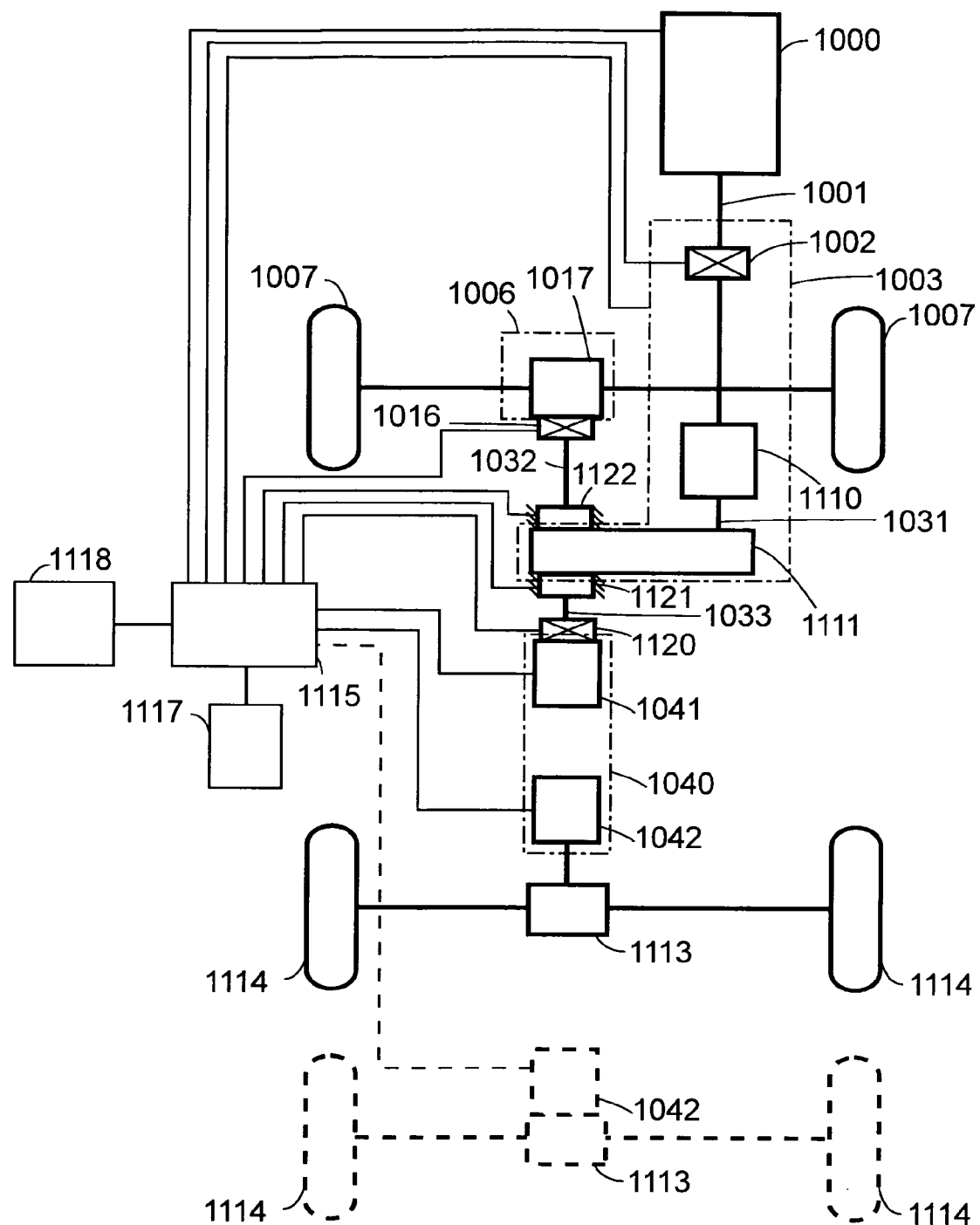
FIG. 2 is a schematic view showing multiple units of rear end load are driven by the preferred embodiment of the present invention illustrated in FIG. 1.

FIG. 2 is a schematic view showing multiple units of rear end loads are driven by the preferred embodiment of the present invention illustrated in FIG. 1. The system configuration as illustrated in FIG. 2 while being given with that as illustrated in FIG. 1 is essentially characterized in that:

two or more than two second electric machines 1042 are respectively disposed to two or more than two rear end load 1114 to be subject to the control by the drive control device 1115 for separately driving their corresponding rear end transmissions 1113 thus to drive the rear end loads 1114 each driven by the rear end transmission 1113.

Figure 3:
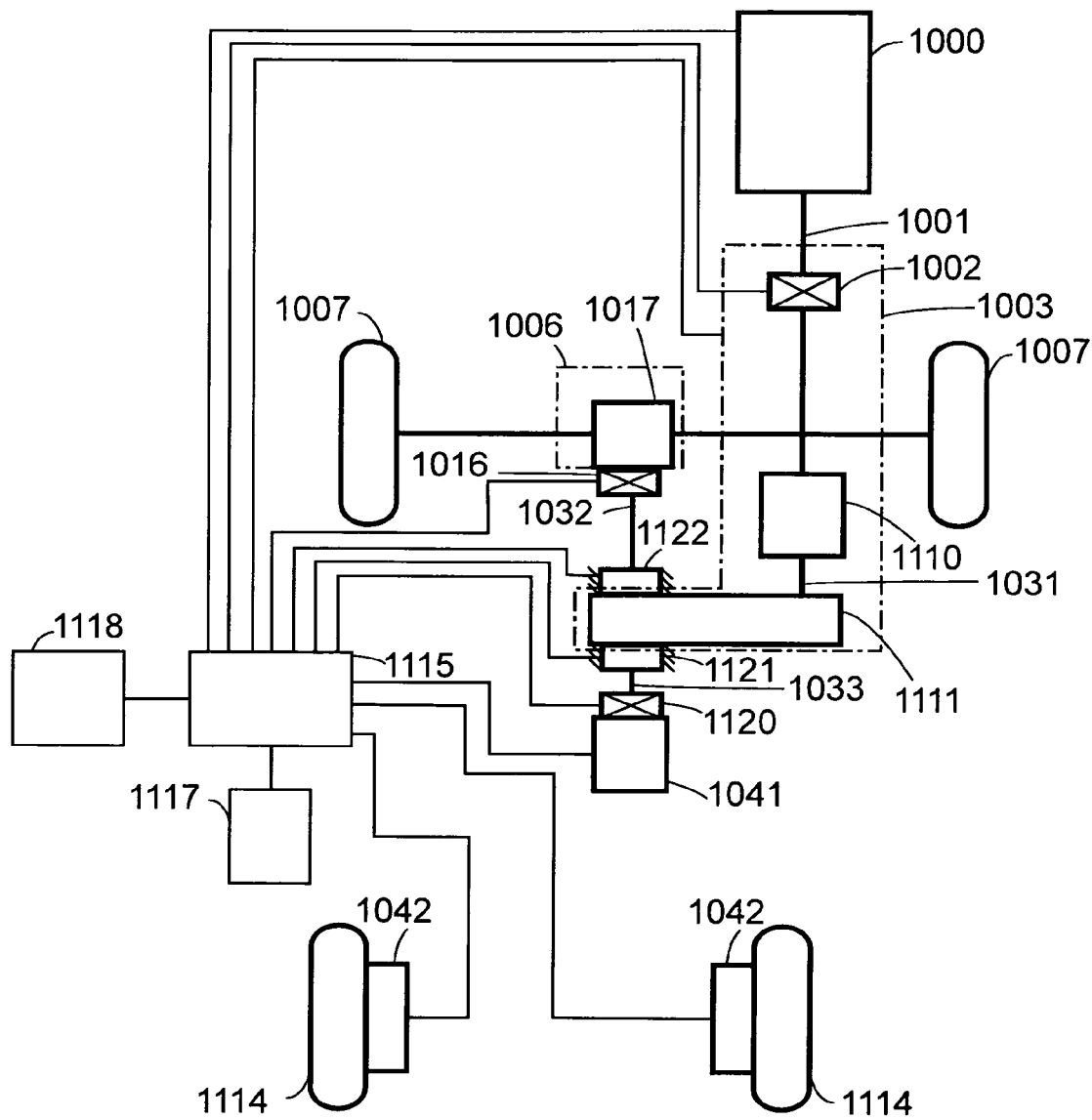
FIG. 3 is a schematic view showing a rotational electric machine assembly comprised of separated individual electric machine of another preferred embodiment of the present invention.

In the differential generation power distribution system of the present invention, the rotational electric machine assembly 1040 may be comprised of multiple separated individual electric machines as illustrated in FIG. 3 showing a rotational electric machine assembly comprised of separated individual electric machine of another preferred embodiment of the present invention. Additional to the system configuration and functions as illustrated in FIG. 1, the construction as illustrated in FIG. 3 is further characterized by:

having an independent first electric machine 1041; and
having one or a plurality of independent second electric machine 1042 to drive the rear end load 1114 adapted either directly or through the variable speed transmission device of the prior art.

Figure 4:
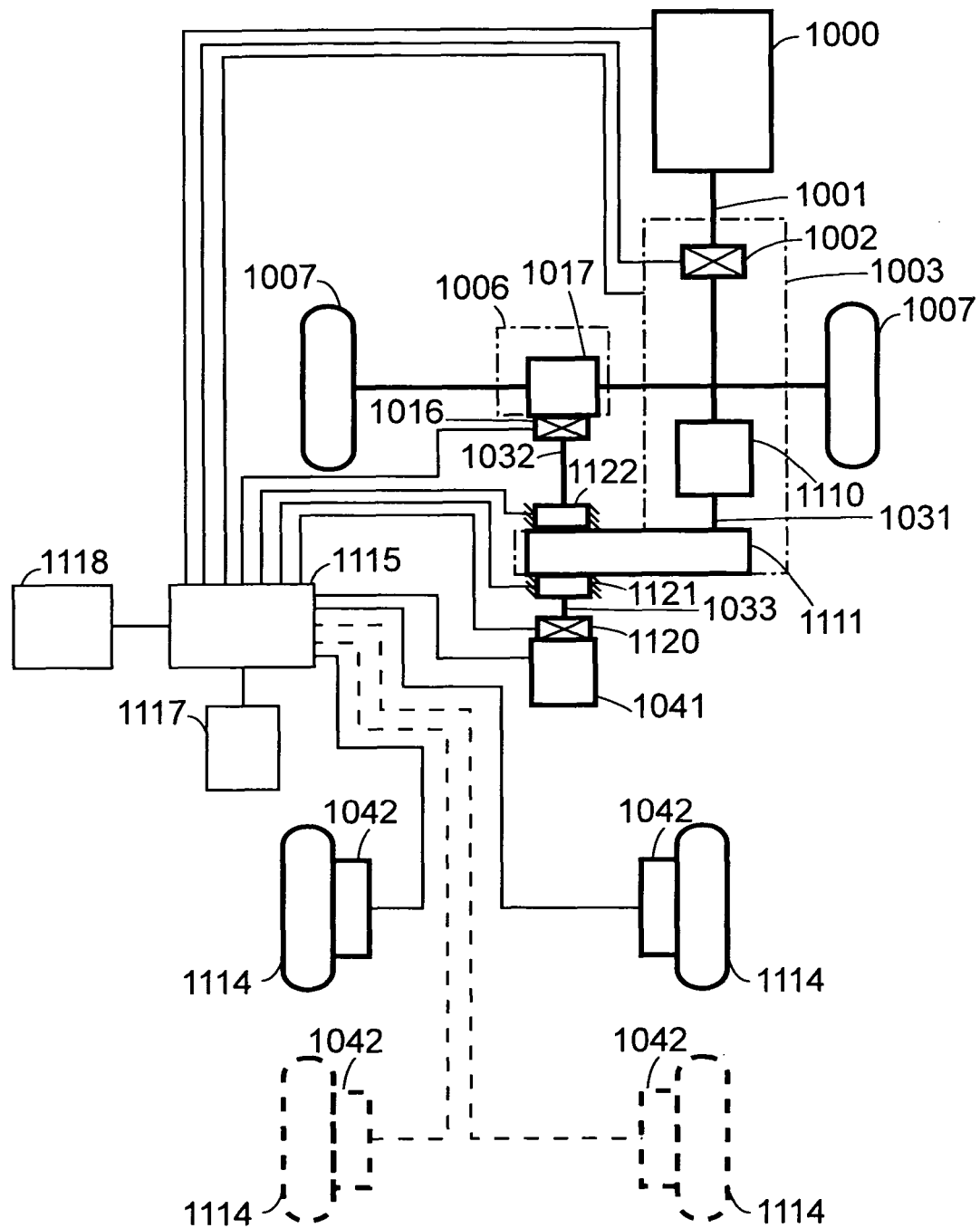
FIG. 4 is a schematic view showing the preferred embodiment illustrated in FIG. 3 is provided with multiple units of the second electric machine and multiple units of the rear end load.

FIG. 4 is a schematic view showing the preferred embodiment illustrated in FIG. 3 is provided with multiple units of the second electric machine and multiple units of rear load. The system configuration of the preferred embodiment in FIG. 4 while carrying the primary configuration in FIG. 3, is further characterized by that:

the independent second electric machine 1042 is each adapted to the loads on both sides of two or more than two rear end load 1114 for being subject to the control by the drive control device 1115 without providing the rear end transmission 1113 for increasing space and improving efficiency; or a directly driven wheel type electric machine may be provided between the second electric machine 1042 and the rear end load 1114; or the rear end load 1114 is driven by the second electric machine 1042 directly or through a variable speed transmission of the prior art with the functions and working principles of the system similar to that for the preferred embodiment given in FIG. 3.

Figure 5:
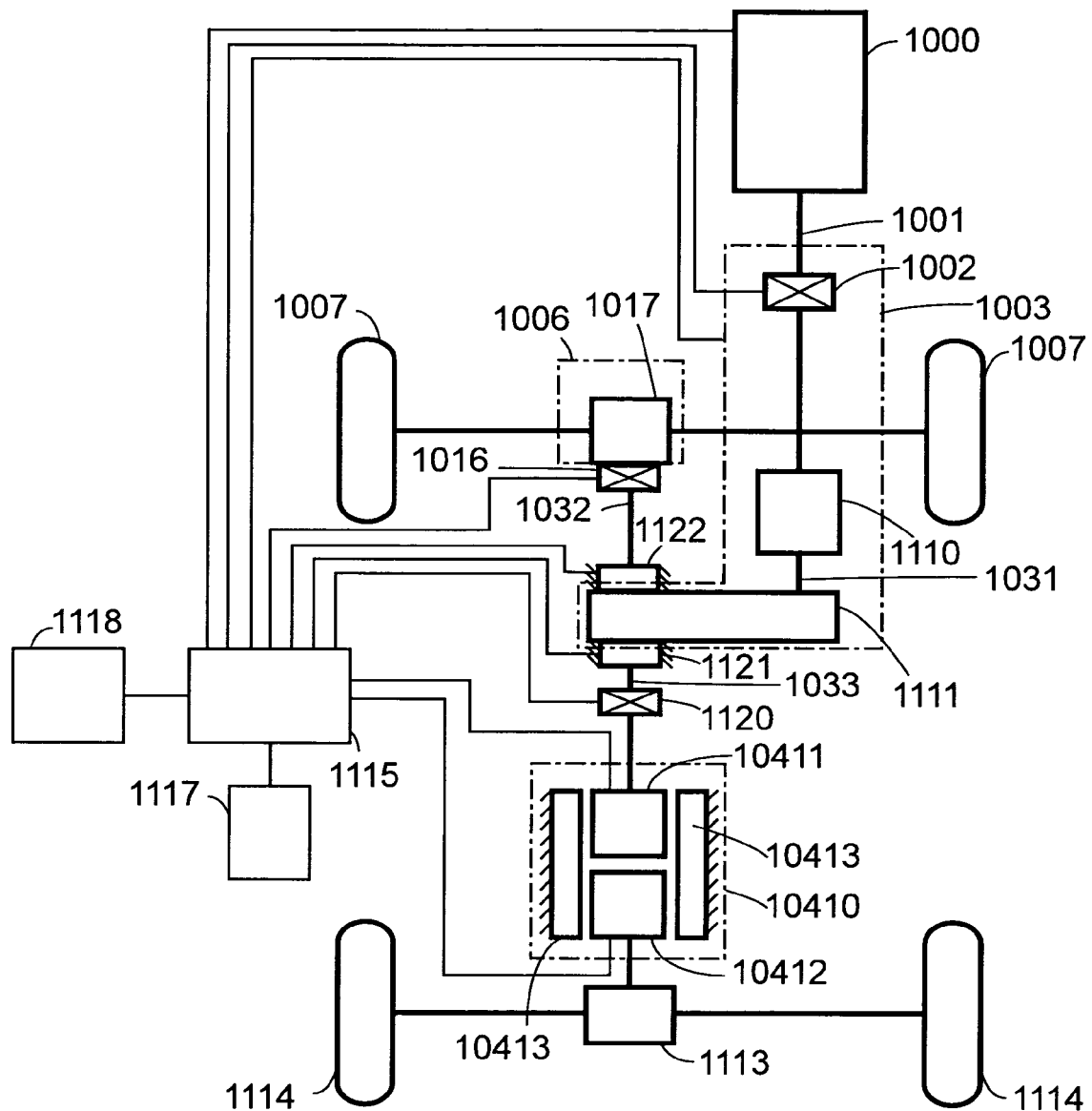
FIG. 5 is a schematic view of another preferred embodiment showing that the present invention has its rotation parts coaxially disposed in series to form a rotational electric machine assembly.

In the differential generation power distribution system of the present invention, the rotational electric machine assembly 1040 while being comprised of the rotational electric machine structures sharing the same construction as illustrated in FIGS. 1 and 2, may form another rotational electric machine assembly 10410 by having those rotation parts to indicate coaxially arranged in series. As illustrated in FIG. 5, a construction of another preferred embodiment yet showing that the present invention having its rotation parts coaxially disposed in series to form a rotational electric machine assembly, while carrying the system configuration and functions of the preferred embodiment illustrated in FIG. 1, it is characterized by that:

A rotation part 10411 of the first electric machine and a rotation part 10412 of the second electric machine are coaxially arranged in series; the rotation part 10412 of the second electric machine drives at least one rear end load 1114 directly or through at least one rear end transmission 1113; and an electric machine static part 10413 serving as a common magnetic path is provided extending axially to be coupled to the rotation part 10411 of the first electric machine and the rotation part 10412 of the second electric machine.

Figure 6:
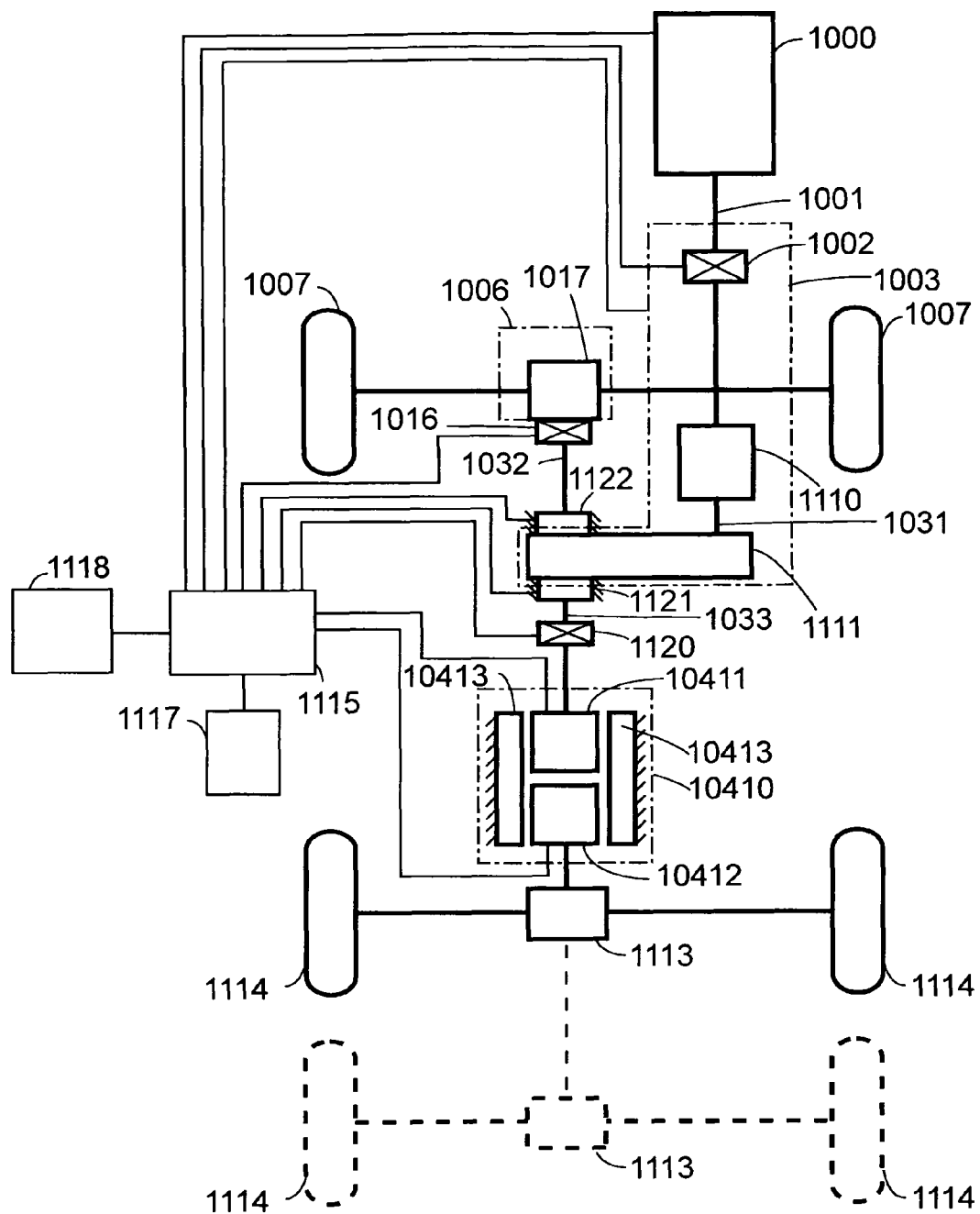
FIG. 6 is a schematic view showing that the preferred embodiment illustrated in FIG. 5 is provided with multiple units of rear end load.

FIG. 6 is a schematic view showing that the preferred embodiment illustrated in FIG. 5 is provided with multiple units of the rear end load. The system configuration of the preferred embodiment in FIG. 6 while carrying the primary configuration in FIG. 5, is further characterized by that:

rotation parts are coaxially arranged in series to form the rotational electric machine assembly 10410 and an electric machine static part 10413 sharing a common magnetic path is provided extending axially along where both rotation parts 10411, 10412 respectively of the first and the second electric machine arranged coaxially in series, and coupled to the rotation part 10411 of the individually provided first electric machine and the rotation part 10412 of the second electric machine also individually provided coaxially in series with the first electric machine;

The electric machine static part 10413 sharing a common magnetic path is arranged coaxially in series with its internally coupled rotation parts 10411, 10412 respectively of the first and the second electric machines; and the rotation part 10412 of the second electric machine drives one or multiple rear end load 1114 either directly or through one or multiple rear end transmission 1113;

As required, the electric machine static part 10413 sharing a common magnetic path may become a magnetic field or armature for the electric machine while both rotation parts 10411, 10412 respectively of the first and the second electric machines may also function as the magnetic field or armature for the electric machine as relatively selected if and when required; the system functions and working principles are the same as that given in FIG. 5.

Figure 21:
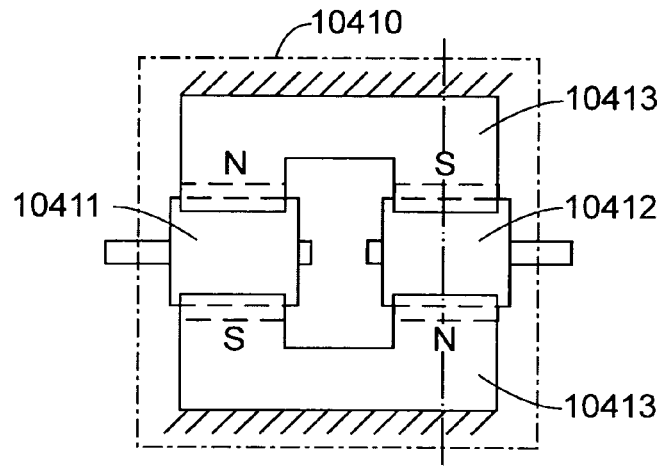
FIG. 21 is a schematic view of the present invention showing that the rotation part of the electric machine is coaxially disposed in series to form a rotational electric machine assembly.

FIG. 21 is a schematic view of the present invention showing that the rotation part of the electric machine indicates coaxial construction in series of a rotational electric machine assembly.

In the differential generation power distribution system of the present invention, the rotational electric machine assembly 10410 may be comprised of having rotations parts arranged in parallel of multiple axes coupled to the electric machine static part sharing a common magnetic path while the rotational electric machine assembly is in the construction of a rotational electric construction sharing the same structure as illustrated in FIGS. 1 and 2.

Figure 7:
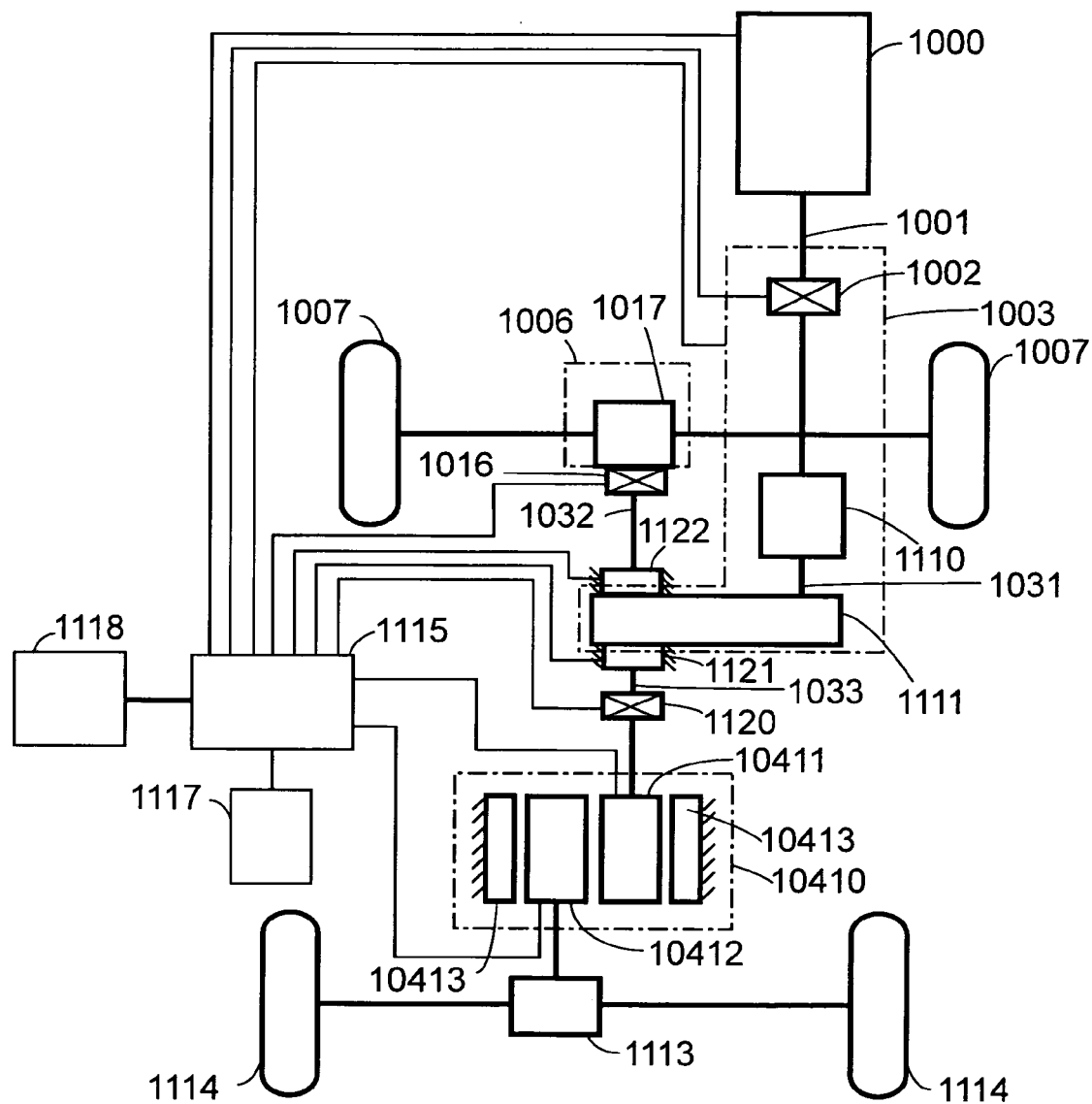
FIG. 7 is a schematic view of another preferred embodiment of the present invention showing that multiple axes from the rotation part of the electric machine coupled in parallel with the static part of the electric machine that shares the same magnetic path.

FIG. 7 is a schematic view of another preferred embodiment of the present invention showing that multiple axes from the rotation part of the electric machine coupled in parallel with the static part of the electric machine that shares the same magnetic path. The construction of the preferred embodiment as illustrated in FIG. 7 while maintaining the system configuration and function as that given in FIG. 1 is further characterized by that:

the rotation part 10411 of the first electric machine and the rotation part 10412 of the second electric machine are arranged in parallel on multiple axes; and the rotation part 10412 of the second electric machine drives the rear end load 1114 either directly or through the rear end transmission 1113; and a closed magnetic path is formed by having both rotation parts 10411, 10412 respectively of the first and the second electric machines to couple to the electric machine static part 10413 sharing the same magnetic path.

Figure 8:
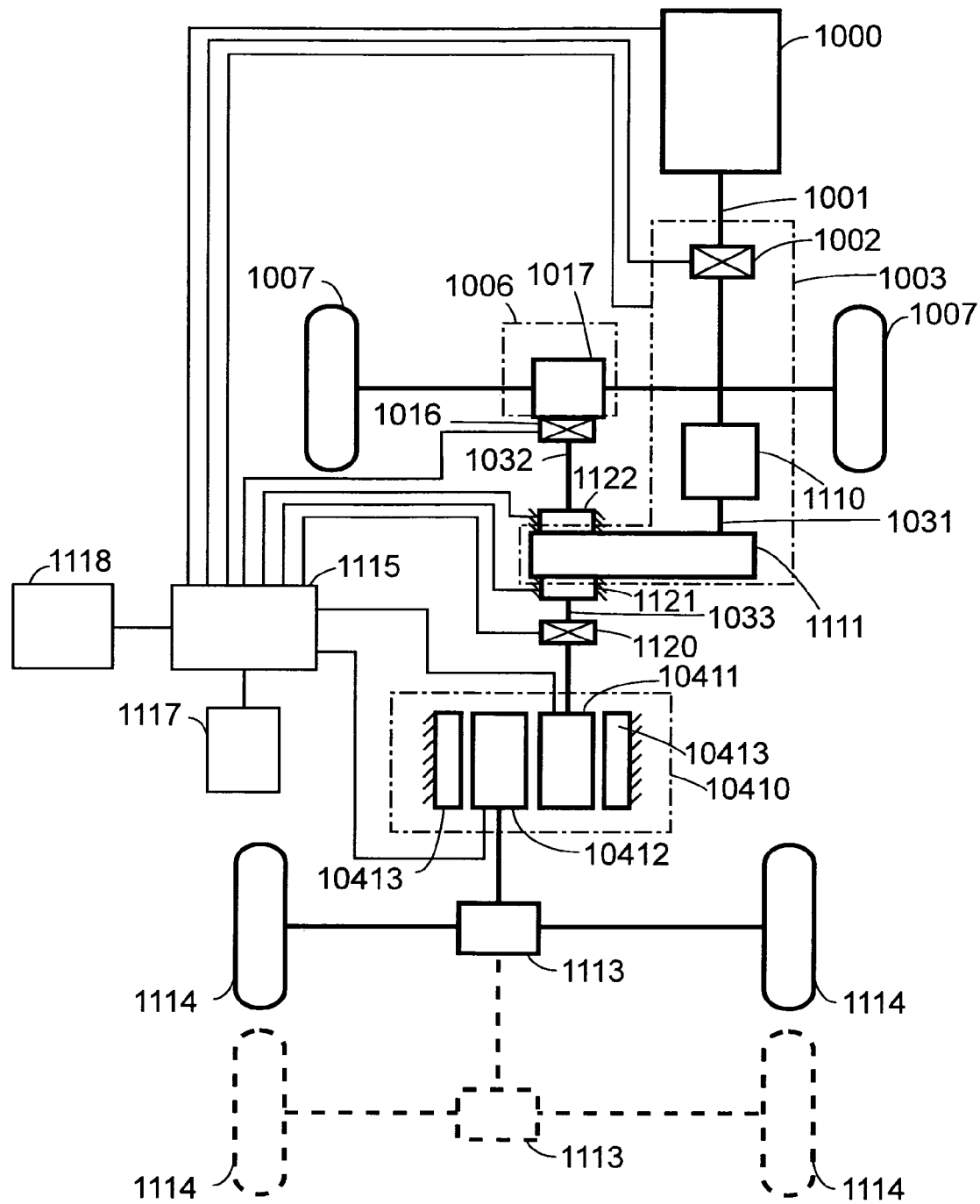
FIG. 8 is a schematic view showing that the preferred embodiment illustrated in FIG. 7 is provided with multiple units of rear end load.

FIG. 8 is a schematic view showing that the preferred embodiment illustrated in FIG. 7 is provided with multiple units of rear end load. The construction of the preferred embodiment as illustrated in FIG. 8 while maintaining the system configuration and function as that given in FIG. 7 is further characterized by that:

the rotational electric machine assembly 10410 is comprised of having both rotation parts 10411, 10412 respectively of the first and second electric machines individually provided to be arranged in parallel of multiple axes and coupled to the electric machine static part 10413 sharing a common magnetic path; and the rotation part 10411 of the first electric machine and the rotation part 10412 of the second electric machine coupled to the electric machine static 10413 sharing a common magnetic path are arranged in parallel of multiple axes while the rotation part 10412 of the second electric machine drives one or multiple rear end loads 1114 either directly or through the rear end transmission 1113.

As required, the electric machine static part 10413 sharing a common magnetic path may become a magnetic field or an armature for the electric machine while both rotation parts 10411, 10412 respectively of the first and the second electric machines may also function as the magnetic field or armature for the electric machine if and when required; the system functions and working principles are the same as that given in FIG. 7.

Figure 22:
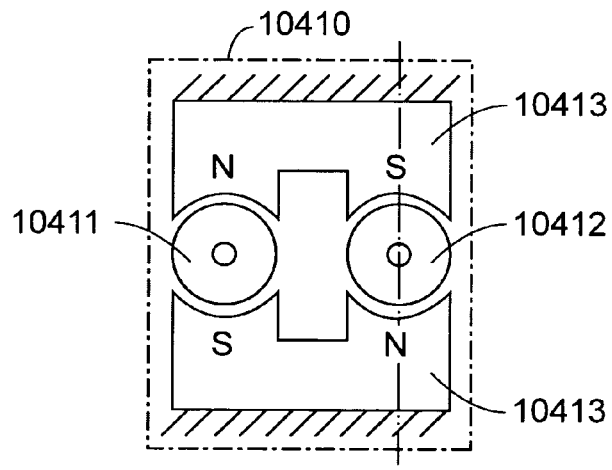
FIG. 22 is a schematic view of the present invention showing a construction of the rotational electric machine assembly having its rotation part comprised of multiple axes coupled in parallel with the static part of the electric machine sharing a common magnetic path.

FIG. 22 is a schematic view of the present invention showing a construction of the rotational electric machine assembly having its rotation part comprised of multiple axes coupled in parallel with the static part of the electric machine sharing a common magnetic path.

Figure 9:
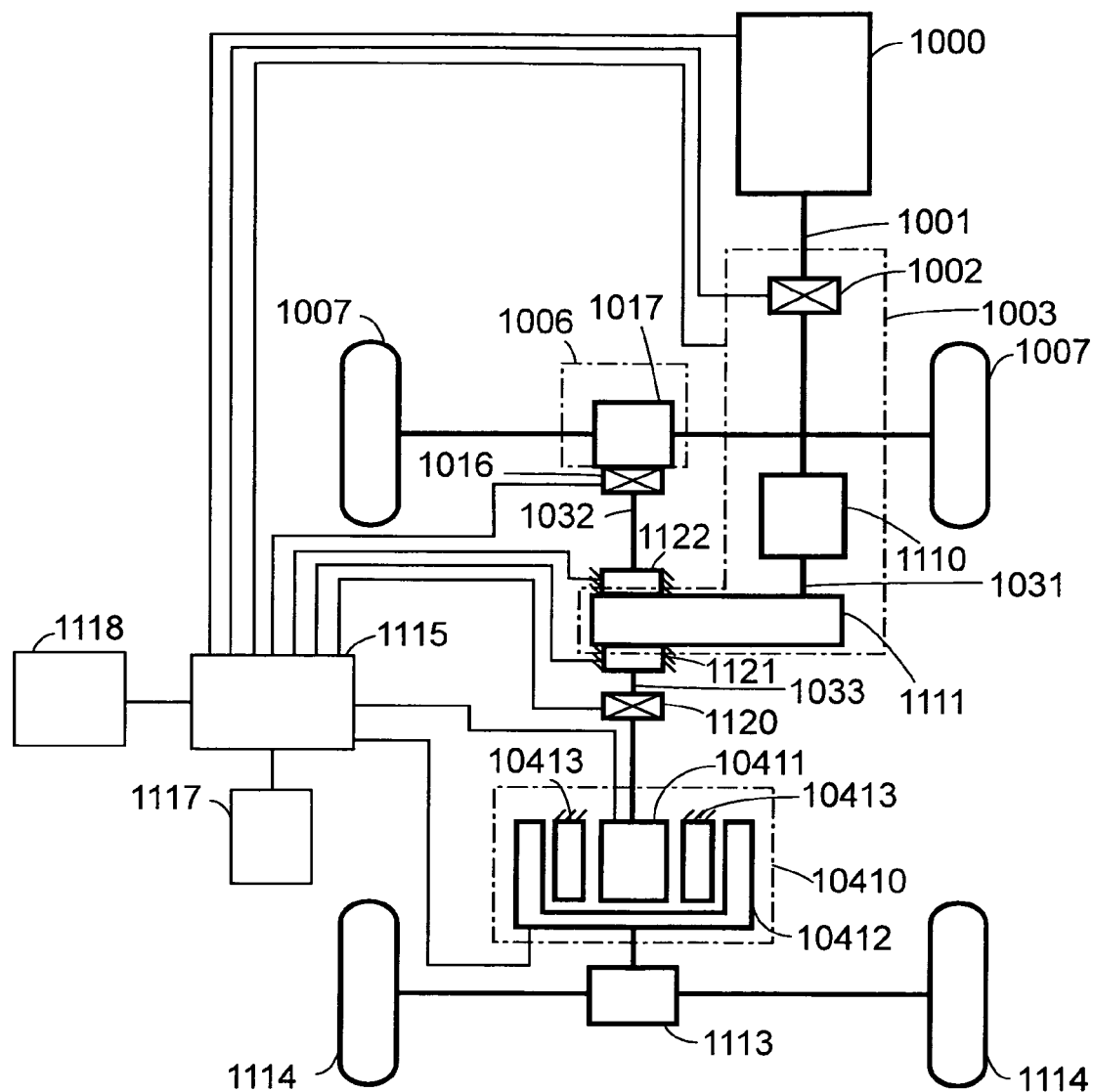
FIG. 9 is a schematic view of another preferred embodiment of the present invention showing a rotational electric machine assembly comprised of a three-layer ring-shaped coaxial electric machine.

Other than having the rotational electric machine assembly 1040 in the differential generation power distribution system of the present invention comprised of rotational electric machine structure sharing the same construction as illustrated in FIGS. 1 and 2, the rotational electric machine assembly 10410 may be comprised of electric machines coaxially arranged in a construction of three layers in a circular fashion. FIG. 9 is a schematic view of another preferred embodiment of the present invention showing a rotational electric machine assembly comprised of the three-layer ring-shaped type coaxial electric machine construction. The construction of the preferred embodiment illustrated in FIG. 9 while maintaining the system configuration and functions given in FIG. 1 is further characterized by that:

the rotation part 10411 of the first electric machine in a circular or cylindrical shape and the rotation part 10412 of the second electric machine in a circular shape presents with the electric machine static part 10413 sharing a common magnetic path and disposed between both rotation parts 10411, 10412 a three-layer type ring-shaped coaxial electric machine construction; and the rotation part 10412 of the second electric machine drives the rear end load 1114 either directly or through the rear end transmission 1113.

Figure 10:
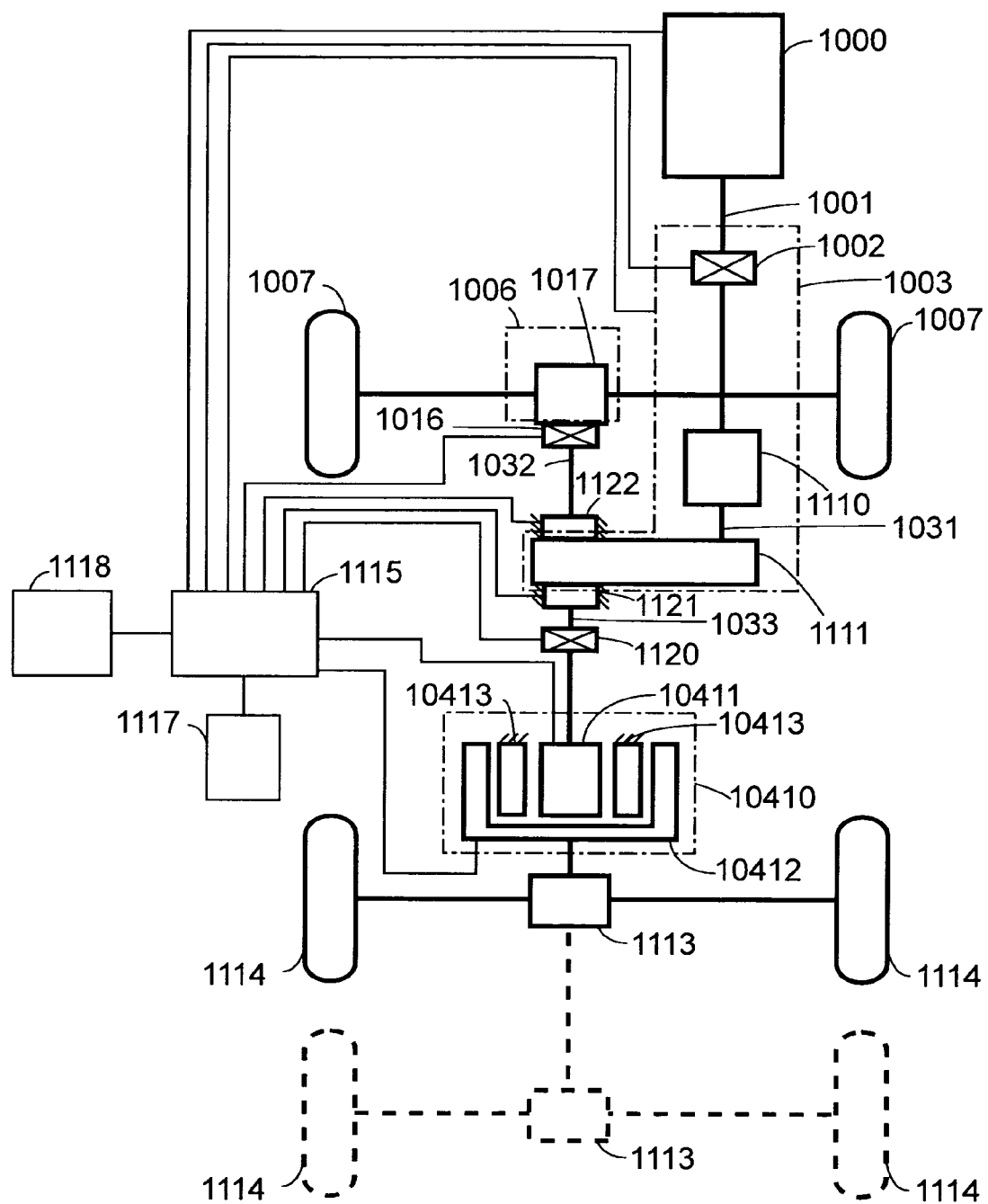
FIG. 10 is a schematic view showing that the preferred embodiment illustrated in FIG. 9 is provided with multiple units of rear end load.

FIG. 10 is a schematic view showing that the preferred embodiment illustrated in FIG. 9 is provided with multiple units of rear end load. The construction of the preferred embodiment as illustrated in FIG. 10 while maintaining the system configuration and function as that given in FIG. 9 is further characterized by that:

the rotational electric machine assembly 10410 in a construction of three-layer type ring-shaped coaxial electric machines indicates an electric machine structure featuring three layers of coaxially arranged electric machines coupling to one another; wherein, the ring-shaped central layer is provided as an electric machine static part 10413 sharing a common magnetic path; the ring-shaped outer layer and the ring- or cylinder-shaped inner layer are respectively functioning as the individually operating rotation part 10411 of the first electric machine and the rotation part 10412 of the second electric machine; and the rotation part 10412 of the second electric machine drives one or multiple rear end loads 1114 either directly or through the rear end transmission 1113;

As required, the electric machine static part 10413 sharing a common magnetic path may become a magnetic field or an armature for the electric machine while both rotation parts 10411, 10412 respectively of the first and the second electric machines may also respectively function as the magnetic fields or armatures for the electric machine that engages in relative operation if and when required; the system functions and working principles are the same as that given in FIG. 9.

Figure 23:
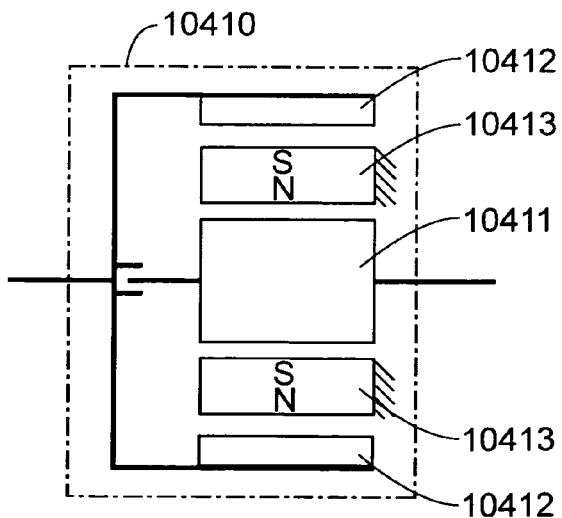
FIG. 23 is a schematic view of the present invention showing a rotational electric machine assembly in a coaxial construction of three-layer ring-shaped electric machine structure.

FIG. 23 is a schematic view of the present invention showing a rotational electric machine assembly comprised of a three-layer ring-shaped coaxial electric machine structure.

In order to have the rotational kinetic energy from the rotational power unit 1000 of the differential generation power distribution system of the present invention to directly drive the rear end load 1114, any of those preferred embodiments given in FIGS. 1 through 4 may be first provided a controllable clutch 1116 subject to the control by the central controller 1118 and the drive control device 1115 at where between both rotation parts of the first and the second electric machines 1041, 1042 of the rotational electric machine assembly 1040. When the controllable clutch 1116 indicates engaged status, the rotational kinetic energy from the rotational power unit 1000 is inputted through the rotation part of the first electric machine 1041 to the rotation part of the second electric machine 1042 through the controllable clutch 1116 in engaged status, and further for the output end of the rotation part of the second electric machine 1042 to drive the rear end load 1114.

Figure 11:
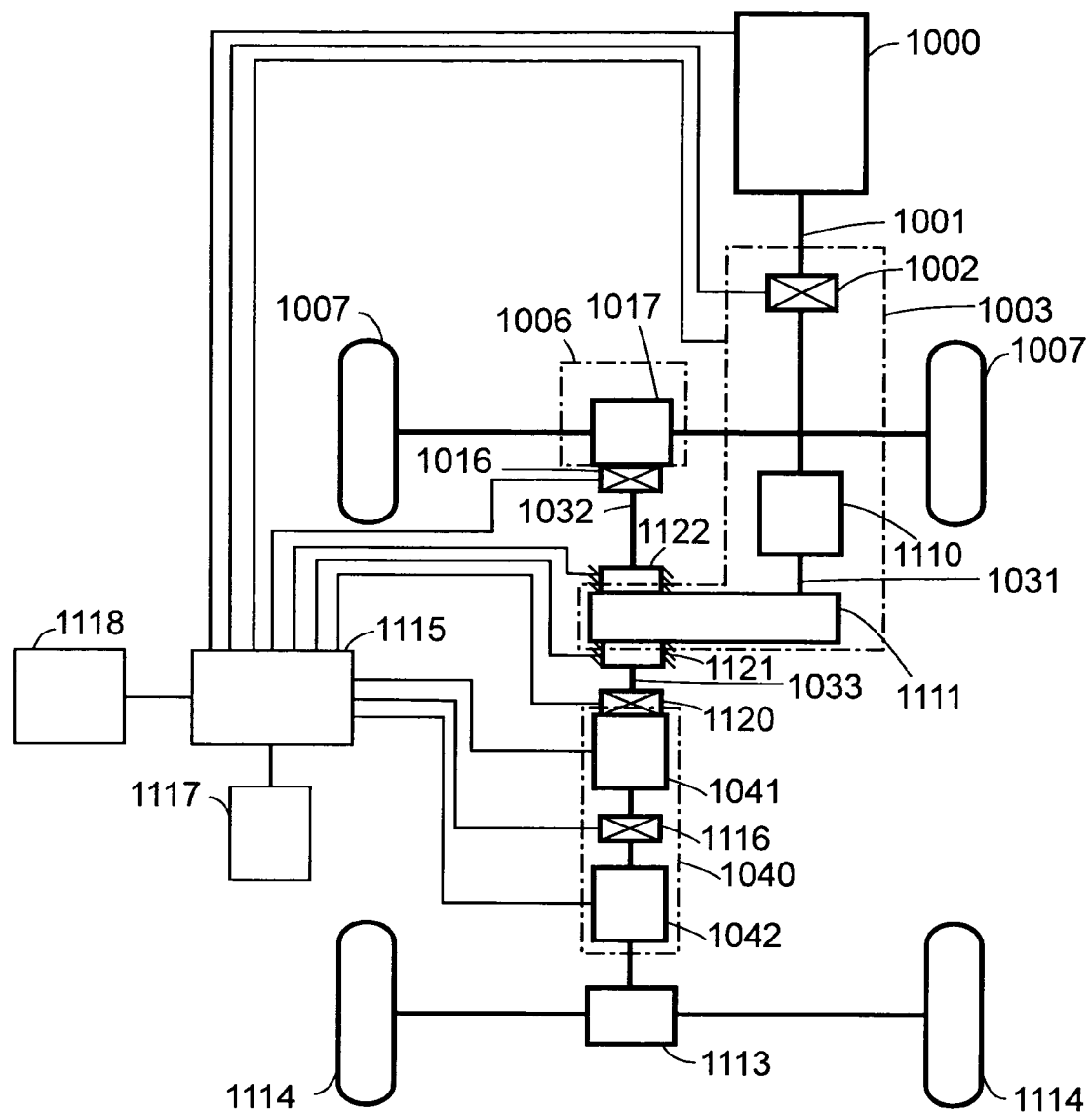
FIG. 11 is a schematic view of another preferred embodiment of the present invention showing that a controllable clutch is provided between the rotation part of the first electric machine and that of the second electric machine illustrated in FIG. 1.

FIG. 11 is a schematic view of another preferred embodiment of the present invention showing that a controllable clutch is provided between the rotation part of the first electric machine and that of the second electric machine illustrated in FIG. 1.

Figure 12:
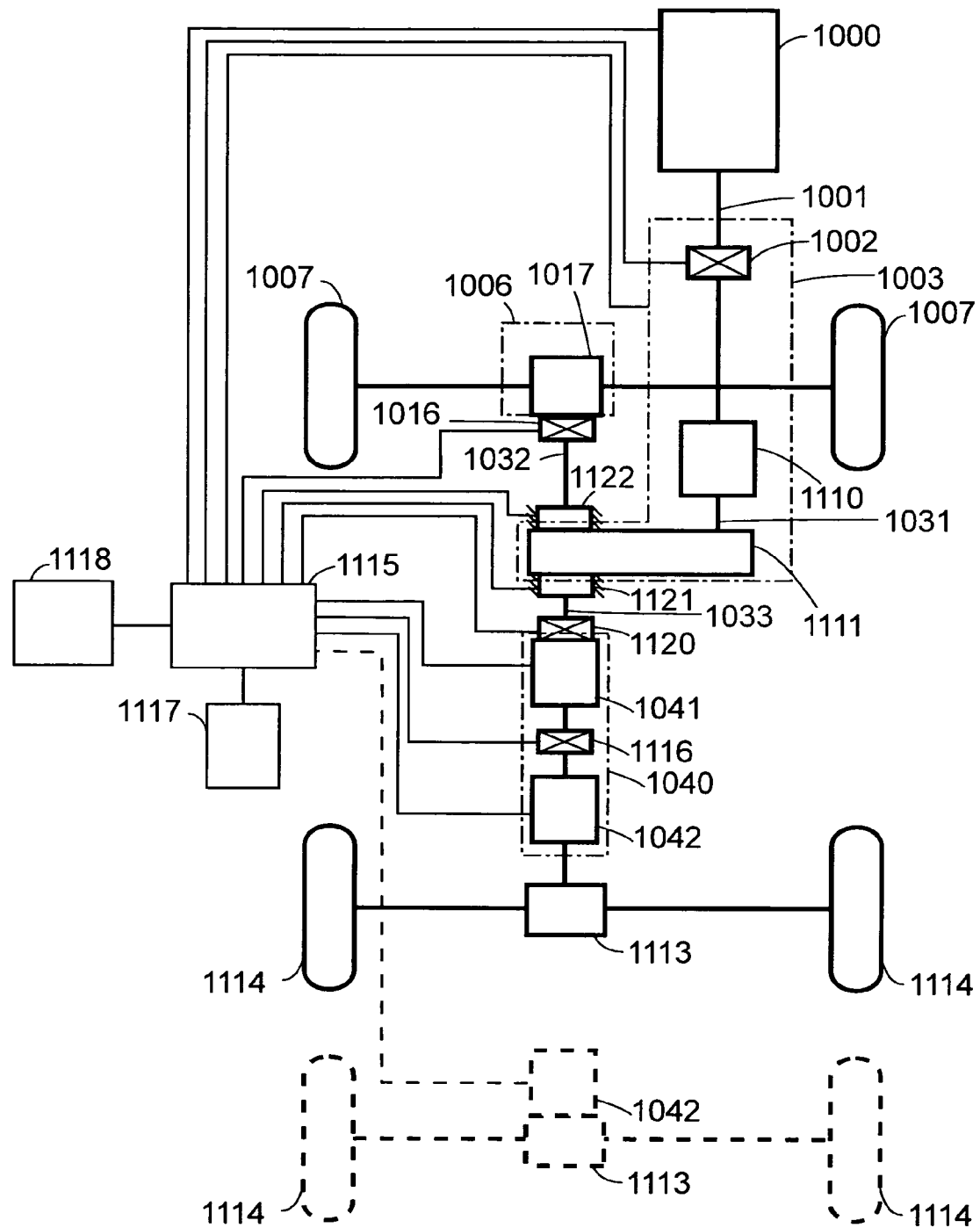
FIG. 12 is a schematic view of another preferred embodiment of the present invention showing that a controllable clutch is provided between the rotation part of the first electric machine and that of the second electric machine illustrated in FIG. 2

FIG. 12 is a schematic view of another preferred embodiment of the present invention showing that a controllable clutch is provided between the rotation part of the first electric machine and that of the second electric machine illustrated in FIG. 2

Figure 13:
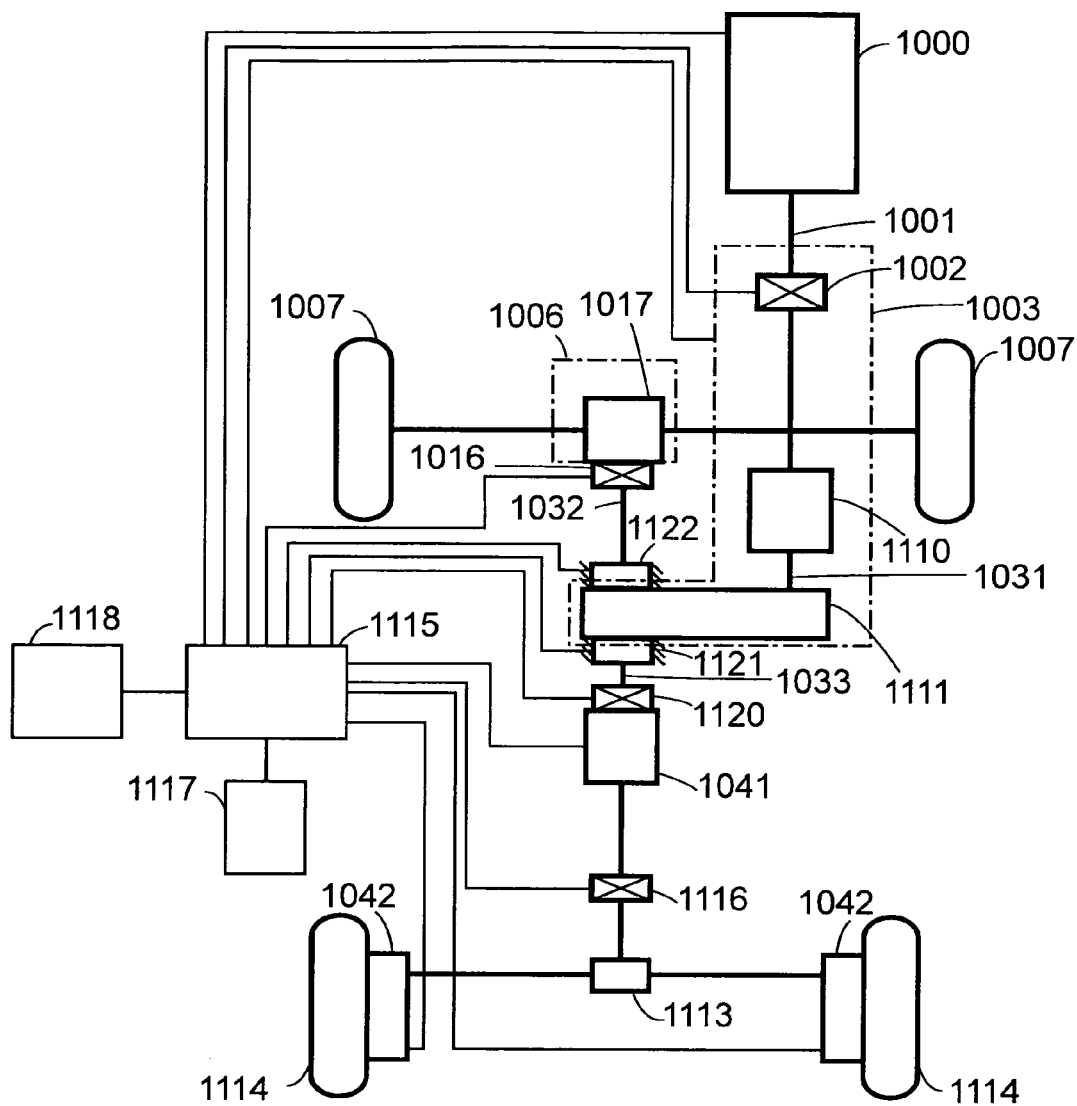
FIG. 13 is a schematic view of another preferred embodiment yet of the present invention showing that a controllable clutch is provided between the rotation part of the first electric machine and that of the second electric machine illustrated in FIG. 3.

FIG. 13 is a schematic view of another preferred embodiment yet of the present invention showing that a controllable clutch is provided between the rotation part of the first electric machine and that of the second electric machine illustrated in FIG. 3.

Figure 14:
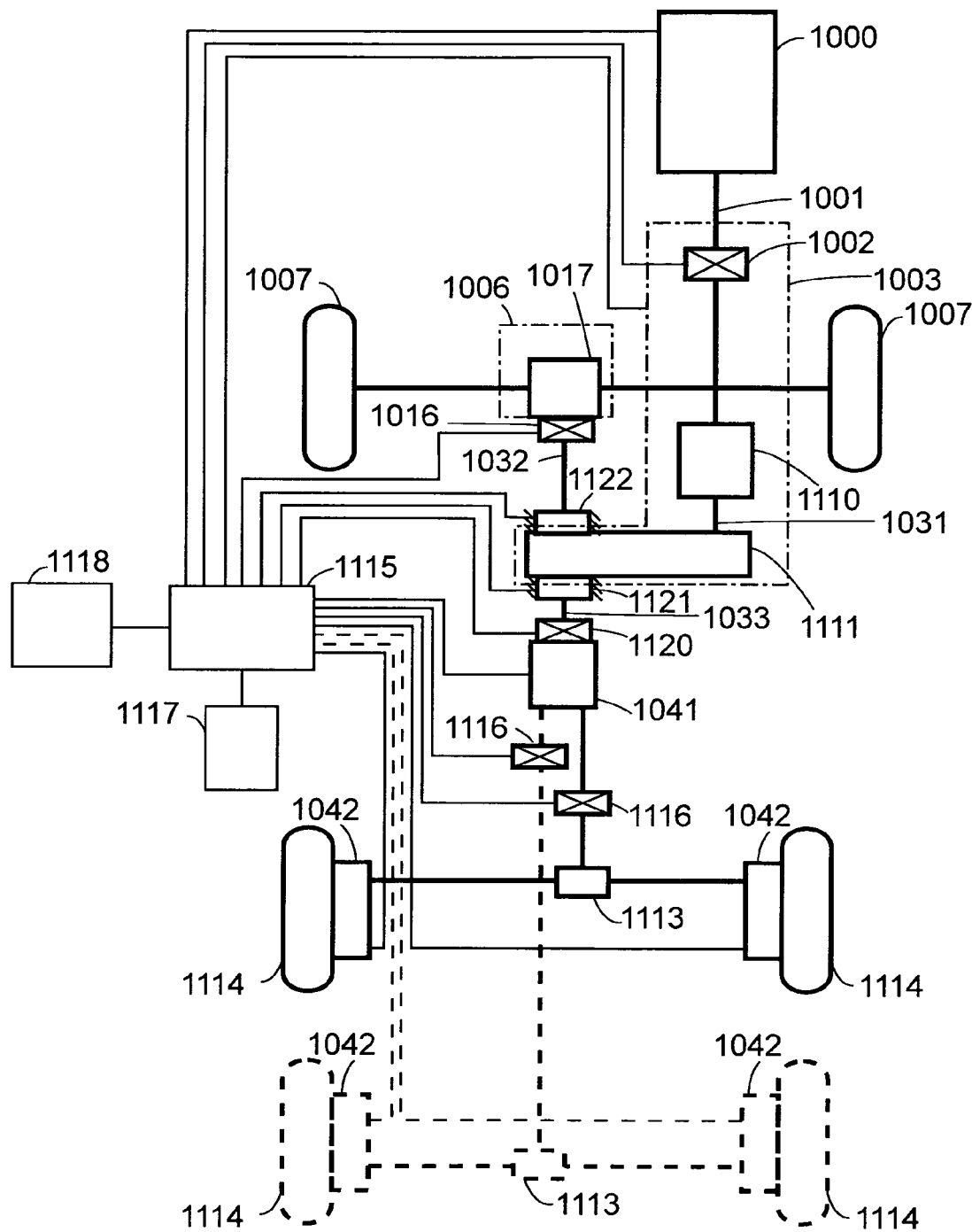
FIG. 14 is a schematic view of another preferred embodiment of the present invention showing that a controllable clutch is provided between the rotation part of the first electric machine and that of the second electric machine illustrated in FIG. 4.

FIG. 14 is a schematic view of another preferred embodiment yet of the present invention showing that a controllable clutch is provided between the rotation part of the first electric machine and that of the second electric machine illustrated in FIG. 4.

The controllable clutch 1116 illustrated in FIGS. 11 through 14 includes that driven by manual, mechanical, electromagnetic, fluid, or eccentric force, or a one-way transmission; the controllable clutch 1116 is provided between both rotation parts of the first electric machine 1041 and the second electric machine 1042 in the rotational electric machine assembly 1040, and is subject to the control by the central controller 1118 to engage or disengage the rotation part of the first electric machine 1041 with or from the rotation part of the second electric machine 1042. The controllable clutch may be optionally installed or not installed as required.

With the controllable clutch 1116 elected to be disposed between both rotation parts of the first and the second electric machines 1041, 1042, the system provides any or all of the following functions:
(1) With the controllable clutch 1116 in engaged status, the rotational kinetic energy outputted from the differential output end 1033 of the intermediate differential gear set 1111 drives the rotation part of the first electric machine 1041 through another controllable clutch 1120, and then drives the rotation part of the second electric machine 1042 through the controllable clutch 1116 so to drive the rear end load 1114 through the rear end transmission 1113;
(2) With the controllable clutch 1116 in engaged status, the power outputted from the rechargeable device 1117 drives each of both the first and the second electric machines 1041, 1042 to function as a motor through the control by the drive control device 1115; and
(3) With the controllable clutch 1116 in engaged status, both of the first and the second electric machines 1041, 1042 are jointly drawn by the rotational power source 1000 or a load inertia to function as a generator with the power generated to charge the rechargeable device 1117 or supply power to any other power driven load through the drive control device 1115.

In practice, any of the differential generation power distribution system illustrated in FIGS. 1 through 4 and FIGS. 11 through 14 may further include any or all of the following devices and functions to meet the individual application requirements:
the differential output end 1032 of the intermediate differential gear set 1111 may first be adapted with a controllable brake 1122 or a controllable clutch 1016 before being coupled with the front end transmission 1006 so to drive the front end load 1007 through the differential gear set 1017 of the front end transmission 1006; the controllable brake 1122 and the controllable clutch 1016 may be separately provided or sharing the common structure, and either or both of the controllable brake 1122 and the controllable clutch 1016 may be optionally installed or not installed as required;
with the controllable clutch 1016 disposed between the differential output end 1032 of the intermediate differential gear set 1111 and the front end transmission 1006 in disengaged status, the controllable brake 1122 in the braking status, another controllable clutch 1120 disposed between the other differential output end 1033 of the intermediate differential gear set 1111 and the rotational electric machine assembly 1040 in engaged status, and another controllable brake 1121 in released status, the front end load 1007 indicates idling and the system drives the rear end load 1114;
the other differential output end 1033 of the intermediate differential gear set 111 may be first adapted with the controllable brake 1121, or the controllable clutch 1120 before coupling to the input end of the first electric machine 1041 of the rotational electric machine assembly 1040; both of the controllable brake 1121 and the controllable clutch 1120 may be separately provided or sharing the same structure, and either or both of the controllable brake 1121 and the controllable clutch 1120 may be optionally installed or not installed as required;
with the controllable clutch 1120 disposed between the differential output end 1033 of the intermediate differential gear set 1111 and the rotational electric machine assembly 1040 in disengaged status, the controllable brake 1122 in the braking status, another controllable clutch 1016 disposed between the differential output end 1032 of the intermediate differential gear set 1111 and the front end transmission 1006 in engaged status, and the controllable brake 1122 in released status; the front end load indicates idling and the system drives the rear end load 1114; the rotational kinetic energy from the rotational power unit 1000 drives the front end load 1007 through the main transmission 1110, the differential output end 1032 of the intermediate differential gear set 1111, and the front end transmission 1006 while the rear end load 1114 is left in a skidding status; or
(1) when the rechargeable device 1117 is provided, the power from the rechargeable device 1117 drives the second electric machine 1042 through the drive control device 1115 to function as a motor so that the power outputted from the rechargeable device 1117 drives the second electric machine 1042 to function as a motor to drive the rear end load 1114 at the same time while the rotational kinetic energy from the rotational power unit 1000 drives the second electric machine 1042 to function as a motor;
(2) If the front end load 1007 and the rear end load 1114 are of an integrated load type, such as the load on ground, on surface or in water, the second electric machine 1042 is drawn by the rear end load 1114 to function as a generator when the rotational kinetic energy from the rotational power unit 1000 is driving the front end load 1007; and the power generated charges the rechargeable device 1117 or supplies power to any other power driven load;
with the controllable clutch 1016 disposed between the differential output end 1032 of the intermediate differential gear set 1111 and the front end transmission 1006 in engaged status, the controllable brake 1122 in released status, another controllable brake 1121 adapted to the other differential output end 1033 in released status; and another controllable clutch 1120 adapted in engaged status; the present invention provides the following functions:
(1) the rotational kinetic energy from the rotational power unit 1000 executes all wheel driving; or
(2) when the rechargeable device 1117 is provided, the power from the rechargeable device 1117 drives the first electric machine 1041 or the second electric machine 1042 through the drive control device 1115 for either electric machine to execute all wheel driving alone or jointly with the rotational kinetic energy from the rotational power unit 1000;
with the controllable clutch 1016 disposed between the differential output end 1032 of the intermediate differential gear set 1111 and the front end transmission 1006 in disengaged status, the controllable brake 1122 in released status, the controllable brake adapted to the other differential output end 1033 in released status, the controllable clutch 1120 adapted to the input end of the rotational electric machine assembly 1040 in disengaged status; both of the front end and the rear end loads are left in skidding status; and in the course of deceleration or driving down slope or upon exercising a brake, either or both of the first electric machine 1041 and the second electric machine 1042 of the rotational electric machine assembly 1040 revolves to function as a generator when drawn by the load inertia with the power outputted to charge the rechargeable device 1117 or to supply power to any other power driven load through the drive control device 1115 while the counter torque created by the outputted power serves as the braking damp for the system;

the controllable clutch 1116 may be disposed as required at where between the first electric machine 1041 and the second electric machine 1042 of the rotational electric machine assembly 1040 so that when the controllable clutch 1116 is in engaged status, both rotation parts respectively of the first electric machine 1041 and the second electric machine 1042 are also in engaged status; or in the absence of the controllable clutch 1116, rotation parts respectively of the first electric machine 1041 and the second electric machine 1042 are separated from each other without being coupled for transmission; and with the controllable clutch 1116 disposed between the first and the second electric machine 1041, 1042 and placed in engaged status, the rotational kinetic energy from the rotational power unit 1000 drives the rear end load 1114 through another controllable clutch 1002, the main transmission 1110, the intermediate differential gear set 1111, and the rotational electric machine assembly 1040 with the controllable clutch 1116 in engaged status inside.

Any preferred embodiment of the differential generation power distribution system as illustrated in FIGS. 5 through 10 is capable of directly driving the rear end load 1114 from the rotational power unit 1000; and a controllable clutch 1116 subject to the control by the central controller 1118 and the drive control device 1115 may be further disposed in series at where between the rotation part 10411 of the first electric machine and the rotation part 10412 of the second electric machine of the rotational electric machine assembly 10410.

With the controllable clutch 1116 in its engaged status, the rotational kinetic energy from the rotational power unit 1000 is inputted through the rotation part 10411 of the first electric machine to pass through the controllable clutch 1116 in engaged status to the rotation part 10412 of the second electric machine for the output end of the rotation part 10412 of the second electric machine to drive the rear end load 1114.

Figure 15:
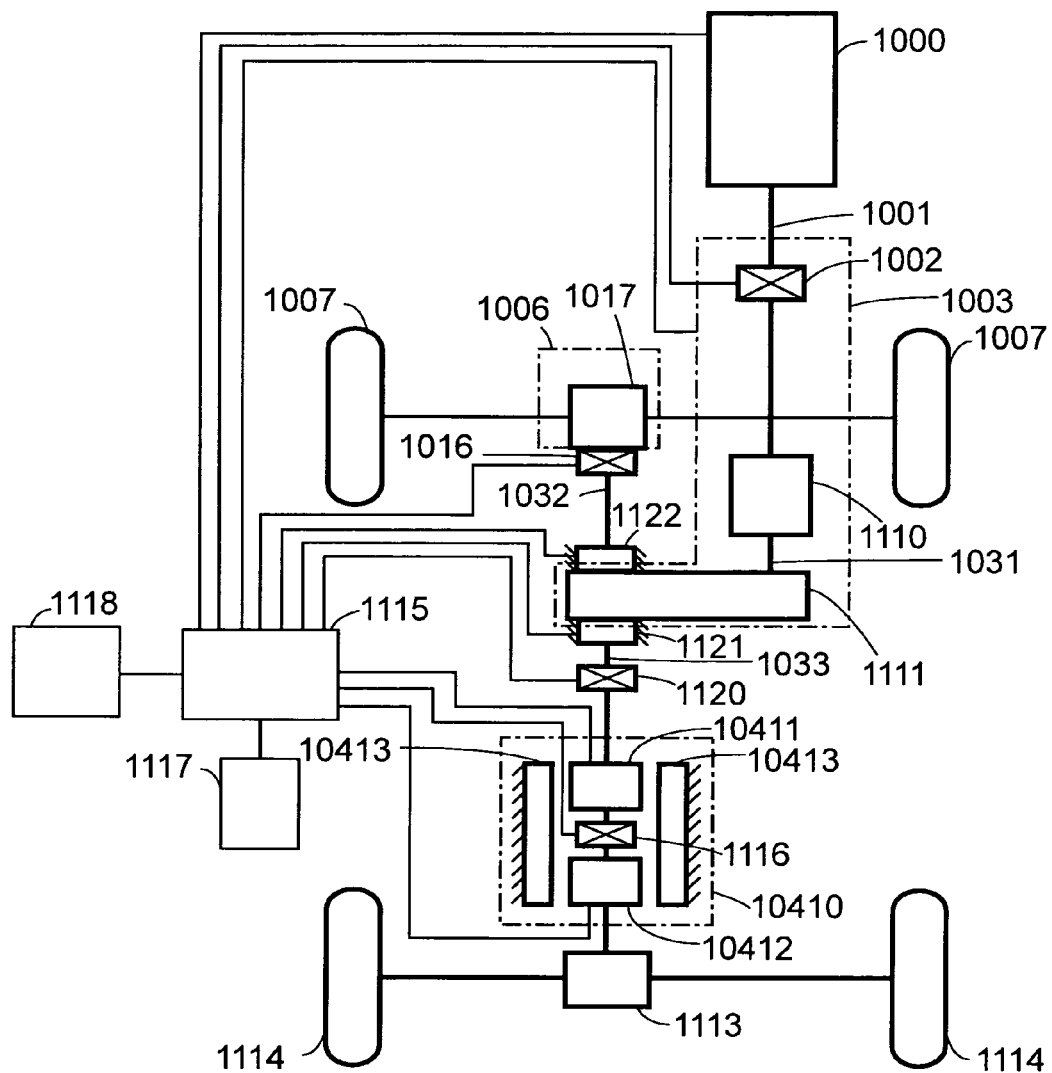
FIG. 15 is a schematic view of another preferred embodiment of the present invention showing that a controllable clutch is provided between the rotation part of the first electric machine and that of the second electric machine illustrated in FIG. 5.

FIG. 15 is a schematic view of another preferred embodiment of the present invention showing that a controllable clutch is provided between the rotation part of the first electric machine and that of the second electric machine illustrated in FIG. 5.

Figure 16:
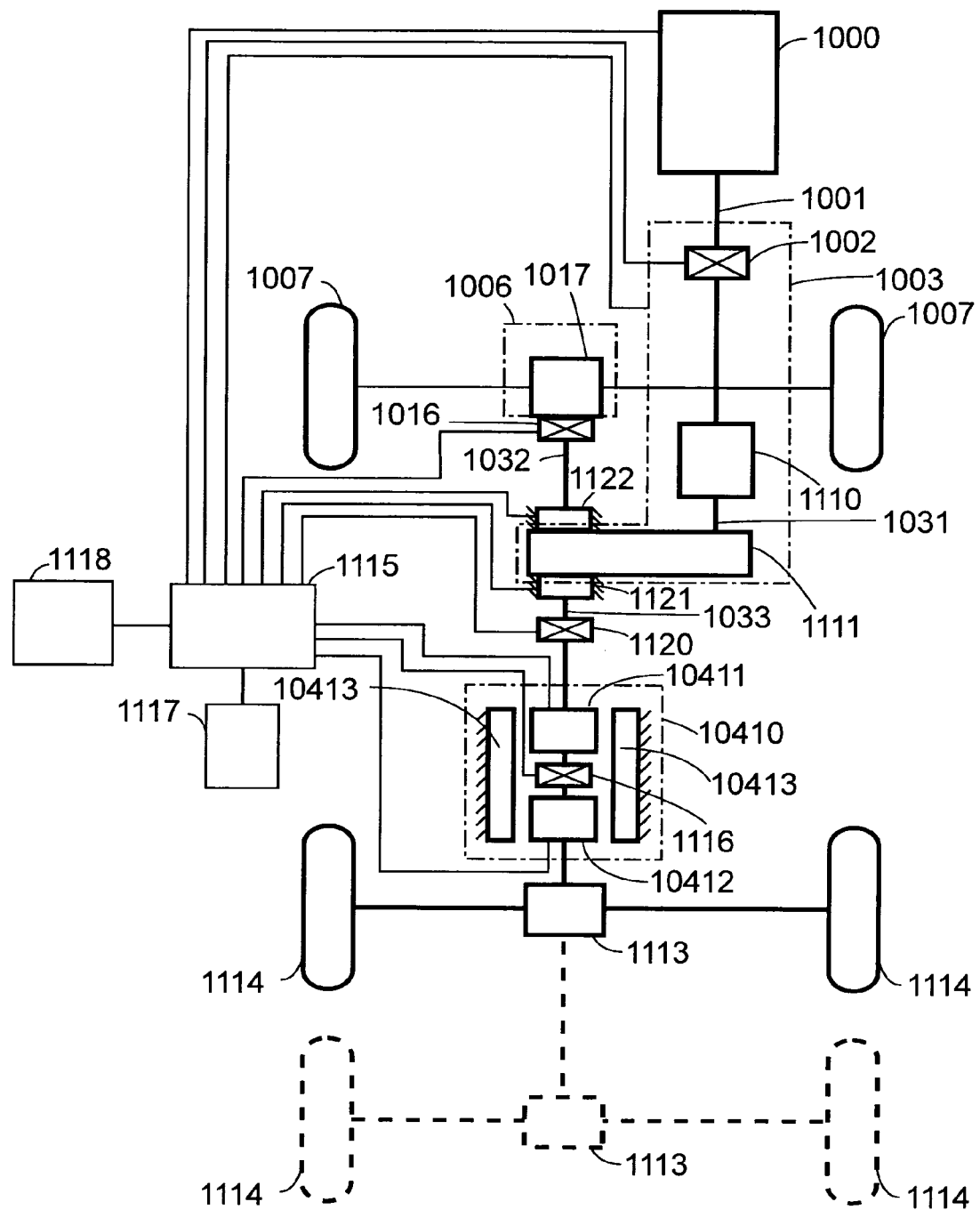
FIG. 16 is a schematic view of another preferred embodiment of the present invention showing that a controllable clutch is provided between the rotation part of the first electric machine and that of the second electric machine illustrated in FIG. 6.

FIG. 16 is a schematic view of another preferred embodiment of the present invention showing that a controllable clutch is provided between the rotation part of the first electric machine and that of the second electric machine illustrated in FIG. 6.

Figure 17:
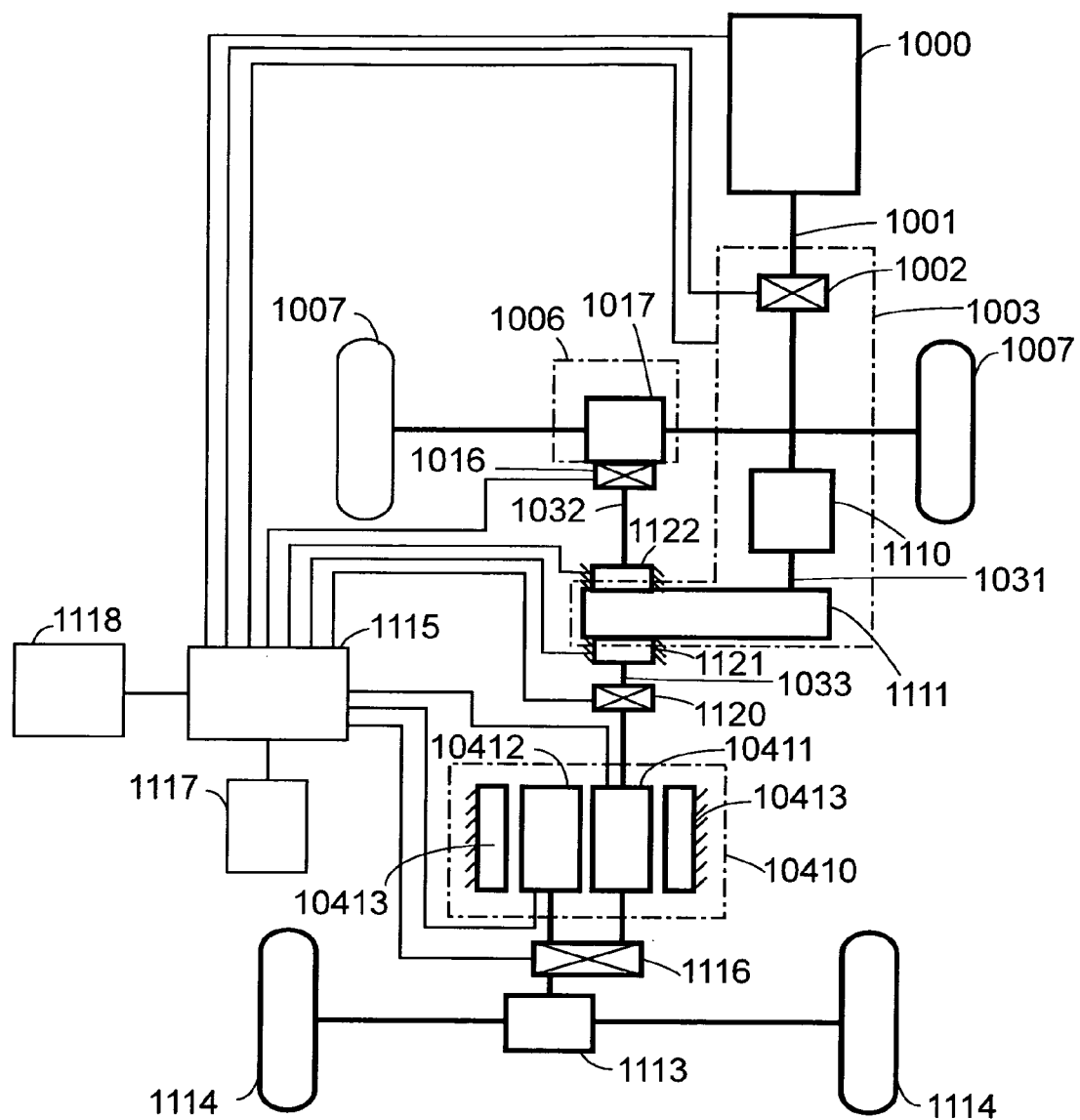
FIG. 17 is a schematic view of another preferred embodiment of the present invention showing that a controllable clutch is provided between the rotation part of the first electric machine and that of the second electric machine illustrated in FIG. 7.

FIG. 17 is a schematic view of another preferred embodiment of the present invention showing that a controllable clutch is provided between the rotation part of the first electric machine and that of the second electric machine illustrated in FIG. 7.

Figure 18:
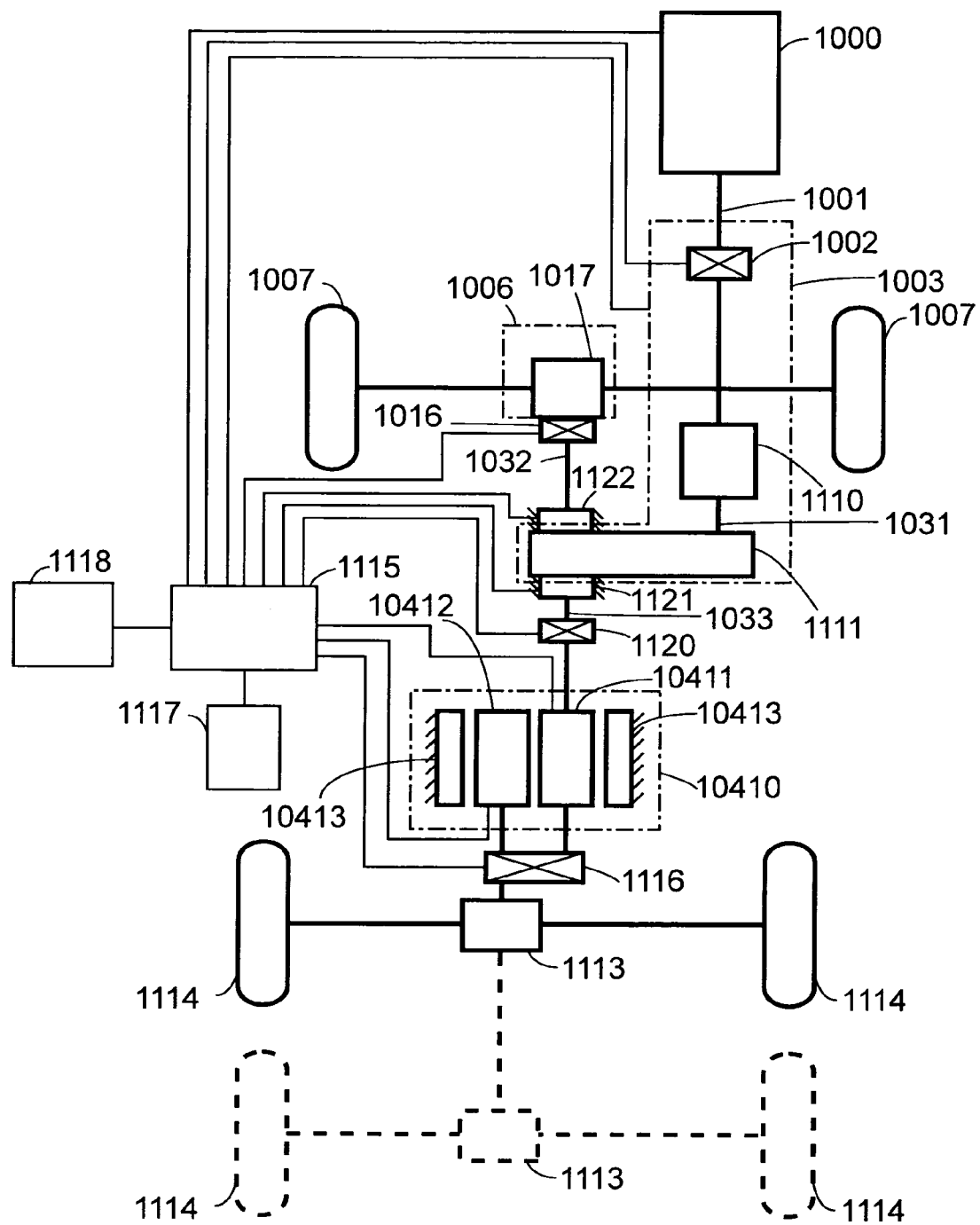
FIG. 18 is a schematic view of another preferred embodiment of the present invention showing that a controllable clutch is provided between the rotation part of the first electric machine and that of the second electric machine illustrated in FIG. 8.

FIG. 18 is a schematic view of another preferred embodiment of the present invention showing that a controllable clutch is provided between the rotation part of the first electric machine and that of the second electric machine illustrated in FIG. 8.

Figure 19:
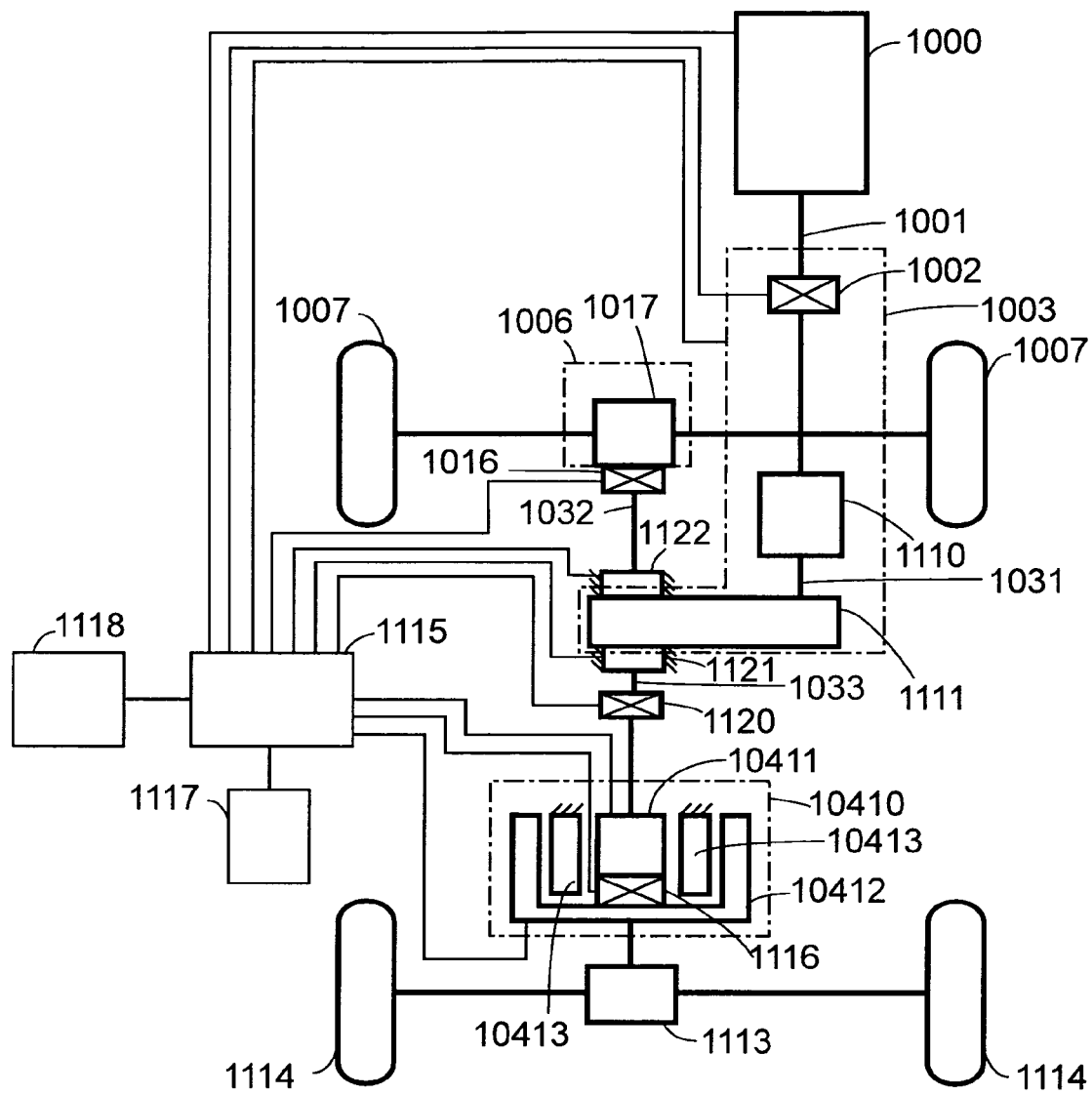
FIG. 19 is a schematic view of another preferred embodiment of the present invention showing that a controllable clutch is provided between the rotation part of the first electric machine and that of the second electric machine illustrated in FIG. 9.

FIG. 19 is a schematic view of another preferred embodiment of the present invention showing that a controllable clutch is provided between the rotation part of the first electric machine and that of the second electric machine illustrated in FIG. 9.

Figure 20:
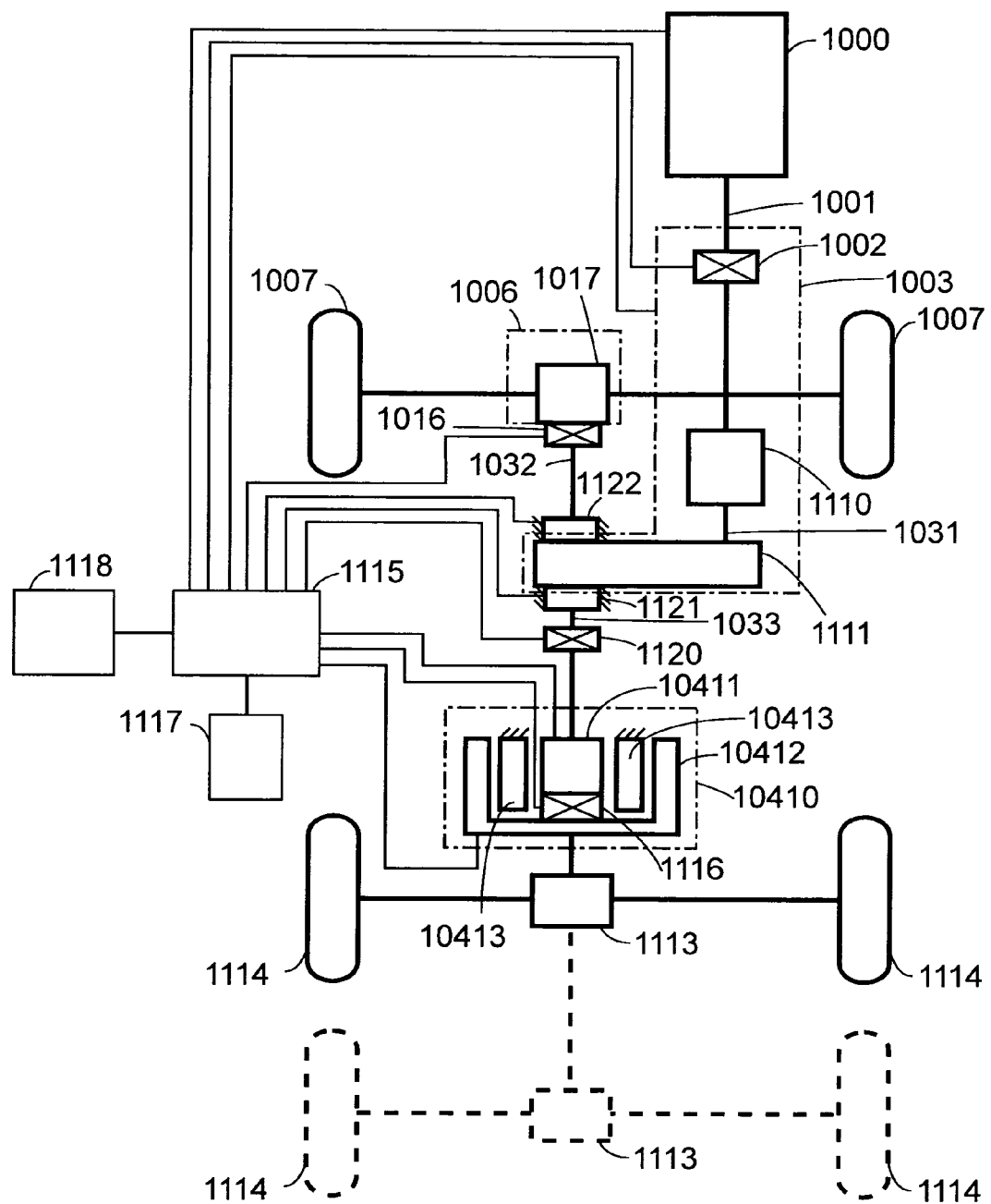
FIG. 20 is a schematic view of another preferred embodiment of the present invention showing that a controllable clutch is provided between the rotation part of the first electric machine and that of the second electric machine illustrated in FIG. 10.

FIG. 20 is a schematic view of another preferred embodiment of the present invention showing that a controllable clutch is provided between the rotation part of the first electric machine and that of the second electric machine illustrated in FIG. 10.

The controllable clutch 1116 illustrated in FIGS. 15 through 20 added to each preferred embodiment of the present invention includes that driven by manual, mechanical, electromagnetic, fluid or eccentric force, or one that is comprised of a one-way transmission; the controllable clutch 1116 is disposed between the rotation part 10411 of the first electric machine and the rotation part 10412 of the second electric machine of the rotational electric machine assembly 10410 and is subject to the control by the central controller 1118 to engage or disengage the rotation part 10411 of the first electric machine with or from the rotation part 10412 of the second electric machine; said controllable clutch 1116 may be optionally installed or not installed as required.

When the controllable clutch 1116 is elected to be disposed between the rotation part 10411 of the first electric machine and the rotation part 10412 of the second electric machine, the system provides any or all of the following functions:

(1) With the controllable clutch 1116 in engaged status, the rotational kinetic energy outputted from the differential output end 1033 of the intermediate differential gear set 1111 drives the rotation part 10411 of the first electric machine through another controllable clutch 1120, and then drives the rotation part 10412 of the second electric machine through the controllable clutch 1116 so to drive the rear end load 1114 through the rear end transmission 1113;

(2) With the controllable clutch 1116 in engaged status, the power outputted from the rechargeable device 1117 drives both rotation parts 10411, 10412 respectively of the first and the second electric machines to function as a motor through the control by the drive control device 1115; and (3) With the controllable clutch 1116 in engaged status, both rotation parts 10411, 10412 respectively of the first and the second electric machines are jointly drawn by the rotational power source 1000 or a load inertia to function as a generator with the power generated to charge the rechargeable device 1117 or supply power to any other power driven load through the drive control device 1115.

In practice, any of the differential generation power distribution is system illustrated in FIGS. 5 through 10 and FIGS. 15 through 20 may further include any or all of the following devices and functions to meet the individual application:

the controllable brake 1122 may be adapted to the differential output end 1032 of the intermediate differential gear set 1111, or the controllable clutch 1016 is provided before connecting the front end transmission 1006 to drive the front end load 1007 through the differential gear set 1017 of the front end transmission 1006; the controllable brake 1122 and the controllable clutch 1016 may be separately provided or sharing the same structure; either or both of said controllable brake 1122 and said controllable clutch 1016 may be optionally installed or not installed as required;

with the controllable clutch 1016 disposed between the differential output end 1032 of the intermediate differential gear set 1111 and the front end transmission 1006 in disengaged status, the controllable brake 1122 in braking status, the controllable clutch 1120 disposed between another differential output end 1033 of the intermediate differential gear set 1111 and the rotational electric machine assembly 10140 in engaged status, and the controllable brake 1121 in released status; the front end load 1007 indicates idling and the system drives the rear end load 1114;

the controllable 1121 as required may be adapted to another differential output end 1033 of the intermediate differential gear set 1111, or the controllable clutch 1120 may be provided before coupling to the input end of the rotation part 10411 of the first electric machine of the rotational electric machine assembly 10410; the controllable brake 1121 and the controllable clutch 1120 may be separately provided or sharing the same structure; either or both of said controllable brake 1121 and said controllable clutch 1120 may be optionally installed or not installed as required;

the controllable clutch 1120 disposed between the differential output end 1033 of the intermediate differential gear set 1111 and the rotational electric assembly 10410 is in disengaged status, the controllable brake 1121 is in braking status, and the controllable clutch 1016 disposed between the differential output end 1032 of the intermediate differential gear set 1111 and the front end transmission 1006 in engaged status, the controllable brake 1122 in released status; in the meantime, the rotational kinetic energy from the rotational power unit 1000 drives the front end load 1007 through the main transmission 1110, the differential output end 1032 of the intermediate differential device 1111, and the front end transmission 1006 leaving the rear end load 1114 to indicate skidding status; or (1) when the rechargeable device 1117 is provided, the power from the rechargeable device 1117 drives the rotation part 10412 of the second electric machine through the drive control device 1115 to function as a motor so that the power outputted from the rechargeable device 1117 directly or through the drive control device 1115 drives the rotation part 10412 of the second electric machine to function as a motor and to drive the rear end load 1114 at the same time while the rotational kinetic energy from the rotational power unit 1000 drives the front end load 1007;

(2) If the front end load 1007 and the rear end load 1114 are of an integrated load type, such as the load on ground, on surface or in water, the rotation part 10412 of the second electric machine is drawn by the rear end load 1114 to function as a generator when the rotational kinetic energy from the rotational power unit 1000 is driving the front end load 1007; and the power generated charges the rechargeable device 1117 or supplies power to any other power driven load;

with the controllable clutch 1016 disposed between the differential output end 1032 of the intermediate differential gear set 1111 and the front end transmission 1006 in engaged status, the controllable brake 1122 in released status, another controllable brake 1121 adapted to the other differential output end 1033 in released status; and the controllable clutch 1120 adapted in engaged status; the present invention provides the following functions:

(1) the rotational kinetic energy from the rotational power unit 1000 executes all wheels driving; or (2) when the rechargeable device 1117 is provided, the power from the rechargeable device 1117 drives the rotation part 10411 of the first electric machine or the rotation part 10412 of the second electric machine through the drive control device 1115 for either electric machine to execute all wheels driving alone or jointly with the rotational kinetic energy from the rotational power unit 1000;

with the controllable clutch 1016 disposed between the differential output end 1032 of the intermediate differential gear set 1111 and the front end transmission 1006 in disengaged status, the controllable brake 1122 in released status, the controllable brake adapted to the other differential output end 1033 in released status, the controllable clutch 1120 adapted to the input end of the rotational electric machine assembly 10410 in disengaged status; both of the front end and the rear end loads are left in skidding status; and in the course of deceleration or driving down slope or upon exercising a brake, either or both of the rotation parts 10411, 10412 respectively of the first electric machine and the second electric machine of the rotational electric machine assembly rotates to function as a generator when drawn by the load inertia with the power outputted to charge the rechargeable device 1117 or to supply power to any other power driven load through the drive control device 1115 while the counter torque created by the outputted power serves as the braking damp for the system;

the controllable clutch 1116 may be disposed as required at where between the rotation part 10411 of the first electric machine and the rotation part 10412 of the second electric machine of the rotational electric machine assembly 10410 so that when the controllable clutch 1116 is in engaged status, both rotation parts 10411, 10412 respectively of the first electric machine and the second electric machine are in coupled status; or in the absence of the controllable clutch 1116, the rotation part 10411 of the first electric machine and the rotation part 10412 of the second electric machine are separated from each other without being coupled for transmission; and with the controllable clutch 1116 disposed between the rotation part 10411 of the first electric machine and the rotation part 10412 of the second electric machine in engaged status, the rotational kinetic energy from the rotational power unit 1000 drives the rear end load 1114 through another controllable clutch 1002, the main transmission 1110, the intermediate differential gear set 1111, and the rotational electric machine assembly 10410 internally coupled to the controllable clutch 1116.

When the controllable clutch 1116 disposed between both rotation parts respectively of the first and the second electric machines 1041, 1042 in the rotational electric machine assembly 1040 as illustrated in FIGS. 11 through 14 is in engaged status to drive the rear end load 1114; or the controllable clutch 1116 disposed between both rotation parts 10411, 10412 respectively of the first and the second electric machines in the rotational electric machine assembly 10410 as illustrated in FIGS. 15 through 20 is in coupled status to drive the rear end load 1114; the inertial load becomes greater. For the optimized performance of the present invention to reduce the possibilities of the system operation response and the service life of the rotational electric machine assembly 1040 or 10410, and those transmission mechanical members including the controllable clutches to be affected by the increased inertial amount, a modified design by providing the transmission and the controllable clutch arranged in parallel to both input and output ends of the rotational kinetic energy of the rotational electric machine assembly as illustrated in FIGS. 24, 25, 26, and 27 may be provided.

Figure 24:
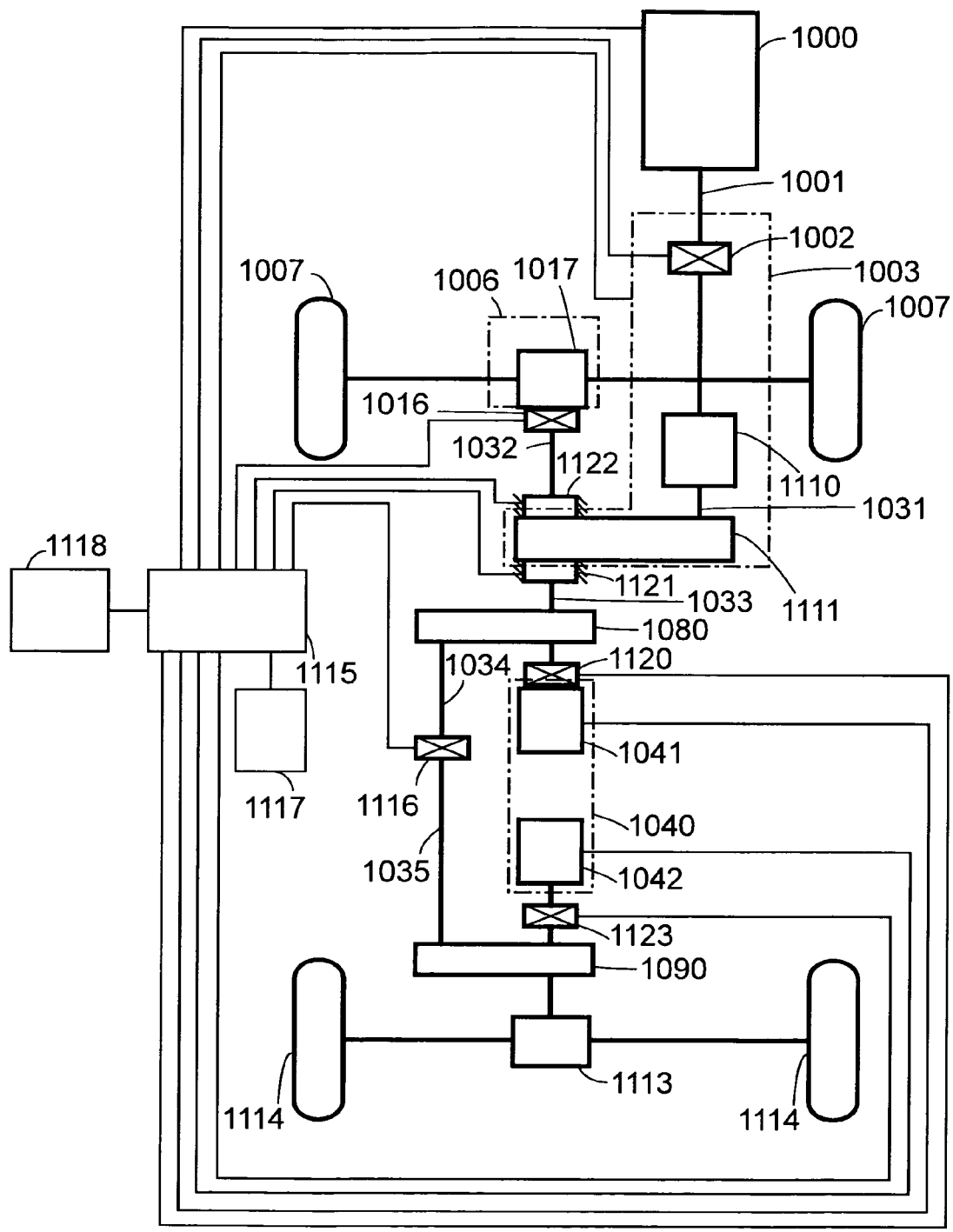
FIG. 24 is a schematic view showing both input and output ends of the rotational kinetic energy of the rotational electric machine assembly of FIG. 1 are disposed in parallel with a transmission and a controllable clutch.

FIG. 24 is a schematic view showing both input and output ends of the rotational kinetic energy of the rotational electric machine assembly of FIG. 1 are disposed in parallel with a transmission and a controllable clutch.

Figure 25:
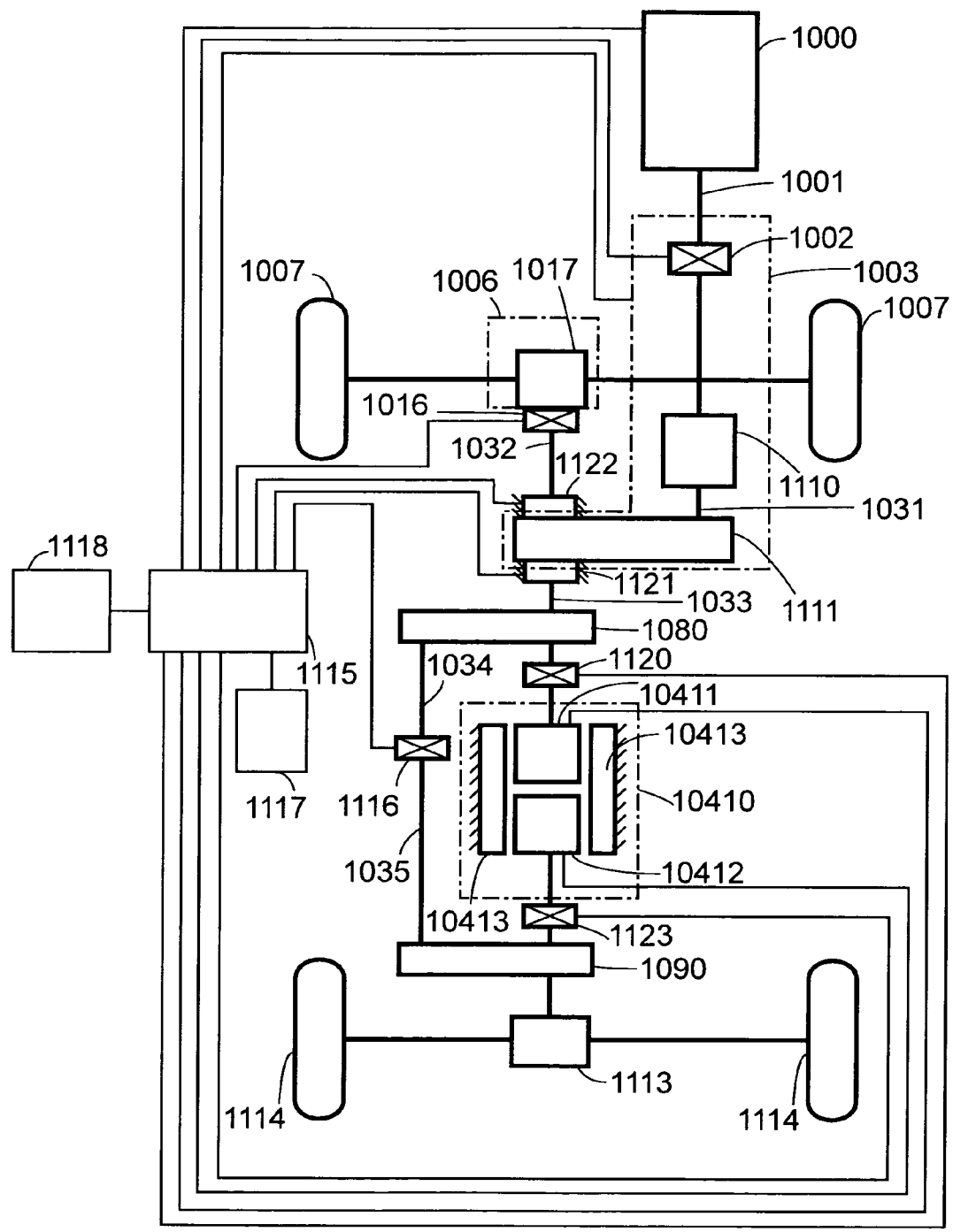
FIG. 25 is a schematic view showing both input and output ends of the rotational kinetic energy of the rotational electric machine assembly of FIG. 5 are disposed in parallel with a transmission and a controllable clutch.

FIG. 25 is a schematic view showing both input and output ends of the rotational kinetic energy of the rotational electric machine assembly of FIG. 5 are disposed in parallel with a transmission and a controllable clutch.

Figure 26:
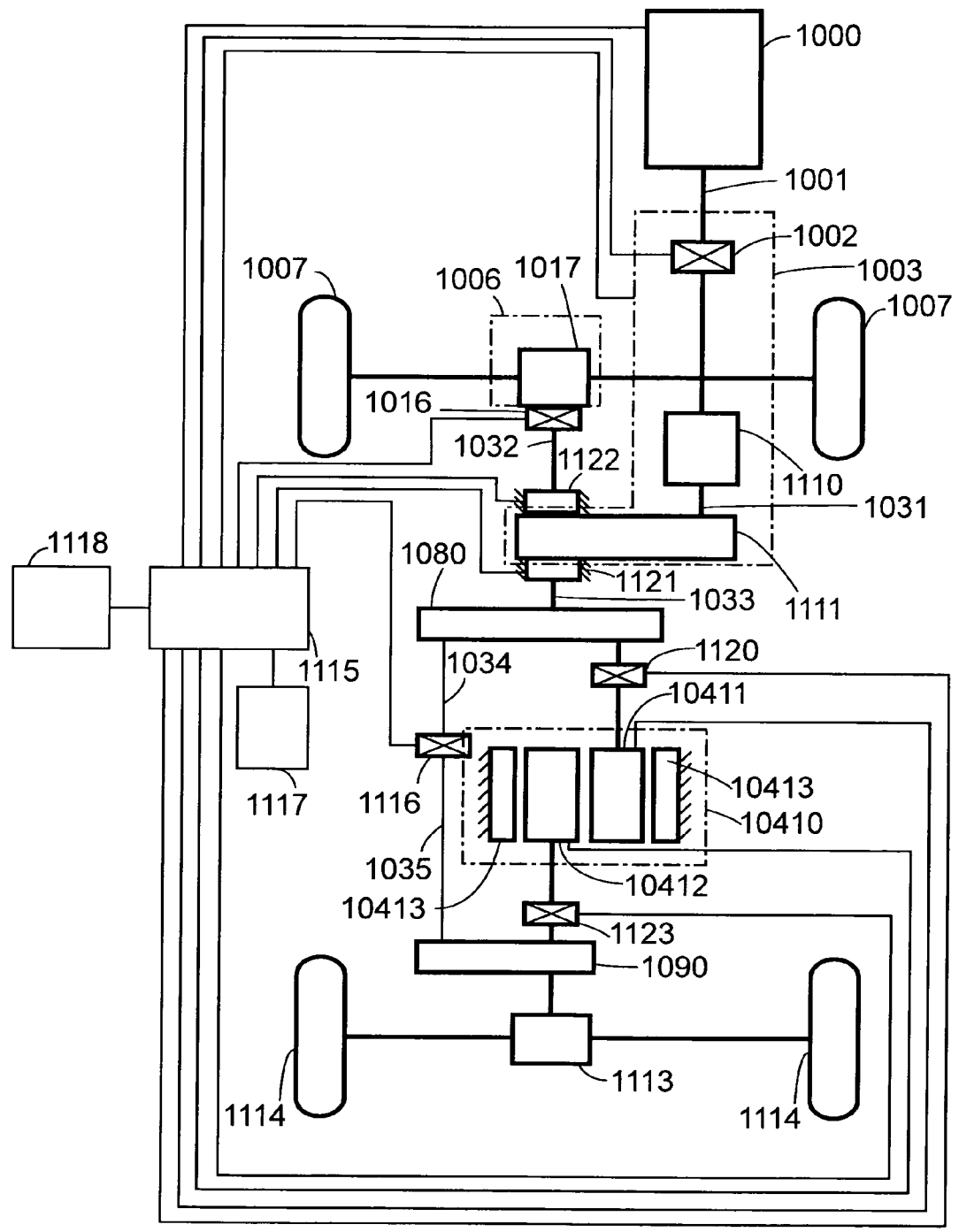
FIG. 26 is a schematic view showing both input and output ends of the rotational kinetic energy of the rotational electric machine assembly of FIG. 7 are disposed in parallel with a transmission and a controllable clutch.

FIG. 26 is a schematic view showing both input and output ends of the rotational kinetic energy of the rotational electric machine assembly of FIG. 7 are disposed in parallel with a transmission and a controllable clutch.

Figure 27:
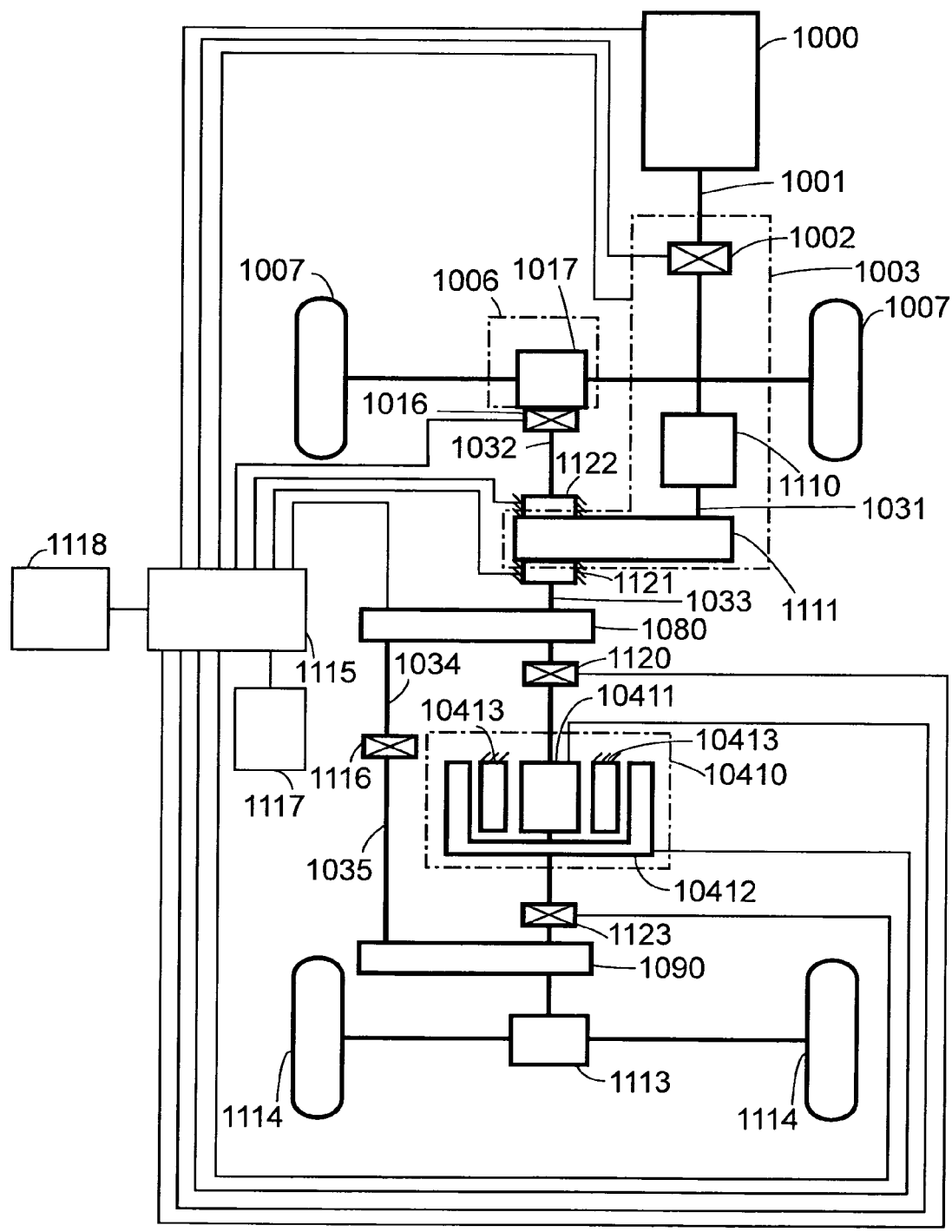
FIG. 27 is a schematic view showing both input and output ends of the rotational kinetic energy of the rotational electric machine assembly of FIG. 9 are disposed in parallel with a transmission and a controllable clutch.

FIG. 27 is a schematic view showing both input and output ends of the rotational kinetic energy of the rotational electric machine assembly of FIG. 9 are disposed in parallel with a transmission and a controllable clutch.

In the structure of the preferred embodiment as illustrated in FIG. 24, the transmission and the controllable clutch may be disposed in parallel to replace that illustrated in FIGS. 11 through 14, wherein, a controllable clutch is provided in series between both rotation parts respectively of the first and the second electric machines 1041, 1042. The related modification of structure is essentially comprised of:

a transmission 1080 is disposed between the differential output end 1033 of the intermediate differential gear set 1111 and the controllable clutch 1120, and an output end 1034 of the transmission 1080 is coupled to one operating end of the controllable clutch 1116;

a controllable clutch 1123 is disposed between the output end of the rotation part of the second electric machine 1042 of the rotational electric machine assembly 1040 and the rear end transmission 1113, another transmission 1090 is further provided between the controllable clutch 1123 and the rear end transmission 1113; and an output end 1035 of the transmission 1090 is coupled to another operating end of the controllable clutch 1116;

the transmission 1080 and the transmission 1090 are each comprised of gear, friction gear, pulley, gear pulley, chain, or fluidity transmission, or electromagnetic transmission or other transmission of the prior art for the structure to provide any or all of the following functions:

(1) With both controllable clutches 1116, 1016 disengaged and the controllable brake 1122 locked up to serve as the engine for the rotational power unit 1000, the engine as controlled is running at or approaching a fixed speed within the rpm area of the brake specific fuel consumption (BSFC) featuring comparatively higher energy efficiency and more fuel saving to drive the first electric machine 1041 to operate as a generator; the power generated drives the second electric machine 1042 to operate as a motor directly or through the control by the drive control device 1115, thus to further drive the load to start up from static condition and to execute accelerating operation;

(2) Should the system be provided with the rechargeable device 1117, both controllable clutches 1116, 1016 are disengaged and the controllable brake 1122 is locked up to serve as the engine for the rotational power unit 1000, the engine as controlled is running at or approaching a fixed speed within the rpm area of the brake specific fuel consumption (BSFC) featuring comparatively higher energy efficiency and more fuel saving to drive the first electric machine 1041 to operate as a generator; the power generated charges the unsaturated rechargeable device 1117 or is supplied to an external destination;

(3) With the system provided with the rechargeable device 1117, the system while providing the function as described in paragraph (1) charges the rechargeable device 1117 at the same time;

(4) With the system provided with the rechargeable device 1117, the system while providing the function as described in paragraph (1) drives the second electric machine 1042 jointly with the power from the rechargeable device 1117 directly or through the drive control device 1115 to further drive the load;

(5) When both of the controllable clutches 1120, 1123 are in disengaged status, and the controllable clutch 1116 is in engaged status, the rotational kinetic energy from the rotational power unit 1000 drives the rear end load 1114 through the controllable clutch 1116; meanwhile, both rotation parts respectively of the first and the second electric machines 1041, 1042 are in free status without being driven;

(6) When the controllable clutch 1123 is in disengaged status, and both of the controllable clutches 1120, 1116 are in engaged status, the rotational kinetic energy from the rotational power unit 1000 drives the rear end load 1114 through the controllable clutch 1116; meanwhile, the first electric machine 1041 is driven to function as a generator to charge the rechargeable device 1117 or supply power to other power driven load, and the second electric machine 1042 is left in free status without being driven;

(7) When the controllable clutch 1120 is in disengaged status, and both of the controllable clutches 1123, 1116 are in engaged status, the rotational kinetic energy from the rotational power unit 1000 drives the rear end load 1114 through the controllable clutch 1116; meanwhile, the second electric machine 1042 is driven to function as a generator to charge the rechargeable device 1117 or supply power to other power driven load;

(8) When the controllable clutch 1120 is in disengaged status, the controllable clutch 1123 is in engaged status, and the controllable clutch 1116 may be in engaged or disengaged status, thus while the carrier is driving down slope or exercising a brake the controllable clutch 1116 can be manipulated to be in engaged or disengaged status for the load side to reversely drive either or both of the first and the second electric machines 1041, 1042 for regenerating power to charge the rechargeable device 1117 or supply power to other power driven load;

(9) When all the controllable clutches 1120, 1123, 1116 are in engaged status, the rotational kinetic energy from the rotational power unit 1000 drives the rear end load 1114 through the controllable clutch 1116, either or both of the first and the second electric machines 1041, 1042 functions as a generator to charge the rechargeable device 1117 or supply power to other power driven load; and when the carrier is exercising deceleration or driving down slope, either or both of the first and the second electric machines 1041, 1042 functions as a generator subject to the control by those controllable clutches 1123, 1116, 1120 to charge the rechargeable device 1117 or supply power to other power driven load;

(10) When the controllable clutches 1120, 1116 are in disengaged status, and the controllable clutch 1123 is in engaged status, power form the rechargeable device 1117 drives the first electric machine 1041 directly or through the control by the drive control device 1115 to function as a motor to drive the rear end load 1114;

(11) When all the controllable clutches 1120, 1116, 1123 are in engaged status, power form the rechargeable device 1117 drives both of the first and the second electric machines 1041, 1042 directly or through the control by the drive control device 1115 for either or both of the first and the second electric machines 1041, 1042 to function as a motor; and

(12) Among those functions as described above, both of the controllable clutch 1120 that controls the first electric machine 1041 and the controllable clutch 1123 that controls the second electric machine 1042 may be in the disengaged status to facilitate exercising an emergency brake by reducing the inertial amount of the system.

In the structure of the preferred embodiment illustrated in FIGS. 25, 26, and 27, the transmission and the controllable clutch may be arranged in parallel to replace that illustrated in FIGS. 15 through 20, wherein, a controllable clutch is disposed to be series connected between both rotation parts 10411, 10412 respectively of the first and the second electric machines. The modification by the arrangement of the transmission and the controllable clutch in parallel is essentially comprised of:

the transmission 1080 is disposed between the differential output end 1033 of the intermediate differential gear set 1111 and the controllable clutch 1120, and the output end 1034 of the transmission 1080 is coupled to one operating end of the controllable clutch 1116;

the controllable clutch 1123 is disposed between the output end of the rotation part 10412 of the second electric machine of the rotational electric machine assembly 10410 and the rear end transmission 1113, another transmission 1090 is further provided between the controllable clutch 1123 and the rear end transmission 1113; and an output end 1035 of the transmission 1090 is coupled to another operating end of the controllable clutch 1116;

both of the transmission 1080 and the transmission 1090 are each comprised of gear, friction gear, pulley, gear pulley, chain, or fluidity transmission, or electromagnetic transmission or other transmission of the prior art for the structure to provide any or all of the following functions:

(1) With both controllable clutches 1116, 1016 disengaged and the controllable brake 1122 locked up to serve as the engine for the rotational power unit 1000, the engine as controlled is running at or approaching a fixed speed within the rpm area of the brake specific fuel consumption (BSFC) featuring comparatively higher energy efficiency and more fuel saving to drive the rotation part 10411 of the first electric machine to operate as a generator; the power generated drives the rotation part 10412 of the second electric machine to operate as a motor directly or through the control by the drive control device 1115, thus to further drive the load to start up from static condition and to execute accelerating operation;

(2) Should the system be provided with the rechargeable device 1117, both controllable clutches 1116, 1016 are disengaged and the controllable brake 1122 is locked up to serve as the engine for the rotational power unit 1000, the engine as controlled is running at or approaching a fixed speed within the rpm area of the brake specific fuel consumption (BSFC) featuring comparatively higher energy efficiency and more fuel saving to drive the rotation part 10411 of the first electric machine to operate as a generator; the power generated charges the unsaturated rechargeable device 1117 or is supplied to an external destination;

(3) With the system provided with the rechargeable device 1117, the system while providing the function as described in paragraph (1) charges the rechargeable device 1117 at the same time;

(4) With the system provided with the rechargeable device 1117, the system while providing the function as described in paragraph (1) drives the rotation part 10412 of the second electric machine jointly with the power from the rechargeable device 1117 to further drive the load;

(5) When both of the controllable clutches 1120, 1123 are in disengaged status, and the controllable clutch 1116 is in engaged status, the rotational kinetic energy from the rotational power unit 1000 drives the rear end load 1114 through the controllable clutch 1116; meanwhile, both rotation parts 10411, 10412 respectively of the first and the second electric machines are in free status without being driven;

(6) When the controllable clutch 1123 is in disengaged status, and both of the controllable clutches 1120, 1116 are in engaged status, the rotational kinetic energy from the rotational power unit 1000 drives the rear end load 1114 through the controllable clutch 1116; meanwhile, the rotation part 10411 of the first electric machine is driven to function as a generator to charge the rechargeable device 1117 or supply power to other power driven load, and the rotation part 10412 of the second electric machine is left in free status without being driven;

(7) When the controllable clutch 1120 is in disengaged status, and both of the controllable clutches 1123, 1116 are in engaged status, the rotational kinetic energy from the rotational power unit 1000 drives the rear end load 1114 through the controllable clutch 1116; meanwhile, the rotation part 10412 of the second electric machine is driven to function as a generator to charge the rechargeable device 1117 or supply power to other power driven load;

(8) When the controllable clutch 1120 is in disengaged status, the controllable clutch 1123 is in engaged status, and the controllable clutch 1116 may be in engaged or disengaged status, thus while the carrier is driving down slope or exercising a brake the controllable clutch 1116 can be manipulated to be in engaged or disengaged status for the load side to reversely drive either or both rotation parts 10411, 10412 respectively of the first and the second electric machines for regenerating power to charge the rechargeable device 1117 or supply power to other power driven load;

(9) When all the controllable clutches 1120, 1123, 1116 are in engaged status, the rotational kinetic energy from the rotational power unit 1000 drives the rear end load 1114 through the controllable clutch 1116, either or both rotation parts 10411, 10412 respectively of the first and the second electric machines functions as a generator to charge the rechargeable device 1117 or supply power to other power driven load; and when the carrier is exercising deceleration or driving down slope, either or both rotation parts 10411, 10412 respectively of the first and the second electric machines functions as a generator subject to the control by those controllable clutches 1123, 1116, 1120 to charge the rechargeable device 1117 or supply power to other power driven load;

(10) When the controllable clutches 1120, 1116 are in disengaged status, and the controllable clutch 1123 is in engaged status, power form the rechargeable device 1117 drives the rotation part 10411 of the first electric machine directly or through the control by the drive control device 1115 to function as a motor to drive the rear end load 1114;

(11) When all the controllable clutches 1120, 1116, 1123 are in engaged status, power form the rechargeable device 1117 drives directly or through the control by the drive control device 1115 either or both of rotation parts 10411, 10412 respectively of the first and the second electric machines to function as a motor; and

(12) Among those functions as described above, both of the controllable clutch 1120 that controls the rotation part 10411 of the first electric machine and the controllable clutch 1123 that controls the rotation part 10412 of the second electric machine may be in the disengaged status to facilitate exercising an emergency brake by reducing the inertial amount of the system.

The differential generation power distribution system, as the preferred embodiment of the rotational electric machine assembly 10410 stated above in FIGS. 19, 20, 23, and 27, comprises the intermediate layer electric machine structure provided with the electric machine static part 10413 sharing the common magnetic path, for providing the rotation part 10411 of the first electric machine consists of the inner ring layer electric machine structure and the rotation part 10412 of the second electric machine consists of the outer ring layer electric machine structure, for the rotational interaction of electromagnetic effect.

Figure 28:
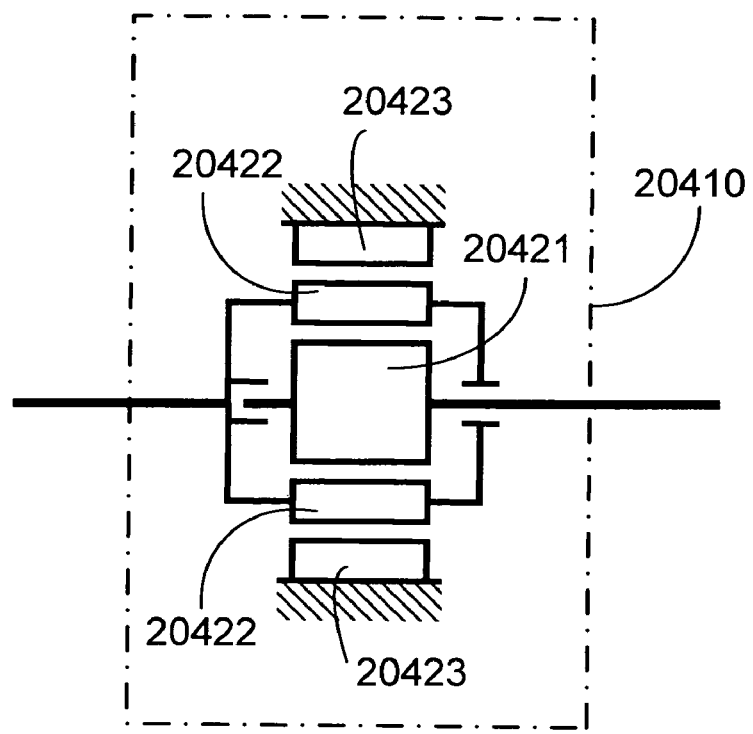
FIG. 28 is a schematic view of the preferred embodiment of present invention showing the outer ring layer of the outer ring layer fixed rotational electric machine assembly as the electric machine static part and the intermediate layer electric structure and inner ring layer electric machine structure as the electric machine rotation part of the first and the second electric machine.

However, due to the structural needs the differential generation power distribution system of which the rotational electric machine assembly 10410 can be further replaced by the outer ring layer fixed rotational electric machine assembly 20410. FIG. 28 shows the outer ring layer electric machine structure is provided as the static part and the intermediate layer electric machine structure and the inner ring layer electric machine structure are provided as rotation part, so that the intermediate layer electric machine structure and the inner ring layer electric machine structure are respectively as the rotation part of the first electric machine and the rotation part of the second electric machine, thereby the outer ring layer electric machine structure, the intermediate layer electric machine structure and the inner ring layer electric machine structure coaxially execute rotational interaction of electromagnetic effect.

FIG. 28 is the preferred embodiment illustrating that the outer ring layer of the outer ring layer fixed rotational electric machine assembly 20410 is provided as the electric machine static part and the intermediate layer electric machine structure and the inner ring layer electric machine structure are provided as the rotation part of the first and second electric machines respectively.

As shown in FIG. 28:

The outer ring layer fixed rotational electric machine assembly 20410 is a three-layer ring electric machine structure, wherein it is comprised of:

the rotational electric machine function of the outer ring layer electric machine structure 20423 and the intermediate layer electric machine structure 20422 sharing a common magnetic path can comprise the power generator or electric machine functions consisting of alternating current or direct current, with or without brush, synchronous or asynchronous electric machine structures; wherein the outer ring layer electric machine structure 20423 is the static part;

the intermediate layer electric machine structure 20422 sharing a common magnetic path can be a rotational electric machine structure provided with an inner ring surface and an outer ring surface, thereby constituted by the electric machine structure with inner and outer electromagnetic effect surfaces;

wherein the intermediate layer electric machine structure 20422 faces the outer ring surface of the outer ring electric machine structure 20423 for providing rotational interaction of electromagnetic effect with the outer ring layer electric machine structure 20423;

the intermediate electric machine structure 20422 faces the inner ring surface of the inner ring electric machine structure 20421 for providing rotational interaction of electromagnetic effect with the inner ring layer electric machine structure 20421;

the inner ring layer electric machine structure 20421 can be a rotational electric machine structure, wherein the electric machine function with the intermediate layer electric machine structure 20422 sharing a common magnetic path can be the generator or electric machinery function constituted by alternating current or direct current, with or without brush, synchronous or asynchronous electric machine structure.

the above stated inner ring layer electric machine structure 20421 and the intermediate ring layer electric machine structure 20422, depending on the need, can elect one rotational electric machine structure as the rotation part of the first electric machine whereas the other one as the rotation part of the second electric machine.

Figure 29:
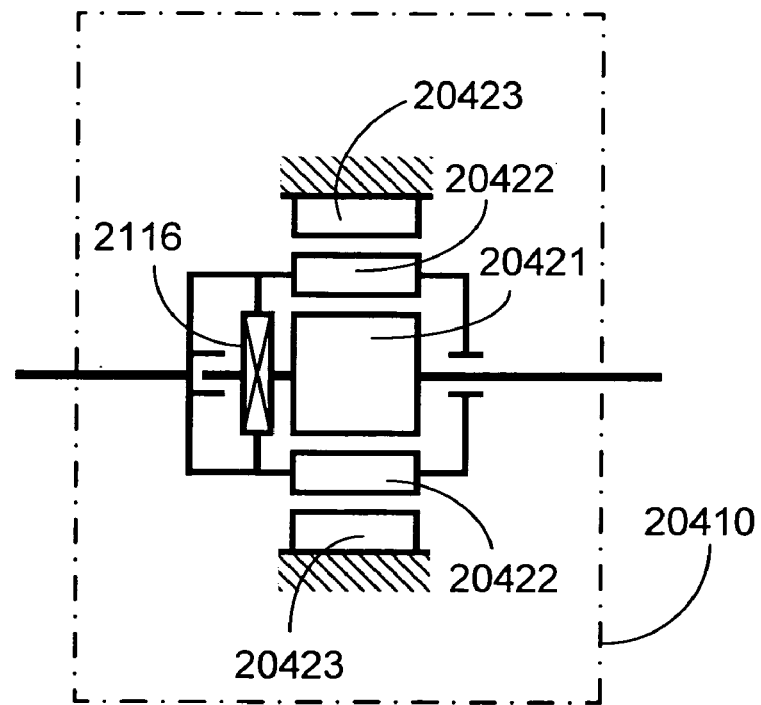
FIG. 29 is a schematic view of the preferred embodiment of present invention showing the outer ring layer of fixed rotational electric machine assembly as electric machine static part and the intermediate layer electric machine structure and inner ring layer electric machine structure as rotation part of electric machine of the first and second electric machine devices whereas a controllable clutch can be disposed between the intermediate layer electric machine structure and the inner ring layer electric machine structure.

As shown in FIG. 28 stated above, the outer ring layer fixed rotational electric machine assembly 20410 uses the outer ring layer electric machine structure 20423 as the static part and the intermediate layer electric machine structure 20422 and the inner ring layer electric machine structure 20411 as the rotation part, so as to provide the intermediate layer electric machine structure 20422 and the inner ring layer electric machine structure 20421 as the rotation part 10411 of the first electric machine and the rotation part 10412 of the second electric machine respectively of the original rotational electric machine assembly 10410, and the outer ring layer electric machine structure 20423, the intermediate layer electric machine structure 20422 and the inner ring layer electric machine structure 20421 of the outer ring layer fixed rotational electric machine assembly 20410 coaxially execute rotational interaction of electromagnetic effect. This outer ring layer fixed rotational electric machine assembly 20410 can be further selectively disposed a controllable clutch 2116 between the intermediate layer electric machine structure 20422 and the inner ring layer electric machine structure 20421 for providing the controlling operation of various functions;

FIG. 29 is the embodiment illustrating that the outer ring layer of the outer ring layer fixed rotational machine assembly 20410 is provided as the electric machine static part, whereas the intermediate layer electric machine structure and the inner ring layer electric machine structure are provided as the rotation part of the first and second electric machines respectively, and a controllable clutch is disposed between the intermediate layer electric machine structure and the inner ring layer electric machine structure.

As shown in FIG. 29:

The outer ring layer fixed rotational electric machine assembly 20410 is a three-layer ring electric machine structure, wherein the constitutions to further dispose the controllable clutch structure including:

the rotational electric machine function of the outer ring layer electric machine structure 20423 and the intermediate layer electric machine structure 20422 sharing a common magnetic path can comprise the power generator or electric machine functions consisting of alternating current or direct current, with or without brush, synchronous or asynchronous electric machine structures; wherein the outer ring layer electric machine structure 20423 is the static part;

the intermediate layer electric machine structure 20422 sharing a common magnetic path can be a rotational electric machine structure provided with an inner ring surface and an outer ring surface, thereby constituted by the electric machine structure with inner and outer electromagnetic effect surfaces;

wherein the intermediate layer electric machine structure 20422 faces the outer ring surface of the outer ring layer electric machine structure 20423 for providing rotational interaction of electromagnetic effect with the outer ring layer electric machine structure 20423; the intermediate layer electric machine structure 20422 faces the inner ring surface of the inner ring layer electric machine structure 20421 for providing rotational interaction of electromagnetic effect with the inner ring layer electric machine structure 20421;

the inner ring layer electric machine structure 20421 can be a rotational electric machine structure, wherein the electric machine function with the intermediate layer electric machine structure 20422 sharing a common magnetic path can be the generator or electric machinery function constituted by alternating current or direct current, with or without brush, synchronous or asynchronous electric machine structure.

the controllable clutch 2116 can be the clutch driven by manual, or mechanical force, or electromagnetic force, or fluid force, or centrifugal force, or constituted by the one-way transmission;

this clutch is disposed between the intermediate layer electric machine structure 20422 and the inner ring layer electric machine structure 20421 for receiving control as engaging or disengaging operation;

the above stated inner ring layer electric machine structure 20421 and intermediate ring layer electric machine structure 20422 can, depending on the need, elect one rotational electric machine structure as the rotation part of the first electric machine whereas the other one as the rotation part of the second electric machine.

This differential generation power distribution system in practical implementation, depending on the structural requirements, the preferred embodiments stated above under invariant function the structural relationship of each constituent can be flexibly assembled as needed;

This differential generation power distribution system, as shown in the preferred embodiments of FIG. 1~FIG. 2, its rotational electric machine assembly 1040 can be disposed to the methods stated below according to the structural requirements:

(1) the rotational electric machine assembly 1040 can share the same structure with the rear end transmission 1113; or (2) the rotational electric machine assembly 1040 can share the same structure with the intermediate transmission and control interface 1003; or (3) the rotational electric machine assembly 1040 can be disposed independently between the intermediate transmission and control interface 1003 and the rear end transmission 1113; or (4) the first electric machine 1041 and the second electric machine 1042 can be individually independent, wherein the first electric machine 1041 is sharing the same structure with the intermediate transmission and control interface 1003 while the second electric machine 1042 is sharing the same structure with the rear end transmission 1113.

In the preferred embodiments illustrated in FIG. 1~FIG. 2 stated previously, the controllable brake 1121 and the controllable clutch 1120 can be disposed to the methods below according to the structural requirements:

(1) the controllable brake 1121 can be disposed to the intermediate transmission and control interface 1003; or (2) the controllable brake 1121 can be disposed together with the controllable clutch 1120 between the intermediate transmission and control interface 1003; or (3) the controllable clutch 1120 can be disposed to the first electric machine 1041; or (4) the controllable clutch 1120 can be disposed together with the controllable brake 1121 to the first electric machine 1041; or (5) the controllable clutch 1120 and the controllable brake 1121 can share the same structure;

(6) the controllable clutch 1120 can be disposed independently; or (7) the controllable brake 1121 can be disposed independently; or (8) the controllable clutch 1120 and the controllable brake 1121 are sharing the same structure and disposed between the intermediate transmission and control interface 1003 and the first electric machine 1041;

(9) the controllable clutch 1120 can be disposed to the first electric machine 1041 while the controllable brake 1121 can be disposed to the intermediate transmission and control interface 1003.

In the preferred embodiments illustrated in FIG. 1~FIG. 2 stated previously, the controllable clutch 1002 can be disposed to the methods below according to the structural requirements:

(1) the controllable clutch 1002 can be disposed to the rotational power unit 1000; or (2) the controllable clutch 1002 can be disposed to the intermediate transmission and control interface 1003; or (3) the controllable clutch 1002 can be disposed independently between the rotational power unit 1000 and the intermediate transmission and control interface 1003.

In the preferred embodiments illustrated in FIG. 1~FIG. 2 stated previously, the controllable brake 1122 and the controllable clutch 1016 can be disposed to the methods below according to the structural requirements:

(1) the controllable brake 1122 can be disposed to the intermediate transmission and control interface 1003; or (2) the controllable brake 1122 and the controllable clutch 1016 can be disposed to the intermediate transmission and control interface 1003; or (3) the controllable clutch 1016 can be disposed to the front end transmission 1006; or (4) the controllable brake 1122 and the controllable clutch 1016 can jointly disposed to the front end transmission 1006; or (5) the controllable brake 1122 and the controllable clutch 1016 can share the same structure; or
(6) the controllable brake 1122 can be disposed independently;
(7) the controllable clutch 1016 can be disposed independently;
(8) the controllable brake 1122 and the controllable clutch 1016 are sharing the same structure and disposed between the intermediate transmission and control interface 1003 and the front end transmission 1006; or
(9) the controllable brake 1122 can be disposed to the intermediate transmission and control interface 1003 while the differential output end 1032 can be disposed to the front end transmission 1006.

The differential generation power distribution system, as shown in the preferred embodiments of FIG. 3~FIG. 4, the first electric machine 1041 and the second electric machine 1042 can be disposed to the methods below depending on the structural requirements:
(1) the first electric machine 1041 can share the same structure with the intermediate transmission and control interface 1003; or
(2) the second electric machine 1042 can share the same structure with the rear end load 1114.

In the preferred embodiments illustrated in FIG. 3~FIG. 4 stated previously, the controllable brake 1121 and controllable clutch 1120 can be disposed to the method below according to the structural requirements:
(1) the controllable brake 1121 can be disposed to the first electric machine 1041; or
(2) the controllable brake 1121 can be together with the controllable clutch 1120 disposed to the intermediate transmission and control interface 1003; or
(3) the controllable clutch 1120 can be disposed to the first electric machine 1041; or
(4) the controllable clutch 1120 can be disposed together with the controllable brake 1121 to the first electric machine 1041; or
(5) the controllable clutch 1120 and the controllable brake 1121 can share the same structure; or
(6) the controllable clutch 1120 can be disposed independently; or
(7) the controllable brake 1121 can be disposed independently; or
(8) the controllable clutch 1120 and the controllable brake 1121 are sharing the same structure and disposed between the intermediate transmission and control interface 1003 and the first electric machine 1041; or
(9) The controllable clutch 1120 is disposed to the first electric machine 1041 while the controllable brake 1121 is disposed to the intermediate transmission and control interface 1003.

In the preferred embodiments illustrated in FIG. 3~FIG. 4 stated previously, the controllable clutch 1002 can be disposed to the methods below according to the structural requirements:
(1) the controllable clutch 1002 can be disposed to the rotational power unit 1000; or
(2) the controllable clutch 1002 can be disposed to the intermediate transmission and control interface 1003; or
(3) the controllable clutch 1002 can be disposed independently between the rotational power unit 1000 and the intermediate transmission and control interface 1003.

In the preferred embodiments illustrated in FIG. 3~FIG. 4 stated previously, the controllable brake 1122 and the controllable clutch 1016 can be disposed to the methods below according to the structural requirements:
(1) the controllable brake 1122 can be disposed to the intermediate transmission and control interface 1003; or
(2) the controllable brake 1122 and the controllable clutch 1016 can be disposed to the intermediate transmission and control interface 1003; or
(3) the controllable clutch 1016 is disposed to the front end transmission 1006; or
(4) the controllable brake 1122 and the controllable clutch 1016 are jointly disposed to the front end transmission 1006; or
(5) the controllable brake 1122 and the controllable clutch 1016 can share the same structure; or
(6) the controllable brake 1122 can be disposed independently; or
(7) the controllable clutch 1016 can be disposed independently; or
(8) the controllable brake 1122 and the controllable clutch 1016 are sharing the same structure and disposed between the intermediate transmission and control interface 1003 and the front end transmission 1006; or
(9) the controllable brake 1122 is disposed to the intermediate transmission and control interface 1003 while the controllable clutch 1016 is disposed to the front end transmission 1006.

This differential generation power distribution system, as shown in the preferred embodiments of FIG. 5~FIG. 10, the rotational electric machine assembly 10410 can be disposed to the methods below depending on the structural requirements;
(1) the rotational electric machine assembly 10410 can share the same structure with the rear end transmission 1113; or
(2) the rotational electric machine assembly 10410 can share the same structure with the intermediate transmission and the intermediate transmission and control interface 1003; or
(3) the rotational electric machine assembly 10410 can be disposed independently between the intermediate transmission and control interface 1003 and the rear end transmission 1113.

In the preferred embodiments illustrated in FIG. 5~FIG. 10 stated previously, the controllable brake 1121 and the controllable clutch 1120 can be disposed to the methods below according to the structural requirements:
(1) the controllable brake 1121 can be disposed to the intermediate transmission and control interface 1003; or
(2) the controllable brake 1121 can be disposed together with the controllable clutch 1120 in the intermediate transmission and control interface 1003; or
(3) the controllable clutch 1120 can be disposed to the rotation part 10411 of the first electric machine; or
(4) the controllable clutch 1120 can be disposed together with the controllable brake 1121 in the rotation part 10411 of the first electric machine; or
(5) the controllable clutch 1120 and the controllable brake 1121 can share the same structure; or
(6) the controllable clutch 1120 can be disposed independently; or
(7) the controllable brake 1121 can be disposed independently; or
(8) the controllable clutch 1120 and the controllable brake 1121 are sharing the same structure and disposed between the intermediate transmission and control interface 1003 and the rotation part 10411 of the first electric machine;
(9) the controllable clutch 1120 can be disposed to the rotation part 10411 of the first electric machine while the controllable brake 1121 can be disposed to the intermediate transmission and control interface 1003.

In the preferred embodiments illustrated in FIG. 5~FIG. 10 stated previously, the controllable clutch 1002 can be disposed to the methods below according to the structural requirements:

(1) the controllable clutch 1002 can be disposed to the rotational power unit 1000; or
(2) the controllable clutch 1002 can be disposed to the intermediate transmission and control interface 1003; or
(3) the controllable clutch 1002 can be disposed independently between the rotational power unit 1000 and the intermediate transmission and control interface 1003.

In the preferred embodiments illustrated in FIG. 5~FIG. 10 stated previously, the controllable brake 1122 and controllable clutch 1016 can be disposed to the methods below according to the structural requirements:

(1) the controllable brake 1122 can be disposed to the intermediate transmission and control interface 1003; or
(2) the controllable brake 1122 and the controllable clutch 1016 can be disposed to the intermediate transmission and control interface 1003; or
(3) the controllable clutch 1016 is disposed to the front end transmission 1006; or
(4) the controllable brake 1122 and the controllable clutch 1016 can be jointly disposed to the front end transmission 1006; or
(5) the controllable brake 1122 and the controllable clutch 1016 can share the same structure; or
(6) the controllable brake 1122 can be disposed independently;
(7) the controllable clutch 1016 can be disposed independently;
(8) the controllable brake 1122 and the controllable clutch 1016 are sharing the same structure and disposed between the intermediate transmission and control interface 1003 and the front end transmission 1006; or
(9) the controllable brake 1122 is disposed to the intermediate transmission and control interface 1003 while the differential output end 1032 is disposed to the front end transmission 1006.

This differential generation power distribution system, as shown in the preferred embodiments of FIG. 11~FIG. 12, its rotational electric machine assembly 1040 can be disposed to the methods below according to the structural requirements:

(1) the rotational electric machine assembly 1040 can share the same structure with the rear end transmission 1113; or
(2) the rotational electric machine assembly 1040 can share the same structure with the intermediate transmission and control interface 1003; or
(3) the rotational electric machine assembly 1040 can be disposed independently between the intermediate transmission and control interface 1003 and the rear end transmission 1113; or
(4) the second electric machine 1042 can share the same structure with the rear end transmission 1113 independently.

In the preferred embodiments illustrated in FIG. 11~FIG. 12 stated previously, the controllable brake 1121 and the controllable clutch 1120 can be disposed to the methods below according to the structural requirements:

(1) the controllable brake 1121 can be disposed to the intermediate transmission and control interface 1003; or
(2) the controllable brake 1121 can be disposed together with the controllable clutch 1120 in the intermediate transmission and control interface 1003; or
(3) the controllable clutch 1120 can be disposed to the first electric machine 1041; or
(4) the controllable clutch 1120 can be disposed together with the controllable brake 1121 in the first electric machine 1041; or
(5) the controllable clutch 1120 and the controllable brake 1121 can share the same structure; or
(6) the controllable clutch 1120 can be disposed independently; or
(7) the controllable brake 1121 can be disposed independently; or
(8) the controllable clutch 1120 and the controllable brake 1121 are sharing the same structure and disposed between the intermediate transmission and control interface 1003 and the first electric machine 1041;
(9) the controllable clutch 1120 is disposed to the first electric machine 1041 while the controllable brake 1121 is disposed to the intermediate transmission and control interface 1003.

In the preferred embodiments illustrated in FIG. 11~FIG. 12 stated previously, the controllable clutch 1002 can be disposed to methods is below according to the structural requirements:

(1) the controllable clutch 1002 can be disposed to the rotational power unit 1000; or
(2) the controllable clutch 1002 can be disposed to the intermediate transmission and control interface 1003; or
(3) the controllable clutch 1002 can be disposed independently between the rotational power unit 1000 and the intermediate transmission and control interface 1003.

In the preferred embodiments illustrated in FIG. 11~FIG. 12 stated previously, the controllable brake 1122 and the controllable clutch 1016 can be disposed to the below method according to the structural requirements:

(1) the controllable brake 1122 is disposed to the intermediate transmission and control interface 1003;
(2) the controllable brake 1122 and the controllable clutch 1016 are disposed to the intermediate transmission and control interface 1003; or
(3) the controllable clutch 1016 is disposed to the front end transmission 1006; or
(4) the controllable brake 1122 and the controllable clutch 1016 are jointly disposed to the front end transmission 1006; or
(5) the controllable brake 1122 and the controllable clutch 1016 can share the same structure; or
(6) the controllable brake 1122 can be disposed independently;
(7) the controllable clutch 1016 can be disposed independently;
(8) the controllable brake 1122 and the controllable clutch 1016 are sharing the same structure and disposed between the intermediate transmission and control interface 1003 and the front end transmission 1006; or
(9) the controllable brake 1122 is disposed to the intermediate transmission and control interface 1003 while the differential output end 1032 is disposed to the front end transmission 1006.

The differential generation power distribution system, as shown in the preferred embodiments of FIG. 13~FIG. 14, the first electric machine 1041 can be disposed to below methods according to the structural requirements:

(1) the first electric machine 1041 can share the same structure with the controllable clutch 1116 and the rear end transmission 1113; or
(2) the first electric machine 1041 can share the same structure with the intermediate transmission and control interface 1003; or (3) the first electric machine 1041 can be disposed independently between the intermediate transmission and control interface 1003 and the rear end transmission 1113.

In the preferred embodiments illustrated in FIG. 13~FIG. 14 stated previously, the controllable brake 1121 and the controllable clutch 1120 can be disposed to the below method according to the structural requirements:
(1) the controllable brake 1121 can be disposed to the intermediate transmission and control interface 1003; or
(2) the controllable brake 1121 can be disposed together with the controllable clutch 1120 to the intermediate transmission and control interface 1003; or
(3) the controllable clutch 1120 can be disposed to the first electric machine 1041; or
(4) the controllable clutch 1120 can be disposed together with the controllable brake 1120 to the first electric machine 1041; or
(5) the controllable clutch 1120 and the controllable brake 1121 can share the same structure; or
(6) the controllable clutch 1120 can be disposed independently; or
(7) the controllable brake 1121 can be disposed independently; or
(8) the controllable clutch 1120 are sharing the same structure with the controllable brake 1121 and disposed between the intermediate transmission and control interface 1003 and the first electric machine 1041; or
(9) the controllable clutch 1120 can be disposed to the first electric machine 1041 while the controllable brake 1121 can be disposed to the intermediate transmission and control interface 1003;

In the preferred embodiments illustrated in FIG. 13~FIG. 14 stated previously, the controllable clutch 1002 can be disposed to below methods according to the structural requirements:
(1) the controllable clutch 1002 can be disposed to rotational power unit 1000; or
(2) the controllable clutch 1002 can be disposed to the intermediate transmission and control interface 1003; or
(3) the controllable clutch 1002 can be disposed independently between the rotational power unit 1000 and the intermediate transmission and control interface 1003.

In the preferred embodiments illustrated in FIG. 13~FIG. 14 stated previously, the controllable brake 1122 and the controllable clutch 1016 can be disposed to below methods according to the structural requirements:
(1) the controllable brake 1122 is disposed to the intermediate transmission and control interface 1003; or
(2) the controllable brake 1122 and the controllable clutch 1016 are disposed to the intermediate transmission and control interface 1003; or
(3) the controllable clutch 1016 is disposed to the front end transmission 1006; or
(4) the controllable brake 1122 and the controllable clutch 1016 together are disposed to the front end transmission 1006; or
(5) the controllable brake 1122 and the controllable clutch 1016 can share the same structure; or
(6) the controllable brake 1122 can be disposed independently;
(7) the controllable clutch 1016 can be disposed independently;
(8) the controllable brake 1122 and the controllable clutch 1016 are sharing the same structure and disposed between the intermediate transmission and control interface 1003 and the front end transmission 1006; or
(9) the controllable brake 1122 is disposed to the intermediate transmission and control interface 1003 while the differential output end 1032 is disposed to the front end transmission 1006.

In the preferred embodiments illustrated in FIG. 13~FIG. 14 stated previously, the controllable clutch 1116 can be disposed to below methods according to the structural requirements:
(1) the controllable clutch 1116 can be disposed to the first electric machine 1041; or
(2) the controllable clutch 1116 can be disposed to the rear end transmission 1113; or
(3) the controllable clutch 1116 can be disposed between the first electric machine 1041 and the rear end transmission 1113.

In the preferred embodiments illustrated in FIG. 13~FIG. 14 stated previously, its second electric machine 1042 can be disposed to below methods according to the structural requirements:
(1) the second electric machine 1042 can be disposed between the rear end transmission 1113 and the rear end load 1114; or
(2) the second electric machine 1042 and the rear end load 1114 can share the same structure; or
(3) the second electric machine 1042 and the rear end transmission 1113 can share the same structure; or
(4) the second electric machine 1042 can share the same structure with the rear end transmission 1113 and the controllable clutch 1116; or
(5) the second electric machine 1042 can share the same structure with the rear end load 1114 and the rear end transmission 1113; or
(6) the second electric machine 1042 can share the same structure with the rear end transmission 1113, the controllable clutch 1116, and the first electric machine 1041; or
(7) the second electric machine 1042 can share the same structure with the rear end load 1114, the rear end transmission 1113, and the controllable clutch 1116; or
(8) the second electric machine 1042 can share the same structure with the rear end load 1114, the rear end transmission 1113, the controllable clutch 1116, and the first electric machine 1041.

This differential generation power distribution system, as shown in the preferred embodiments of FIG. 15~FIG. 20, its rotational electric machine assembly 10410 can be disposed to below methods according to the structural requirements:
(1) the rotational electric machine assembly 10410 can share the same structure with the rear end transmission 1113; or
(2) the rotational electric machine assembly 10410 can share the same structure with the intermediate transmission and control interface 1003; or
(3) the rotational electric machine assembly 10410 can be disposed independently between the intermediate transmission and control interface 1003 and the rear end transmission 1113.

In the preferred embodiments illustrated in FIG. 15~FIG. 20 stated previously, the controllable brake 1121 and the controllable clutch 1120 can be disposed to below methods according to the structural requirements:
(1) the controllable brake 1121 can be disposed to the intermediate transmission and control interface 1003; or
(2) the controllable brake 1121 together with the controllable clutch 1120 can be disposed to the intermediate transmission and control interface 1003; or
(3) the controllable clutch 1120 can be disposed to the rotation part 10411 of the first electric machine; or (4) the controllable clutch 1120 can be disposed together with the controllable brake 1121 to the rotation part 10411 of the first electric machine; or
(5) the controllable clutch 1120 and the controllable clutch 1121 can share the same structure; or
(6) the controllable clutch 1120 can be disposed independently; or
(7) the controllable brake 1121 can be disposed independently; or
(8) the controllable clutch 1120 and the controllable brake 1121 are sharing the same structure and disposed between the intermediate transmission and control interface 1003 and the rotation part of the first electric machine 10411; or
(9) the controllable clutch 1120 is disposed to the rotation part of the first electric machine 10411 while the controllable brake 1121 is disposed to the intermediate transmission and control interface 1003.

In the preferred embodiments illustrated in FIG. 15~FIG. 20 stated previously, the controllable clutch 1002 can be disposed to below methods according to the structural requirements:
(1) the controllable clutch 1002 can be disposed to the rotational power unit 1000; or
(2) the controllable clutch 1002 can be disposed to the intermediate transmission and control interface 1003; or
(3) the controllable clutch 1002 can be disposed independently between the rotational power unit 1000 and the intermediate transmission and control interface 1003.

In the preferred embodiments illustrated in FIG. 15~FIG. 20 stated previously, the controllable brake 1122 and the controllable clutch 1016 can be disposed to below methods according to the structural requirements:
(1) the controllable brake 1122 is disposed to the intermediate transmission and control interface 1003; or
(2) the controllable brake 1122 and the controllable clutch 1016 can be disposed to the intermediate transmission and control interface 1003; or
(3) the controllable clutch 1016 is disposed to the front end transmission 1006; or
(4) the controllable brake 1122 can be disposed together with the controllable clutch 1016 to the front end transmission 1006; or
(5) the controllable brake 1122 and the controllable clutch 1016 can share the same structure; or
(6) the controllable brake 1122 can be disposed independently;
(7) the controllable clutch 1016 can be disposed independently;
(8) the controllable brake 1122 and the controllable clutch 1016 are sharing the same structure and disposed between the intermediate transmission and control interface 1003 and the front end transmission 1006; or
(9) the controllable brake 1122 is disposed to the intermediate transmission and control interface 1003 while the differential output end 1032 is disposed to the front end transmission 1006.

The differential generation power distribution system, as shown in the preferred embodiment of FIG. 24, the rotational electric machine assembly 1040 can be disposed according to the structural requirements in below methods:
(1) the rotational electric machine assembly 1040 can share the same structure with the controllable clutch 1123, the transmission 1090 and the rear end transmission 1113; or
(2) the rotational electric machine assembly 1040 can share the same structure with the transmission 1080 and the intermediate transmission and control interface 1003; or
(3) the rotational electric machine assembly 1040 can be independently disposed between the transmission 1080 and the transmission 1090; or
(4) the rotational electric machine assembly 1040, together with the transmission 1080 and the transmission 1090 can be independently disposed between the intermediate transmission and control interface 1003 and the rear end transmission 1113.

In the preferred embodiments illustrated in FIG. 24 stated previously, the controllable brake 1121 and the controllable clutch 1120 can be disposed to below methods according to the structural requirements:
(1) the controllable brake 1121 can be disposed together with the transmission 1080 and the controllable clutch 1120 to the first electric machine 1041; or
(2) the controllable brake 1121 can be disposed together with the transmission 1080 to the intermediate transmission and control interface 1003; or
(3) the controllable brake 1121 and the transmission 1080 can be disposed together with the output end 1034 and the controllable clutch 1120 to the intermediate transmission and control interface 1003; or
(4) the controllable brake 1121 can be disposed together with the transmission 1080 to the intermediate transmission and control interface 1003; or
(5) the controllable clutch 1120 can be disposed together with the transmission 1080 to the first electric machine 1041; or
(6) the controllable clutch 1120, the transmission 1080 and the controllable brake 1121 can share the same structure; or
(7) the controllable clutch 1120 can be disposed independently; or
(8) the controllable brake 1121 can be disposed independently; or
(9) the transmission 1080 can be disposed independently; or
(10) the controllable brake 1121 and the transmission 1080 can share the same structure and be disposed independently; or
(11) the controllable clutch 1120 and the transmission 1080 can share the same structure and be disposed independently; or
(12) the controllable brake 1121, the transmission 1080 and the controllable clutch 1120 can share the same structure and be disposed independently.

In the preferred embodiments illustrated in FIG. 24 stated previously, the controllable clutch 1002 can be disposed to below methods according to the structural requirements:
(1) the controllable clutch 1002 is disposed to the rotational power unit 1000; or
(2) the controllable clutch 1002 is disposed to the intermediate transmission and control interface 1003; or
(3) the controllable clutch 1002 can be disposed independently between the rotational power unit 1000 and the intermediate transmission and control interface 1003.

In the preferred embodiments illustrated in FIG. 24 stated previously, the controllable brake 1122 and the controllable clutch 1016 can be disposed to below methods according to the structural requirements:
(1) the controllable brake 1122 is disposed to the intermediate transmission and control interface 1003; or
(2) the controllable brake 1122 and the controllable clutch 1016 can be disposed to the intermediate transmission and control interface 1003; or
(3) the controllable clutch 1016 can be disposed to the front end transmission 1006; or
(4) the controllable brake 1122 can be disposed together with the controllable clutch 1016 to the front end transmission 1006; or (5) the controllable brake 1122 can share the same structure with the controllable clutch 1016; or
(6) the controllable brake 1122 can be disposed independently;
(7) the controllable clutch 1016 can be disposed independently;
(8) the controllable brake 1122 and the controllable clutch 1016 are sharing the same structure and disposed between the intermediate transmission and control interface 1003 and the front end transmission 1006;
(9) the controllable brake 1122 is disposed to the intermediate transmission and control interface 1003 while the differential output end 1032 is disposed to the front end transmission 1006.

In the preferred embodiments illustrated in FIG. 24 stated previously, the controllable clutch 1116 can be disposed to below methods according to the structural requirements:
(1) the controllable clutch 1116 can share the same structure with the transmission 1080; or
(2) the controllable clutch 1116 can share the same structure with the transmission 1090; or
(3) the controllable clutch 1116 can be disposed between the transmission 1080 and the transmission 1090; or
(4) the controllable clutch 1116, the transmission 1080, the controllable clutch 1120, and the controllable brake 1121 are disposed to the intermediate transmission and control interface 1003; or
(5) the controllable clutch 1116, the transmission 1080, the controllable clutch 1120, and the controllable brake 1121 are disposed to the first electric machine 1041; or
(6) the controllable clutch 1116, the transmission 1080, the controllable clutch 1120, and the controllable brake 1121 can be independent structures; or
(7) the controllable clutch 1116, the transmission 1080, the controllable clutch 1120, the controllable brake 1121, and the first electric machine 1041 can be paired or more than two can be grouped to share the same structure; or
(8) the controllable clutch 1116, the transmission 1090, and the rear end transmission 1113 is disposed to the second electric machine 1042; or
(9) the controllable clutch 1116 and the transmission 1090 are disposed to the rear end transmission 1113; or
(10) the controllable clutch 1116, the transmission 1090, and the rear end transmission 1113 are disposed to the rear end transmission 1113; or
(11) the controllable clutch 1123 and the transmission 1090 are disposed to the rear end transmission 1113; or
(12) the transmission 1090 is disposed to the rear end transmission 1113; or
(13) the controllable clutch 1116, the transmission 1090, the controllable clutch 1123, and the rear end transmission 1113 can be individually independent structures; or
(14) the controllable clutch 1116, the transmission 1090, the controllable clutch 1123, the rear end transmission 1113, and the second electric machine 1042 can be paired or grouped in more than two for sharing the same structure.

The differential generation power distribution system, as shown in the preferred embodiment of FIG. 25~FIG. 27, the rotational electric machine assembly 10410 can be disposed according to the structural requirements in below methods:
(1) the rotational electric machine assembly 10410 can share the same structure with the controllable clutch 1123, the transmission 1090 and the rear end transmission 1113; or
(2) the rotational electric machine assembly 10410 can share the same structure with the transmission 1080 and the intermediate transmission and control interface 1003; or
(3) the rotational electric machine assembly 10410 can be independently disposed between the transmission 1080 and the transmission 1090; or
(4) the rotational electric machine assembly 10410, together with the transmission 1080 and the transmission 1090 can be independently disposed between the intermediate transmission and control interface 1003 and the rear end transmission 1113.

In the preferred embodiments illustrated in FIG. 25~FIG. 27 stated previously, the controllable brake 1121 and the controllable clutch 1120 can be disposed to below methods according to the structural requirements:
(1) the controllable brake 1121 can be disposed together with the transmission 1080 and the controllable clutch 1120 to the rotation part 10411 of the first electric machine; or
(2) the controllable brake 1121 can be disposed together with the transmission 1080 to the intermediate transmission and control interface 1003; or
(3) the controllable brake 1121 and the transmission 1080 can be disposed together with the output end 1034 and the controllable clutch 1120 to the intermediate transmission and control interface 1003; or
(4) the controllable brake 1121 can be disposed together with the transmission 1080 to the intermediate transmission and control interface 1003; or
(5) the controllable clutch 1120 can be disposed together with the transmission 1080 to the rotation part 10411 of the first electric machine; or
(6) the controllable clutch 1120, the transmission 1080 and the controllable brake 1121 can share the same structure; or
(7) the controllable clutch 1120 can be disposed independently; or
(8) the controllable brake 1121 can be disposed independently; or
(9) the transmission 1080 can be disposed independently; or
(10) the controllable brake 1121 and the transmission 1080 can share the same structure and be disposed independently; or
(11) the controllable clutch 1120 and the transmission 1080 can share the same structure be disposed independently; or
(12) the controllable brake 1121, the transmission 1080 and the controllable clutch 1120 can share the same structure and be disposed independently.

In the preferred embodiments illustrated in FIG. 25 FIG. 27 stated previously, the controllable clutch 1002 can be disposed to below methods according to the structural requirements:
(1) the controllable clutch 1002 is disposed to the rotational power unit 1000; or
(2) the controllable clutch 1002 is disposed to the intermediate transmission and control interface 1003; or
(3) the controllable clutch 1002 can be disposed independently between the rotational power unit 1000 and the intermediate transmission and control interface 1003.

In the preferred embodiments illustrated in FIG. 25~FIG. 27 stated previously, the controllable brake 1122 and the controllable clutch 1016 can be disposed to below methods according to the structural requirements:
(1) the controllable brake 1122 is disposed to the intermediate transmission and control interface 1003; or
(2) the controllable brake 1122 and the controllable clutch 1016 can be disposed to the intermediate transmission and control interface 1003; or
(3) the controllable clutch 1016 can be disposed to the front end transmission 1006; or (4) the controllable brake 1122 can be disposed together with the controllable clutch 1016 to the front end transmission 1006; or
(5) the controllable brake 1122 can share the same structure with the controllable clutch 1016; or
(6) the controllable brake 1122 can be disposed independently;
(7) the controllable clutch 1016 can be disposed independently;
(8) the controllable brake 1122 and the controllable clutch 1016 are sharing the same structure and disposed between the intermediate transmission and control interface 1003 and the front end transmission 1006;
(9) the controllable brake 1122 is disposed to the intermediate transmission and control interface 1003 while the differential output end 1032 is disposed to the front end transmission 1006.

In the preferred embodiments illustrated in FIG. 25~FIG. 27 stated previously, the controllable clutch 1116 can be disposed to below methods according to the structural requirements:
(1) the controllable clutch 1116 can share the same structure with the transmission 1080; or
(2) the controllable clutch 1116 can share the same structure with the transmission 1090; or
(3) the controllable clutch 1116 can be disposed between the transmission 1080 and the transmission 1090; or
(4) the controllable clutch 1116, the transmission 1080, the controllable clutch 1120, and the controllable brake 1121 are disposed to the intermediate transmission and control interface 1003; or
(5) the controllable clutch 1116, the transmission 1080, the controllable clutch 1120, and the controllable brake 1121 are disposed to the rotation part 10411 of the first electric machine; or
(6) the controllable clutch 1116, the transmission 1080, the controllable clutch 1120, and the controllable brake 1121 can be independent structures; or
(7) the controllable clutch 1116, the transmission 1080, the controllable clutch 1120, the controllable brake 1121, and the rotation part 10411 of the first electric machine can be paired or more than two can be grouped to share the same structure; or
(8) the controllable clutch 1116, the transmission 1090, and the rear end transmission 1113 is disposed to the rotation part 10412 of the second electric machine; or
(9) the controllable clutch 1116 and the transmission 1090 are disposed to the rear end transmission 1113; or
(10) the controllable clutch 1116, the transmission 1090, and the rear end transmission 1113 are disposed to the rear end transmission 1113; or
(11) the controllable clutch 1123 and the transmission 1090 are disposed to the rear end transmission 1113; or
(12) the transmission 1090 is disposed to the rear end transmission 1113; or
(13) the controllable clutch 1116, the transmission 1090, the controllable clutch 1123, and the rear end transmission 1113 can be individually independent structures; or
(14) the controllable clutch 1116, the transmission 1090, the controllable clutch 1123, the rear end transmission 1113, and the rotation part 10412 of the second electric machine can be paired or grouped in more than two for sharing the same structure.

The present invention by providing a differential generation power distribution system to drive the all wheels driving carrier by having the output end of rotational kinetic energy from a rotational power unit to drive the rotational input end of an intermediate differential gear set through a main transmission constituted by controllable clutches and gear shifting control means; one differential output end of the intermediate differential gear set drives the front end load through a front end transmission and the other differential output end drives a primary electric machine of a rotational electric machine assembly whereas the output end of the rotational kinetic energy of the second electric machine directly or through the transmission drives the rear end load and regulate the power distribution between the front end and the rear end loads subject to the control by a drive control device is innovative and gives precise functions. Therefore, this application is duly filed accordingly.

The invention claimed is:
1. A differential generation power distribution system for an all-wheel-drive vehicle, comprising:
 a rotational power unit (1000) having an output that supplies rotational power;
 a main transmission (1110);
 a first controllable clutch (1002) coupled to the output of the rotational power unit and to an input of the main transmission for selectively disengaging the rotational power unit from the main transmission;
 a front end differential transmission (1006) for transmitting rotational power from the main transmission to at least one front wheel;
 a rear end differential transmission (1113) for transmitting rotational power from the main transmission to at least one rear wheel;
 a rotational electric machine assembly (1040) provided between the main transmission and the rear end differential transmission and selectively operable as a motor and a generator, said rotational electric machine assembly including a first electric machine (1041) and a second electric machine (1042);
 a second controllable clutch (1120) coupled between an output (1111) of the main transmission and the first electric machine for selectively coupling the first electric machine to the output of the main transmission;
 a third controllable clutch (1123) coupled between the second electric machine and the rear end differential transmission for selectively coupling the second electric machine to the rear end differential transmission;
 a fourth controllable clutch (1116) directly coupled between the output of the main transmission and the rear end differential transmission for selectively coupling the main transmission directly to the rear end differential transmission;
 a rechargeable device (1117);
 a drive control device (1115) for selectively operating said first, second, third, and fourth controllable clutches, and the first and second electric machines, and for supplying electric power to and from the first and second electric machines to selectively operate said first and second electrical machines as respective motors or as respective generators for supplying electricity to said rechargeable device; and
 a central control (1118) for controlling operation of the drive control device,
 whereby, by controlling the second, third, and fourth clutches, power is selectively transmitted directly from the main transmission to the rear end load, from the main transmission to both the rear end load and the rotational electrical machine assembly such that the rotational electrical machine assembly further drives the rear end load or charges the rechargeable device, and from the rear end load to the rotational electrical machine assem- bly so that the rotational electrical machine assembly charges the rechargeable device during regenerative braking, said rotational electrical machine further regulating and distributing power between the rear end and front end loads during all-wheel driving.

2. A differential generation power distribution system for an all-wheel-drive vehicle as claimed in claim 1, wherein said rotational power unit is an internal combustion engine having a rotational output shaft connected to the first controllable clutch.

3. A differential generation power distribution system for an all-wheel-drive vehicle as claimed in claim 1, wherein said output of the main transmission includes an intermediate differential gear set.

4. A differential generation power distribution system for an all-wheel-drive vehicle as claimed in claim 1, wherein said rear end differential transmission and said front end differential transmission include differential gear sets.

5. A differential generation power distribution system for an all-wheel-drive vehicle as claimed in claim 1, further comprising a fifth control clutch (1016) coupled between the output of the main transmission and the front end differential transmission (1006) for selectively disengaging the front end differential transmission from the main transmission.

6. A differential generation power distribution system for an all-wheel-drive vehicle as claimed in claim 1, wherein said rechargeable device is one of a rechargeable secondary battery, capacitor, and super capacitor.

7. A differential generation power distribution system for an all-wheel-drive vehicle as claimed in claim 1, wherein the rotational electric machine assembly includes a same holder for said first and second electric machine.

8. A differential generation power distribution system for an all-wheel-drive vehicle as claimed in claim 1, wherein said rotational electric machine assembly is integral with said rear end transmission or integral with an intermediate transmission and control interface (1003) that includes said main transmission.

9. A differential generation power distribution system for an all-wheel-drive vehicle as claimed in claim 1, wherein said rotational electric machine assembly is an independent structure that is separate from said rear end transmission and an intermediate transmission and control interface that includes said main transmission.

10. A differential generation power distribution system for an all-wheel-drive vehicle as claimed in claim 1, wherein said first electric machine is integral with an intermediate transmission and control interface that includes said main transmission, and said second electric machine is integral with said rear end transmission.

11. A differential generation power distribution system for an all-wheel-drive vehicle as claimed in claim 1, wherein one or more of said first, second, third, and fourth controllable clutches are integral with or share structures to which they are coupled.

12. A differential generation power distribution system for an all-wheel-drive vehicle as claimed in claim 1, wherein the rotational power unit is an engine and the differential generation power distribution system are arranged to supply any or all of the following functions:
(i) with a fifth controllable clutch (1016) disengaged between the main transmission and the front end differential transmission and a controllable brake (1122) locked up, the engine is controlled to run at or approaching a fixed speed within an rpm area of brake specific fuel consumption (BSFC) to drive the first electric machine to operate as a generator, and power generated by the first electric machine drives the second electric machine to operate as a motor to further drive the rear end load during startup or acceleration;
(ii) with the fifth controllable clutch (1016) disengaged and the controllable brake locked up, the engine is controlled to run at or approaching a fixed speed within an rpm area of BSFC to drive the first electric machine to operate as a generator, and the power generated by the first electric machine charges said rechargeable device or is supplied to an external destination;
(iii) with the fifth controllable clutch disengaged and the controllable brake (1122) locked up, the engine is controlled to run at or approaching the fixed speed within the rpm area of the BSFC to drive the first electric machine to operate as a generator, electricity generated by the first electric machine and electricity supplied by the rechargeable device jointly driving the second electric machine to function as a motor and further drive the rear end load during startup or acceleration;
(iv) with the fifth controllable clutch disengaged and the controllable brake locked up, the engine is controlled to run at or approaching a fixed speed within the rpm area of BSFC to drive the first electric machine to operate as a generator, and power generated by the first electric machine drives the second electric machine to function as a motor and further drive the rear end load during startup or acceleration while charging the rechargeable device at the same time;
(v) the first electric machine is driven by rotational kinetic energy from the main transmission to operate as a generator and electric power output by the first electric machine drives the second electric machine to function as a motor and further drive the rear end load during startup and acceleration;
(vi) the first electric machine is driven by rotational kinetic energy from the main transmission to operate as a generator and electric power output by the first electric machine charges the rechargeable device;
(vii) the first electric machine is driven by rotational kinetic energy from the main transmission to operate as a generator and electric power output by the first electric machine further drives the rear end load during startup and acceleration while also charging the rechargeable device;
(viii) the first electric machine is driven by rotational kinetic energy from the main transmission to operate as a generator and electric power from both the first electric machine and the rechargeable device jointly drives the second electric machine to function as a motor and further drive the rear end load during startup and acceleration; and
(ix) the second electric machine operates as a generator during braking and electric power from the second electric machine charges the rechargeable device.

13. A differential generation power distribution system for an all-wheel-drive vehicle as claimed in claim 1, wherein the rotational power unit is an engine and the differential generation power distribution system are arranged to supply any or all of the following functions:
(i) power from the rechargeable device drives the first electric machine and/or the second electric machine to operate as a motor and either or both the first electric machine and the second electric machine drive a load during startup or acceleration;
(ii) power from the rechargeable device drives the first electric machine and/or the second electric machine to operate as a motor and either or both of the first electric machine and the second electric machine drive the load the jointly with the rotational power unit or to regulate and control a power distribution ratio between the front end load and the rear end load;

(iii) the rotational power unit drives the first electric machine to operate as a generator and supply electric power to the rechargeable device, the amount of electric power supplied to the rechargeable device determining a counter-torque generated by the first electric machine so as to regulate and control a power distribution ratio between the front end load and the rear end load by means of differential coupling provided by an intermediate differential gear set included in the output of the main transmission;

(iv) with a fifth controllable clutch (1016) between the main transmission output and the front end differential transmission disengaged and a controllable brake (1122) locked up, the engine is controlled to run at or approaching a fixed speed with an rpm area of brake specific fuel consumption (BSFC) to drive the first electric machine to operate as a generator, power generated by the first electric machine drives the second electric machine to function as a motor and further drive the rear end load during startup or acceleration;

(v) the first electric machine is driven by rotational kinetic energy output by the main transmission to operate as a generator and output electric power to drive the second electric machine to operate as a motor to further drive the rear end load during startup or acceleration;

(vi) the first electric machine is driven by rotational kinetic energy output by the main transmission to operate as a generator, electric power from the first electric machine and from the rechargeable device jointly driving the second electric machine to operate as a motor to further drive the rear end load during startup or acceleration; and (vii) when the vehicle is driving down a slope or undergoing braking or deceleration, either or both of the first electric machine and the second electric machine operates as a generator to charge the rechargeable device or to supply power to a load for executing regenerative braking, whereby the vehicle engages in front wheel driving, rear wheel driving, or all wheel driving.

14. A differential generation power distribution system for an all-wheel-drive vehicle as claimed in claim 1, wherein the rotational electric machine assembly is constructed as follows:

a rotation part (10411) of the first electric machine and a rotation part (10412) of the second electric machine are coaxially arranged in series, the rotation part of the second electric making driving the rear end load; and an electric machine static part (10413) serves as a common magnetic path and extends axially to be coupled to the respective rotation parts of the first and second electric machines.

15. A differential generation power distribution system for an all-wheel-drive vehicle as claim in 17, wherein the rotational electric machine assembly is contructed as follows:

a rotation part (10411) of the first electric machine and a rotation part (10412) of the second electric machine are arranged in parallel on multiple axes, the rotation part of the second electric machine driving the rear end load; and the rotation parts of the first electric machine and the second electric machine are coupled to an electric machine static part (10413) that provides a common magnetic path.

16. A differential generation power distribution system for an all-wheel-drive vehicle as claimed in claim 1, wherein the rotational electric machine assembly is constructed as follows:

a rotation part (10411) of the first electric machine has an annular or cylindrical shape and a rotation part (10412) of the second electric machine has a circular shape; and an electric machine static part (10413) has an annular shape and is disposed between the rotation parts of the first electric machine and the second electric machine to form a three-layer ring-shaped coaxial electric machine, the rotation part of the second electric machine driving the rear end load.

17. A differential generation power distribution system for an all-wheel-drive vehicle as claimed in claim 1, wherein when the fourth controllable clutch is engaged to transmit power directly from the main transmission to the rear end transmission, the differential generation power distribution system provides any or all of the following functions:

(i) the rotational energy output by the main transmission drives the first electric machine through the second controllable clutch to generate electric power and drive the second electric machine to transmit rotational kinetic energy to the rear end transmission through the third controllable clutch and jointly drive the rear end load;

(ii) the rechargeable device supplies power to the first and second electric machines to operate as a motor and jointly drive the rear end load together with power supplied through the fourth controllable clutch;

(iii) both the first electric device and second electric device are jointly driven by the rotational power source or load inertia to operate as a generator and charge the rechargeable device or supply power to another power driven load.

18. A differential generation power distribution system for an all-wheel-drive vehicle as claimed in claim 1, wherein the output end of the main transmission includes a differential gear set and a fifth controllable clutch (1016) or a rear side controllable brake (1122) disposed between the differential gear set and the front end transmission, the differential generation power distribution system providing any or all of the following functions:

(i) with the fifth controllable clutch disengaged, the fourth controllable clutch is engaged and a front side controllable brake (1121) at a rear side of the differential gear set is released, the system drives the rear end load and the front end load is in an idling state;

(ii) with the fourth controllable clutch disengaged and the rear side controllable brake in a braking state, and with the fifth controllable clutch engaged and the front side controllable brake released, the system drives the front end load, and either the rear end load is in an idling state, the second electric machine is driven by the rechargeable device to operate as a motor and also drive the rear end load, or the second electric machine is driven by the rear end load to operate as a generator to charge the rechargeable device or supply power to another device while the rotational power unit is driving the front end load;

(iii) with the fourth and fifth controllable clutches engaged and the rear end and front controllable brakes released, rotational energy from the rotational power unit executes all-wheel driving or electric power from the rechargeable device drives the first or second electric machines to jointly drive the rear wheels while the rotational power unit executes all-wheel driving; and (iv) with the fourth and fifth controllable clutches disengaged and the rear end and front end controllable brakes released, both the front end and rear end loads are left in skidding status and, during deceleration or braking while driving down a slope, either the first electric machine and/or the second electric machine are driven to operate as a generator and charge the rechargeable device or supply power to another device while the counter torque created by outputting electric power serves to provide additional braking.

19. A differential generation power distribution system for an all-wheel-drive vehicle as claimed in claim 1, wherein a second transmission (1080) is provided between the output end of the main transmission and the second and fourth controllable clutches, and a third transmission (1090) is provided between the third and fourth controllable clutches and the rear end transmission, said second and third transmissions each including at least one of a gear, friction gear, pulley, gear pulley, chain, fluid transmission, or electromagnetic transmission.

20. A differential generation power distribution system for an all-wheel-drive vehicle as claimed in claim 1, wherein the rotational electrical machine assembly is a three-layer ring electric machine structure constructed as follows:

an inner surface of a static outer layer electric machine structure (20423) faces an outer surface of a rotating intermediate layer electric machine structure (20422); and an inner surface of the intermediate layer electric machine structure faces an outer surface of the rotating inner ring electrical machine structure (20421).

21. A differential generation power distribution system for an all-wheel-drive vehicle as claimed in claim 3, further comprising a first controllable brake (1121) disposed between a first output end (1033) of the intermediate differential gear set and a static casing, said first output end being coupled to the rear end differential transmission.

22. A differential generation power distribution system for an all-wheel-drive vehicle as claimed in claim 3, further comprising a second controllable brake (1122) disposed between a second output end (1032) of the intermediate differential gear set and a static casing, said second output end being coupled to the front end differential transmission.

23. A differential generation power distribution system for an all-wheel-drive vehicle as claimed in claim 20, wherein the intermediate layer and inner ring layer electric machine structures are coaxial, the intermediate layer electric machine structure is the first electric machine and the inner ring layer electric machine structure is the second electric machine, and a sixth controllable clutch (2116) is disposed between the intermediate layer and inner ring layer electrical machine structures.

* * * * *